(12) United States Patent
Ulbrich et al.

(10) Patent No.: US 12,365,570 B2
(45) Date of Patent: Jul. 22, 2025

(54) AUTONOMOUS INDUSTRIAL TRUCK

(71) Applicant: MetraLabs GmbH Neue Technologien und Systeme, Ilmenau (DE)

(72) Inventors: Stefan Ulbrich, Leinefelde-Worbis (DE); Andreas Bley, Niestetal (DE); Erik Wolf, Ilmenau (DE); Benjamin Fischer, Ilmenau (DE); Christian Martin, Ilmenau (DE); Johannes Trabert, Ilmenau (DE); Ahmed I Syleiman, Ilmenau (DE); Christian Sternitzke, Leipzig (DE)

(73) Assignee: MetraLabs GmbH Neue Technologien und Systeme, Ilmenau (DE)

( * ) Notice: Subject to any disclaimer, the term of this patent is extended or adjusted under 35 U.S.C. 154(b) by 129 days.

(21) Appl. No.: 17/767,545

(22) PCT Filed: Oct. 9, 2020

(86) PCT No.: PCT/EP2020/078431
§ 371 (c)(1),
(2) Date: Jun. 15, 2022

(87) PCT Pub. No.: WO2021/069674
PCT Pub. Date: Apr. 15, 2021

(65) Prior Publication Data
US 2024/0067510 A1    Feb. 29, 2024

(30) Foreign Application Priority Data
Oct. 9, 2019 (DE) .................... 10 2019 127 194.0

(51) Int. Cl.
*B66F 9/06* (2006.01)
*G05D 1/00* (2006.01)

(52) U.S. Cl.
CPC .......... *B66F 9/063* (2013.01); *G05D 1/0253* (2013.01)

(58) Field of Classification Search
CPC ...... B66F 9/063; G05D 1/0253; G05D 1/0246
USPC .......................................... 701/23
See application file for complete search history.

(56) References Cited

U.S. PATENT DOCUMENTS

| 10,436,590 B2 | 10/2019 | Cui et al. | |
|---|---|---|---|
| 2008/0195316 A1 | 8/2008 | Krishnaswamy | |
| 2014/0277691 A1* | 9/2014 | Jacobus | B66F 9/24 700/216 |

(Continued)

FOREIGN PATENT DOCUMENTS

| CN | 105752884 A | 7/2016 |
|---|---|---|
| CN | 205773116 U | 12/2016 |

(Continued)

*Primary Examiner* — Muhammad Shafi
(74) *Attorney, Agent, or Firm* — 24IP Law Group USA, PLLC; Timothy R. DeWitt

(57) ABSTRACT

Transporting loads is a fundamental component of intralogistics. Autonomous industrial trucks can be used for this. The autonomous industrial truck claimed according to the invention is able, by means of the implemented navigation, load receiving and load placing methods, to ensure efficient transporting of loads. The invention relates to an autonomous industrial truck having a rearwardly-directed sensor unit for detecting the load and the loading environment and implemented process sequences for approaching the load, receiving the load and placing the load.

14 Claims, 34 Drawing Sheets

(56) References Cited

U.S. PATENT DOCUMENTS

| | | | |
|---|---|---|---|
| 2016/0167650 A1 | 6/2016 | Clark et al. | |
| 2016/0332304 A1 | 11/2016 | Goel et al. | |
| 2017/0228885 A1* | 8/2017 | Baumgartner | ....... H04N 13/204 |
| 2018/0304468 A1 | 10/2018 | Holz | |

FOREIGN PATENT DOCUMENTS

| | | | |
|---|---|---|---|
| CN | 106627867 A | | 5/2017 |
| CN | 206232381 U | | 6/2017 |
| CN | 206427980 U | | 8/2017 |
| CN | 107364809 A | | 11/2017 |
| CN | 108046172 A | | 5/2018 |
| CN | 207483267 U | | 6/2018 |
| CN | 207699125 U | | 8/2018 |
| CN | 108609540 A | | 10/2018 |
| CN | 108792384 A | | 11/2018 |
| CN | 208150896 U | | 11/2018 |
| CN | 109748203 A | | 5/2019 |
| DE | 10-2015-223329 | * | 6/2017 |
| EP | 2518002 | * | 10/2012 |
| EP | 2944601 A1 | | 11/2015 |
| EP | 3000772 A1 | | 3/2016 |
| JP | 108161039 A | | 6/1996 |
| KR | 2003-74416 | * | 1/2005 |

* cited by examiner

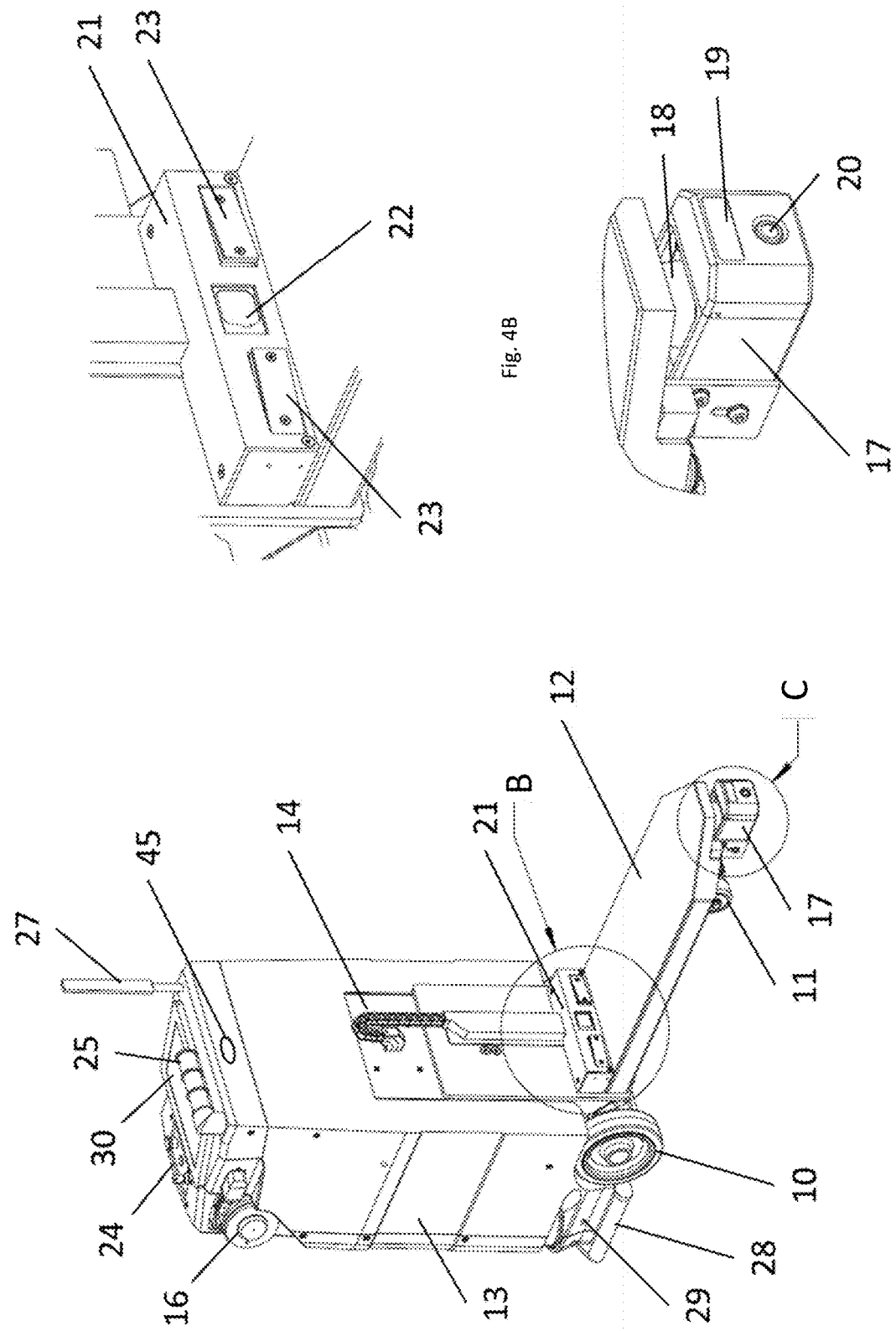

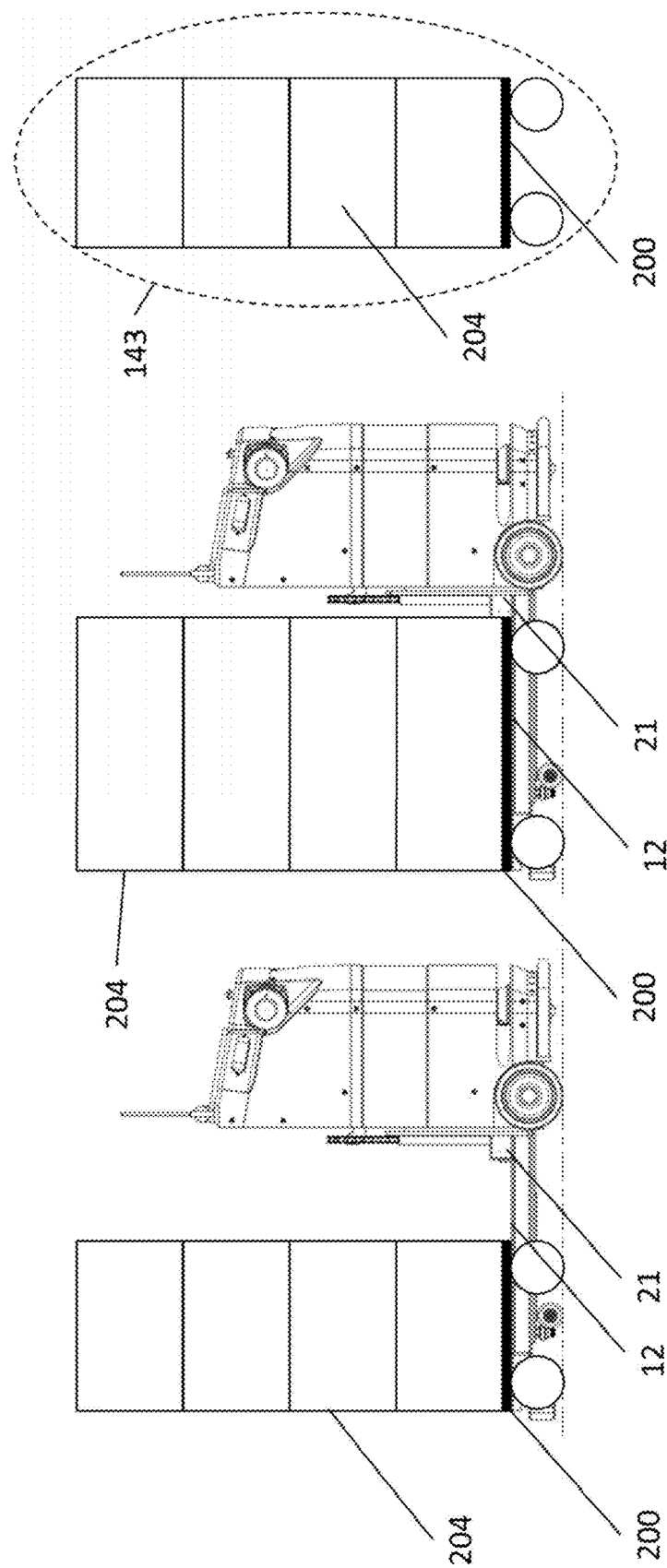

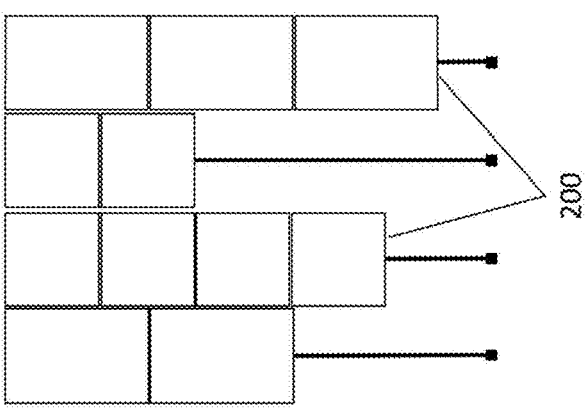
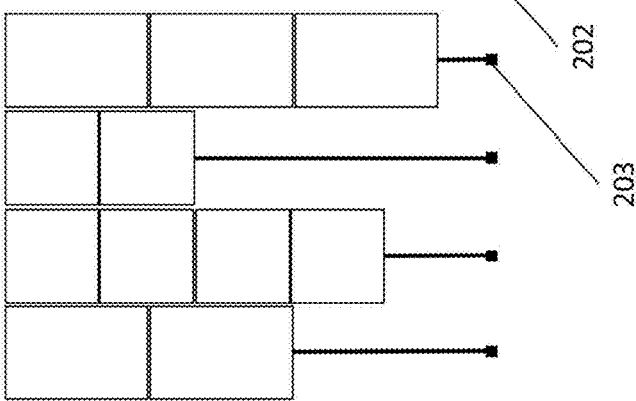
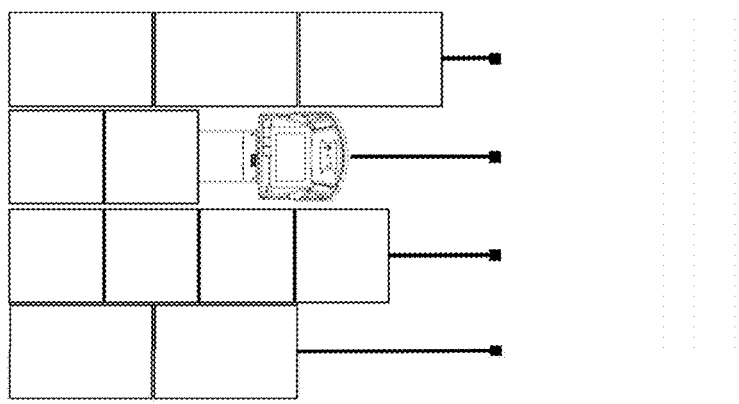
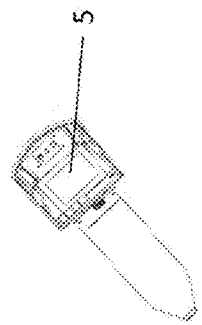

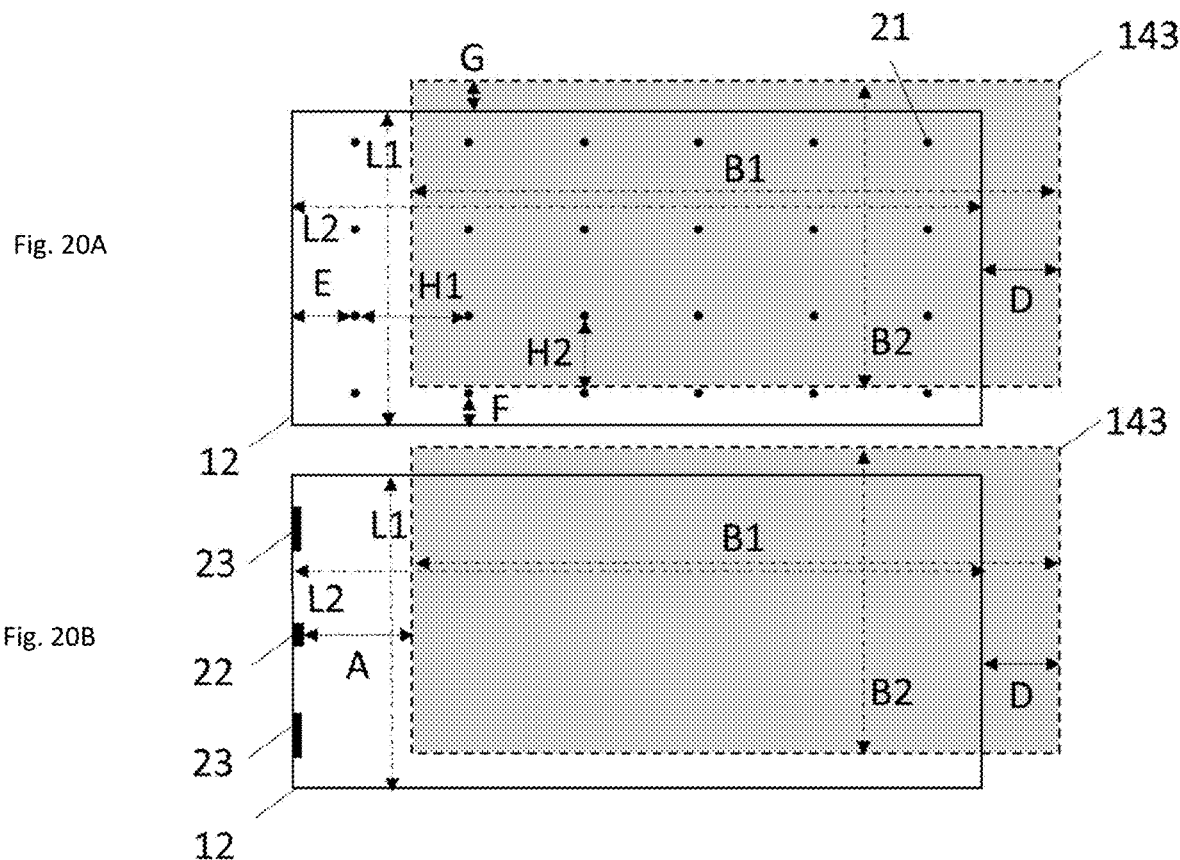
Fig. 20A
Fig. 20B
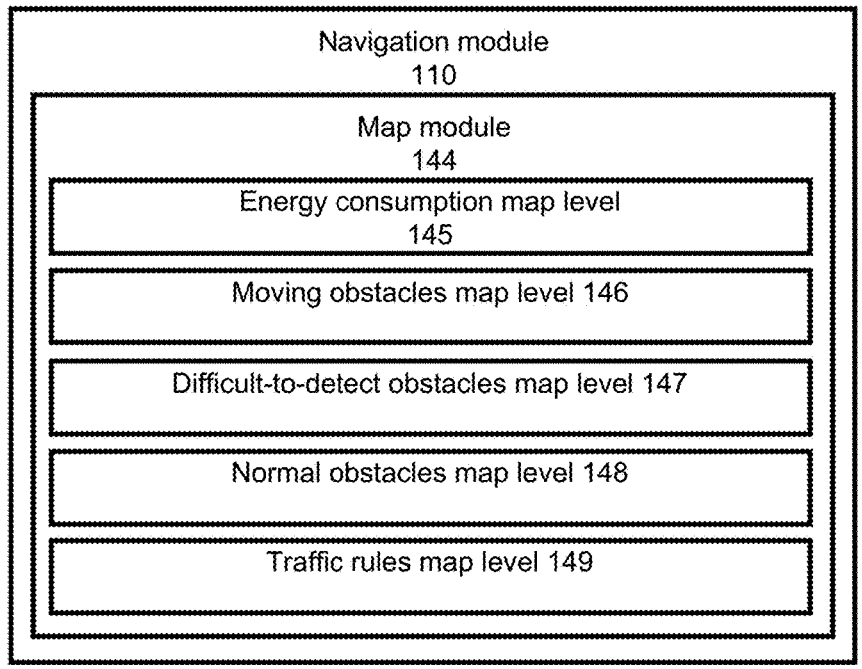
Fig. 21

AUTONOMOUS INDUSTRIAL TRUCK

BACKGROUND OF THE INVENTION

Field of the Invention

The invention relates to autonomously moving vehicles, in particular autonomous industrial trucks. In this context, the invention also covers forklifts and lift trucks. In one embodiment, the invention relates to an autonomous lift truck that is designed as an autonomous or driverless transport system (AGV— autonomous guided vehicle) or an autonomous transport vehicle.

Brief Description of the Related Art

Autonomous industrial trucks of the type mentioned above have numerous applications in intralogistics. Such autonomous industrial trucks are primarily used to transport goods, workpieces, semi-finished products and raw materials, in the process of which the lift truck identifies a product or transported item, picks up the product or transported item, transports it to another location, and sets it down again there.

The transported goods that are conveyed by such an industrial truck are partly stored in goods carriers that are stacked on top of each other on trolleys. The industrial truck picks up the trolleys together with the goods carriers (including workpiece carriers and (transport) boxes) and conveys the goods carriers to another location. The challenge here is to pick up the trolleys along with the goods carriers correctly. These trolleys can sometimes be located in areas that are delimited by markings on the floor. In this case, the industrial truck orients itself accordingly to the floor markings in order to identify and correctly pick up the corresponding trolleys by positioning the load platform or the forks of the truck under the trolley in order to then lift it.

In the prior art, as will be described in more detail below, systems of this type are known that, in some cases, feature distance sensors on the front of the load platform or forks. Experiments with such distance sensors on an industrial truck have demonstrated that the position of the trolleys cannot be satisfactorily detected using a LIDAR, for example, the use of which does not allow the corresponding (undetected) trolleys to be picked up by the industrial truck, which is mainly because such LIDAR sensors are not able to detect markings on the floor.

In the prior art, various autonomous forklifts or lifting platforms/forks for such forklifts are known. These include JPH08161039, EP2944601, CN108609540, CN207483267, CN105752884, CN205773116, or CN206232381, which, however, do not have sensors on the forks or lifting platform that are oriented in such a way that the sensors point forward in the direction of travel when the load is picked up.

A stacker is known from CN108046172 and CN207699125 which has obstacle sensors at the forks, e.g. ultrasonic or photoelectric sensors. CN206427980 employs an infrared emitter and multiple infrared detectors to measure distance at the front of a fork lift. CN106672867 has a code scanner and RFID reader integrated into one fork.

An overall design of a forklift is also described in CN107364809. Here, however, no sensors are installed at the edge of the loading area. In addition, a simple wheel with movable bearings is located under the load platform.

SUMMARY OF INVENTION

The present invention proposes a sensor unit which employs a camera system. In an optional aspect, this sensor unit additionally has a LIDAR and/or a lamp, for example, to illuminate the detection area of the camera, since the working environment is sometimes not particularly well lit.

The autonomous industrial truck (AIT) described in this document has at least three wheels, at least two of which are drive wheels, which are located in the front part in the area of the superstructure. The drive wheels are controlled by a control unit and supplied with energy from a power source, e.g. from a rechargeable battery. Furthermore, the AIT has a device for re-energizing the power source itself, in one aspect an interface to dock with a charging station to charge the rechargeable battery as well as the electronic equipment required to do so. The interface may be designed for galvanically coupled or inductive charging. The control unit may be a processing unit connected to at least one memory. The AIT may further have additional processing units.

The AIT has a frontal superstructure with a display, optional alarm lights, audible notification signals (siren, warning beeper, loudspeaker, etc.), and control elements. A forward movement of the AIT implies that the AIT is moving with the superstructure in front. At the rear, there is a load platform for transporting loads, which is adjustable in height. In one example, this load platform has a depth of approx. 60 cm and a width of 23 cm. However, deviations from this are also possible, to the extent that the configurations claimed below may also include forklifts that usually have two, somewhat narrower forks (compared to the 23 cm wide forks) and which may also be longer than 60 cm. The load platform is electrically adjustable in height by at least 5 mm, and in another example by at least 20 mm. The drive to adjust the height of the load platform is also controlled by the processing unit and monitored by means of a height adjustment sensor. Below the load platform, there is a caster, in one aspect designed as a double caster. A backward movement of the AIT implies that the AIT is moving with the load platform in front.

In addition, in one aspect, the AIT is fitted with a wireless interface, for example, a WLAN or Bluetooth/ZigBee/GSM/UMTS/LTE/5G module. Furthermore, the AIT has at least one wireless interface for controlling (monodirectional) and/or bidirectional communication of building-related equipment, such as (automatic) doors for remote opening and closing, optical and acoustic signaling devices for triggering signals, etc., preferably via Bluetooth, ZigBee, ISM/433/868 MHz (sub-1 Ghz) transceivers or via infrared (IrDA), etc. Likewise, switches/buttons and input devices can be provided which are installed in the building or in the driving area at known locations, e.g. to call the AIT to the spot (e.g. to pick up transported goods) or to trigger other specific actions.

The AIT has at least one LIDAR on the superstructure side, which is connected to one of the processing units. In an alternative or additional aspect, the AIT may also employ at least one 3D camera, e.g. an RGB-D camera, for example with speckle or time-of-flight (ToF) technology, or a stereo camera. In a further aspect, the AIT features at least one, preferably two, forward-facing LIDAR and at least one, in one aspect two, further LIDAR that are substantially vertically oriented and can thereby also detect obstacles at height. In one aspect, these LIDARs are not mounted on the outside of the AIT enclosure, but are located within recesses, which better protect them from impacts and do not add to the vehicle's footprint. To ensure that these LIDARs can still measure approximately vertically, the LIDARs are tilted, so that the angle to the vertical is preferably between about 5° and 20°.

On the side where the load platform is located, which acts as the front when picking up the load but is otherwise the rear, the AIT features a rear-facing sensor unit having at least one camera, in one aspect an RGB camera, in an alternative aspect an RGB-D camera, for example with speckle or time-of-flight (ToF) technology, or else a stereo camera. In an alternative and/or additional aspect, there is at least one distance sensor, in one aspect a LIDAR. In an alternative and/or additional embodiment, at least one light source is additionally located there which is configured in such a way that the light source can illuminate at least portions of the field of view of the camera. In one aspect, the at least one light source is configured in such a way that the light source emits primarily diffuse light. The light source may also have a dust-protected enclosure. In one aspect, at least one light source is an LED, e.g. a high-power LED. In an alternative and/or additional aspect, at least one RFID antenna is additionally located there, which is connected to an RFID reader.

In one aspect, the AIT includes sensor technology configured to detect a load on the load platform, preferably including the depth at which the load is located on the load platform. In this way, loads of varying depths can be conveyed. For this purpose, on the one hand, wireless sensors can be used, for example, in a load detection module, which scan the load platform in a substantially horizontal plane from the superstructure and determine the distance of the load to the superstructure. Examples include ultrasonic sensors, infrared sensors, radar, LIDAR, capacitive distance or depth sensors, laser distance sensors, and/or 3D cameras. In an alternative aspect, upward-facing sensors may be used to determine the payload in the vertical plane. For this purpose, either continuously or at discrete intervals, sensors may be embedded in the load platform and/or measure through the load platform. These sensors can be, e.g. in the continuous variant, load cells, for example strain gauges, which are embedded in the surface of the load platform. They can also be infrared sensors, which are embedded in the surface and detect the points at which a load is located on the load platform.

The aforementioned load detection module is configured in such a way that the load detection module can use the sensor data to determine the position of the load on the load platform and make this information about the position available within the memory of the AIT for further analysis. In one embodiment, a laser distance meter, e.g. with an extended measuring spot (e.g. from the company Keyence) is located inside the enclosure with the drive unit. The extended measuring spot increases the probability that the laser of the laser distance meter actually hits the goods carrier. In one aspect, this laser distance meter is offset so far inward into the enclosure that the dead zone of the laser distance meter (minimum measuring distance within which it is still impossible to make a precise measurement) is inside the enclosure and can be measured completely along the load platform. This allows the load to be conveyed as centrally as possible on the AIT, which increases the stability of the load during travel. In an alternative aspect, the laser distance meter is located in an enclosure on the load platform. In order to measure within the dead zone, this enclosure contains, for example, a contact sensor such as a limit switch that detects when a load is picked up to the inside end of the load platform and/or occupies the entirety of the load platform, thereby triggering the limit switch.

In an additional, optional aspect, the energy or current flow required to raise, lower and/or hold the load platform is determined and, from this, the mass of the goods being transported is determined, for example in order to evaluate the load on this basis. Alternatively and/or additionally, at least one load platform load sensor can be designed as a load cell, for example as a strain gauge, which is used to determine the mass. This function is stored in the optional load detection module. In addition, a sensor determines the position and/or a change in position of the load platform. In one aspect, the revolutions of the motor and/or a gearbox or gearbox component are counted here, e.g. by means of an encoder or incremental encoder on the shaft and/or integrated Hall sensor, with a stroboscopic tachometer, tachogenerator, inductive sensor (for measuring the induction voltage on windings during the short pauses in actuation of the motor controller—is speed-proportional), and/or Wiegand sensor. In an alternative aspect, a stepper motor is used to count the steps. The mass m can be derived from this as m=energy/(g*height), where g is the acceleration due to gravity.

In one aspect, the AIT or an external system connected to the AIT can evaluate the load on the AIT. For this purpose, rules are stored in the memory of the AIT, for example, that allow the corresponding mass to be determined for a defined current flow or for the required energy. The determined value of the mass can, in one aspect, be compared with values stored in a memory for the mass that the AIT is to transport in the scope of a transport order. For this purpose, the AIT retrieves data stored in a memory for the load to be transported, including, in one aspect, information about the weight of the load in addition to the pick-up position of the load and the target position of the load. In an alternative aspect, the AIT determines the mass of the loads to be transported over time, stores the mass, and calculates an estimate of the mass of each load associated with a transport order. When a new load is lifted in the process of completing a transport order, the AIT determines the new mass, compares it with the mass of past transport orders stored in a memory, and uses the calculated differences to determine whether the measured mass approximately matches the mass from past transport orders.

The determined data on mass and transport order, such as location and time information, dimensions of the load, etc., can be classified in one aspect in order to derive rules from this data. For example, an order involving a certain route and a certain time can be associated with certain masses, in which case the AIT can derive the route, e.g. from the presence of the mass value. If deviations from this are determined, the AIT can change a value in a memory, notify another system, or adjust a signaling parameter that triggers a traffic light signal, for example. In summary, in one aspect, validations of the recorded load can be performed, for example, in order to recognize errors within the production system or within the production sequence, such as the assignment of incorrect parts or incorrect quantities to a machine. This is of particular interest for production sequences in which, for example, automated parts transport is carried out between production cells by means of an AIT. For this purpose, the determined data is compared directly or indirectly with data stored in a production planning system. "Indirectly" means that, within a memory unit, for example, a concordance can be established between the weight of loads to be transported and the production quantities stored in a production planning system. The determined mass of the transported goods can be made available to other systems via an interface.

On the software side, the AIT is equipped with a navigation module, a 2D and/or 3D environment detection module and a mapping module with a map of the environment in which the AIT is moving. This map can, for example, include "forbidden" zones, such as manhole covers, water gutters, expansion joints, door thresholds, stairs, etc., which can cause strong vibrations of the AIT when driven over, thus endangering the load. In addition, the navigation module has a self-location module, preferably within a mapped environment. A path planning module ensures that the AIT can efficiently calculate its own path to be traveled and assess the work required with respect to certain criteria. A movement planner uses, among other things, the path planning results from the path planning module and calculates an optimal path for the AIT, considering/optimizing various cost functions. Besides the path planning data, other cost functions include data from obstacle avoidance, a preferred direction of travel, etc. The dynamic window approach, which is well known in the state of the art, is used for this purpose.

A charging module for automatic charging ensures that the AIT automatically locates a charging station when the energy level is low, docks there and charges its rechargeable battery. In one aspect, the AIT may also be configured in such a way that it can be charged directly when interacting with a machine (e.g. while picking up a load from a machine) and/or when waiting at or near that machine. For this purpose, the AIT may have front or rear charging contacts, sliding contacts, and/or an inductive charging device. In addition, there is a load detection module that is used to determine the position and/or weight or center of gravity of a load on the load platform.

The AIT also has a communication module for AIT-to-AIT communication. For this purpose, a short-range radio module is used, in a preferred embodiment a ZigBee or Bluetooth module, in addition to WLAN and/or the communication technologies listed above. This communication module is configured in such a way that the communication module automatically establishes radio communication to other ZigBee modules installed on other AITs. Information is then exchanged by means of a transfer protocol. During this exchange, information such as the position of the AIT (preferably on a map), the current speed, orientation in a horizontal plane, and the planned route are transmitted with a time reference (time stamp). If the AIT receives the route of another AIT, this is entered as a dynamic obstacle in the map of the AIT and/or taken into account in the path planning, preferably as soon as the distance falls below a distance threshold between the two AITs. In one aspect, priority rules are stored in the AIT, e.g. at path intersections.

Various components are implemented at the hardware level. Among them is an odometry module, i.e. a measurement and control unit for the odometry function, which is connected to the navigation module via an interface. Pressure-sensitive bumpers (or combined rubber-buffered safety edges with impact protection) are located at a distance of preferably more than 10 millimeters above the floor and allow collision detection. Alternatively and/or additionally, ToF sensors and/or so-called short-range LIDAR/radar/ultrasonic sensors can also be used as distance sensors. If a collision is detected, an immediate stop of the differential drive is triggered. This differential drive otherwise ensures the general locomotion of the AIT. A charging port (for galvanically coupled or inductive charging) with associated charging electronics allows the integrated rechargeable battery to be recharged and supplied with appropriate energy from an external charging device.

The AIT has various safety devices to warn people in its vicinity. These include audible alerts (siren, buzzer/beeper, etc.), visual alerts such as safety lights, and a projection unit that projects light signals onto the floor in the direction of travel in order to indicate and thereby provide a warning that the AIT will be moving along at that location. As a result of speed monitoring, an AIT controller can forcibly abort the movement if the desired target speed cannot be reached within a defined time interval (e.g. by moving onto steep ramps that can only be overcome by higher acceleration; AIT is actively pushed, etc.). Monitoring can be direct or indirect, i.e. on the one hand, the speed can be monitored directly, on the other hand, indirectly derived parameters such as speed at the wheel and/or motor, torque, current, etc. can be monitored. This results in a forced interruption of the travel movement by active braking by means of the motors and/or a separate braking device down to a speed of zero and then switching off the electric motors so that the electric motor is no longer driven by a torque-causing force. This way, the drive train comes to a stop due to load torque or friction. Alternatively, the AIT can be configured in such a way that the motors actively maintain "zero" speed in the stopped state (while applying the necessary holding current or holding torque), such that if the AIT is on sloping terrain, it cannot roll away.

This or another implemented controller may additionally be further configured as follows: The sensors, especially the LIDARs, cover the relevant/important detection area and can detect obstacles/persons in a defined way. For this purpose, at least one "protective field" or typically several such protective fields are defined within a memory of the sensors that consists of threshold values in two-dimensional space. As soon as an obstacle or a person is recognized in this area, the sensor passes on this information about the obstacle or person to the controller. This controller in turn reduces the maximum speed to a defined level (and, if necessary, the AIT is also braked heavily). As the person or obstacle gets closer to the AIT, further protective fields are activated ("triggered") and the speed is reduced further, if necessary until it stops completely. The magnitude of the defined speed results from the weight and also from the geometry of the AIT and/or the buffer properties of the safety edge or other bumper. It must be ensured that, in the event of a possible collision with a person, the resulting force is so small that no injuries can occur to the person.

Furthermore, the protective fields within the sensors must be dimensioned in such a way that, within a protective field, it is possible to decelerate from, for example, a maximum possible speed to the defined speed; this refers to the initially defined recognition of obstacles/persons. This also means that the protective fields, in one aspect, are nested within each other and cover different distances. Thus one protective field may cover a wide range and another protective field may cover a near range. The protective field that is larger is active at a higher speed, the smaller one at a lower speed. This modulates the driving speed of the AIT according to the distance to the obstacle or person: A large distance allows high/higher speeds, a smaller distance forces correspondingly lower speeds up to standstill/stop and switched-off drive torque. Active braking, e.g. by the motor or a separate brake, may be necessary.

The limits of one or more protective fields depend on the current speed of the AIT and the angle of impact, e.g. steering to change the direction of travel. At higher speeds, the protective field boundaries are further out relative to the vehicle edge, or the outer protective fields are active. Analogously, the protective field boundaries are set outwards in the steering direction. At lower speeds, the protective field boundaries are set closer to the vehicle, or protective fields further inwards are active (and the outer protective fields are canceled accordingly).

Furthermore, the transmission of sensor data takes place in two channels, e.g. analog on one channel and digital on the other. In one aspect, the speed is determined by determining the motor rotation, for which two different physical conversion principles are used. Overall, state information is obtained that has almost identical—or, ideally, completely identical—values. For example, in one aspect, the rotational speed of a motor is determined using rotational angle sensors such as a) integrated Hall sensors and b) encoders or incremental encoders or digitally captured rotation angle data. In one aspect, other ways of determining speed are possible, for example by using such or similar sensors directly on the wheels. Alternative aspects cover camera evaluations that, for example, determine the movements of recognized features in the image for a defined viewing window. Here, a camera can be directed at a surface, e.g. the floor or a side wall, and the speed can be determined on the basis of measured changes in the surface structure relative to the autonomous vehicle, in particular if the viewing window of the camera has a defined size, which is the case if the floor is largely flat and the viewing distance of the camera to the floor is constant. LIDAR data and/or data from a 2D and/or 3D camera determined with reference to the relative change in position of obstacles and/or landmarks in the vicinity of the AIT, etc., may further be used. In one aspect, these may be included in a map of the AIT.

The controller itself evaluates the received sensor data. For example, the sensor data from a) and b) are compared in the processor of the controller and, if it matches, whereby a minimum difference due to the measuring technique is allowed, it is accepted as a valid sensor source for the controller. Otherwise, the controller brakes the movement and brings it to a standstill.

The processor of the controller itself is monitored by a watchdog, which switches off the drive motors as soon as the controller is no longer supplied with current. In the process, at least one (actively controlled) semiconductor element, such as a MOSFET switch, which is/are conductive in the de-energized state, first electronically short-circuits the windings of the motor and then, in parallel, a relay mechanically short-circuits them. Due to the induction voltages (motor shaft still rotating), a very large current flows through the short circuit, which has a strong braking effect. In addition, an active mechanical brake can be provided, which is mounted on the wheel or motor axles, is electrically controlled and requires a minimum supply voltage for the brake to release. That is, in the event of a power failure, the brake automatically falls into the idle state and locks (like a dead man's switch). This hardware-implemented mechanism ensures that—even if application-level software instructing the AIT, for example, to move a load quickly does not recognize the obstacle and wants to continue to move rapidly—the hardware will brake the AIT to a defined speed, where the defined speed can be 0.

In one aspect, the loads that the AIT transports may be trolleys configured to have goods carriers with components stored on them, which may also be stacked. Such trolleys may be of various dimensions. In one application scenario, the trolleys have a width of 40 cm, for example. The trolleys may be lined up in rows and there may be multiple rows adjacent to each other, in part less than 3 cm apart. In one aspect, the casters of the trolleys are supported in rails, for example monorail rails, e.g. from the company Orgatex. In an alternative and/or additional aspect, at least one marking and/or guide line is located on the floor centrally between the trolleys. Such marking and/or guide lines may be positioned other than centrally. In one aspect, they may also be projections, patterns, or attachments such as rails, etc. on the floor. Nevertheless, these various aspects are collectively referred to as marking and/or guide lines for the sake of simplicity.

At the beginning of a row of trolleys, there are devices on the floor to identify the rows. These may be identification codes in 1D, 2D or 3D, such as barcodes, QR codes or Aruco markers fixed on the floor. However, these devices may also be RFID tags placed there. In an alternative aspect, these markers or RFID tags are located on the existing rails. In an alternative and/or additional aspect, these markers or RFID tags are located on the trolleys and/or the goods carriers on the trolleys, allowing direct detection of the load. In an alternative and/or additional aspect, these markers or RFID tags are attached to pallets and/or to other embodiments of the load to be transported. In the case of 1D, 2D or 3D identification codes such as barcodes, QR codes, etc., in an alternative aspect, these identification codes may also be projected onto the floor and/or other surfaces where the identification codes can be read by the AIT. In an alternative and/or additional aspect, the identification codes may be light-emitting markers and/or displays.

Via the wireless interface, the AIT may receive instructions to take a specific position in the room or move per a predefined schedule, which may also be stored locally in the AIT. It can also receive instructions to pick up a specific load, in one aspect the trolleys mentioned in the previous section. To do this, the AIT first navigates to a position in the room where the load to be picked up is located (rough navigation) and stops, for example at a distance of 70 cm to the supposed position. These movements are carried out in the forward gear of the AIT.

This is where the fine orientation begins. For this purpose, the AIT turns and uses its sensor technology, which is located at the front of the load platform (and thus at the rear of the AIT), to scan the area where the load to be transported is located. In one aspect, the AIT directly detects the load via the sensor technology mentioned above, e.g. RFID tags. In an alternative and/or additional aspect, the AIT uses the camera to detect an identification device for identifying a row, such as a 1D, 2D or 3D identification code, e.g. an Aruco marker, located, for example, in the center or on the outer border at the beginning of a row of trolleys. In case the identification devices are RFID tags, an RFID reader is used instead of the camera. If these identification devices are not on the floor, but rather elsewhere, these identification devices are detected in an equivalent way. The information contained in the identification devices, e.g. an identification code, is compared with an identification code stored in a memory, which also contains position information and is synchronized with the map in the navigation module. This enables the AIT to check whether it is actually in front of the load that it is looking for. If this is not the case, the AIT can, for example, approach a row of trolleys that is in the vicinity, e.g. immediately adjacent, as part of the fine orientation process.

Next, the sensor technology at the front of the load platform, in particular the camera, detects the position of a marking or guide line. In one alternative aspect, in which rails are used for the trolleys instead of marking or guide lines, these rails are also detected by the sensor technology. Unless the AIT is centered between the rails or central to the marking/guide line or any other identification devices describing the orientation of the trolleys and thus parallel to these trolleys, the AIT performs a travel maneuver, e.g. in an S-shape, to position itself correspondingly. The AIT is thereby aligned parallel to the marking or guide line, rail and/or identification device and thus also parallel to the sides of the parked trolleys, maintaining a distance from the sides of these trolleys that is greater than 5 mm, e.g. 30-50 mm.

The AIT then moves parallel to the marking and/or guide line towards the trolleys standing in the row. In the process, the AIT is also able to detect empty rows, e.g. by following the marking and/or guide line to the end and not detecting any obstacle and/or trolley and/or via the 2D/3D environment perception devices integrated on the AIT. In an alternative aspect, the at least one distance sensor scans the depth of the row, compares this determined depth to row depth data stored in memory, and determines whether obstacles or trolleys are present in this scanned row. In one aspect, this can be carried out by at least one sensor at the front of or below the load platform, or, in an alternative and/or additional aspect, by the at least one sensor above the load platform.

If the AIT detects a trolley, the AIT moves up to the trolley or moves the load platform below it. The AIT has information in its memory about the depth of the trolleys, which can be, for example, 40 cm and 60 cm (but may also include other dimensions). If, for example, the trolley is 60 cm deep, the AIT moves under the trolley until the distance sensors above the load platform detect that the trolley has reached the end of the load platform. If, for example, the trolley is only 40 cm deep and thus has a depth that is less than the length of the load platform, the AIT moves under the trolley until the distance sensors above the load platform detect that the trolley is positioned on the load platform with a length of approx. 40 cm, for example, but the load platform does not extend significantly under the trolley. At this juncture, a difference calculation is performed in one aspect in which the length of the unloaded area detected by the distance sensor is subtracted from the known total length of the load platform. In addition, in at least one aspect, information from a memory describing the length or depth of the load to be picked up may also be used.

In an alternative and/or additional aspect, a sensor is located at the end of the load platform (and on the side from which the load is picked up) which faces upward and can detect whether the load extends beyond the end of the load platform. This can be a laser distance sensor, an ultrasonic sensor, a ToF sensor, LIDAR, radar, etc. If, for example, this sensor or another sensor (e.g. the sensor described in the previous paragraph or the evaluation of the sensor data being executed in the processing unit of the AIT) detects that a load is extending beyond the load platform, rules can be stored in one aspect in the memory of the AIT in order to ensure that the load is set down again. This is the case in particular if there is an entry in the memory that the load to be retrieved has a depth that is less than the depth of the load platform. In one aspect, the AIT determines the dimensions of the load via values stored in a memory and, in one aspect, takes these dimensions into account when determining the overhang.

After the load is set down, the AIT can pick up the load again. In one aspect, the AIT can navigate to the load again, e.g. reorienting itself using the guidance lines. For example, if the load is detected as extending beyond the load platform twice consecutively, the AIT may send an error message to a system connected to the AIT via the wireless interface. The AIT can also activate a signal light and/or assume a waiting position, as in the case of the detection of further errors in the sequence, etc. The waiting position is preferably assumed in areas that are stored as possible waiting areas on the map stored in the navigation module.

The load platform is then raised in such a way that the load can be moved by the AIT, e.g. by a range of about 20 to 30 mm, so that the supports/support points or wheels of the trolley (or of other load to be picked up) are reliably lifted from the ground. The AIT moves straight and parallel out of the row and then navigates to the target position (rough navigation). Here, the correct row is detected (fine navigation) as before with the identification of the load to be picked up. The AIT turns and aligns the load platform in the direction of the row, positions itself centrally in front of the row in which the load is to be deposited, and reverses into the row, as has already been described respectively for the load pick-up process.

The AIT then determines the point where the load is to be set down. The unloading point may be a machine, a warehouse, a set-down point, etc. In one aspect, it is an area for parking trolleys, for example, in the form of a row. In this case, the AIT first determines whether the row is empty using at least one sensor at the front of or below the load platform or, in an alternative and/or additional aspect, by the at least one sensor above the load platform. If the row is empty, the AIT drives in one aspect to the end of the marking and/or guide line, if necessary while scanning for any obstacles, in particular trolleys parked there. In an alternative and/or additional aspect, the AIT may initially check whether the row is empty. If the row is empty, the load is deposited at the end of the row and the AIT moves forward again out of the row. If the row is not empty, the AIT moves up to the detected obstacle, preferably a trolley already parked there, and preferably to a distance of less than 3 cm, deposits the load there and drives forward out of the row again.

The AIT is connected via a wireless interface to a database containing information about loads and their positions. In one aspect, the size of the trolleys or the loads to be transported (pallets, etc.) and/or their mass or weight are also stored as further attributes. In one aspect, this may be an inventory management system. This database is synchronized with the navigation module. In one aspect, the database is configured in such a way that at least one row (preferably multiple rows) in which loads to be transported may be located are stored at a pick-up location, for example a storage station for parts to be transported. This includes, in one aspect, at least also a device for identifying a row, its local position and/or also the absolute position of the rows or the relative position of the rows to each other. Thus, as described above, the AIT can determine its position by reading a device for identifying a row, e.g. by querying the coordinates of this device in the database. The database is also configured in such a way that the loads to be transported and/or other loads are stored in the database, including their spatial assignment. This may include, for example, that a type of load to be transported is kept in four rows with three platform dollies each, all of which are to be transported.

On the basis of rules, the database may specify the order of the loads to be transported and, in one aspect, the route to be taken by the AIT. With respect to loads held in rows, this means that the row and the position within the row are put into a sequence in which the loads are picked up by the AIT for transport purposes. Accordingly, the database records the sequence in which the loads have been transported by determining the distance traveled by the AIT by means of the odometry module and/or optical sensors for position determination. Furthermore, the database and/or a memory connected to the database is/are used to store rules associated with the transport orders and/or the spatial positions of the loads to be transported, which may include instructions to the AIT to trigger certain control operations. In one aspect, this may mean controlling a door and/or lock, triggering its opening and/or closing, for example. In an alternative and/or additional aspect, it may also mean an error and/or alarm message that triggers signals at the AIT and/or via a wireless interface that require, for example, manual intervention at the AIT.

The AIT is configured in such a way that a map divided into different zones is stored in its navigation module. In one aspect, the map consists of different levels that are optionally available. For example, one of the levels accounts for the energy consumption resulting from payload, slope, coefficient of friction of the floor, etc. Another level takes the density of moving obstacles into account. Another level indicates fixed obstacles that need to be avoided without the fixed obstacles necessarily being recognized by the sensor technology usually used for position determination, such as a camera, LIDAR, etc. Another level accounts for obstacles recognized by the sensors named above. Another level may include traffic rules, e.g. a preferred direction of travel, a right-hand driving rule, one-way street rules, etc. In one aspect, the levels can also be integrated. An example is obstacles that are partially unrecognized or only poorly recognized by the sensor technology and zones that are subject to certain traffic rules. In an alternative and/or additional aspect, at least two levels are used for navigation purposes.

In addition, the AIT is connected to a management system that can provide instructions to the AIT for transporting loads and that is configured in such a way that it can prioritize tasks for the AIT. In an alternative aspect, the management system is implemented in at least one AIT. This prioritization is performed based on the following parameters and may be performed in one aspect by simultaneously optimizing at least one of the following parameters, which are represented as cost function(s):

the type of loads to be transported
the distance to be covered
the life (residual capacity, i.e. "state of health" SoH) and the state of charge ("state of charge" SoC) of the rechargeable battery
the urgency of the order
the maintenance status of the AIT, in particular the time remaining until a maintenance event
any technical problems of the AIT or its maintenance status
the availability of other AITs
the characteristics of the AIT relevant to the transport, e.g. dimensions of the load platform, maximum load weight, possible lift height of the load, etc.

In another aspect, the AIT determines its operating time or the operating time of individual components or otherwise measurable factors influencing the service life of a component, stores these if necessary, and compares these times with corresponding times stored in a memory. In one aspect, a difference between the times is formed and compared with threshold values stored in the memory. If a threshold value is not reached, a cost function is generated for the movement planning that is taken into account for movement planning. This may, in one aspect, relate to the possible operating time of the rechargeable battery, which calculated as the product of the life of the rechargeable battery (state of health—SoH) and the state of charge—SoC).

Alternatively, an AIT may exhibit a higher degree of wear, lack of lubrication or similar problems in the drive and therefore require more energy to drive than other AITs. If this has reached certain minimum ages in operating hours, charging cycles and/or metrologically determined SoH states, the AIT (and/or a higher-level fleet management system) resultantly reduces the number and/or length of trips until the rechargeable battery is replaced.

In an alternative and/or additional aspect, the AIT or a higher-level fleet management system can distribute transport orders across multiple AITs in such a way that transport orders associated with shorter travel distances are primarily assigned to AITs that need to be recharged more quickly due to their rechargeable battery capacity and/or life, and/or that are not expected to travel as great a distance due to other wear parameters in order to avoid any consequential damage. That is, these AITs have a comparatively low rechargeable battery capacity and/or life, and/or increased wear parameters of other components.

In an additional embodiment, the differential values are stored in a database and the AIT or a higher-level management system generates a prediction for a point in time when a certain threshold value is reached. This prediction may alternatively and/or additionally be integrated into the movement planner. In one aspect, the prediction may be implemented in such a way that an average value per week is formed, the difference from the threshold value is calculated, and this value is divided by the average value per week in order to obtain the number of weeks when the threshold value is reached. Predicted values can be stored in the management system mentioned above. In an alternative and/or additional embodiment, these values are transmitted via a wireless interface to a management system that generates the predictions and transmits them back to the AIT.

In one aspect, the AIT has a continuous monitoring of the energy consumption, the estimation of the residual capacity of the rechargeable battery and a predictive function for when a state of the rechargeable battery is reached that requires charging. This can be determined mathematically, e.g. via the integral of $U(t)*I(t)*dt$, where the parameter U represents the instantaneous voltage, I the instantaneous power consumption, and t time.

In one aspect, a sensor system connected to the controller measures the voltage of the rechargeable battery cells over time, compares the voltage drop to values stored in a memory, and determines a time when the capacity of the rechargeable battery has fallen below a threshold value. In addition, the AIT has stored in its memory common time periods for how long it takes to charge the rechargeable battery depending on the residual capacity (SoH). In one aspect, this may imply a complete charge of the rechargeable battery, and, in another aspect, a charge time for guaranteeing, for example, a fixed operating time of the AIT, which means below the total operating time when the rechargeable battery is initially nearly fully charged. The AIT may consider not fully charging (e.g. to only 50% or only 25%, the value of which may depend on a prediction of the coming order volume) if, for example, it can be expected at a certain point in time that transport tasks will be interrupted (and it has sufficient remaining travel distance until then), e.g. because the end of a shift has been reached, though until then the AIT is still expected to perform further transport tasks.

In one aspect, the predicted idle time of the AIT during which it does not process any orders may be, for example, 20 min, and, in one aspect, this may be a period during which the rechargeable battery can be fully charged, for example. In an alternative and/or additional aspect, an order volume can be predicted, for example, in which the autonomous vehicle does not process any orders for a period of time that correlates to at least 50% of the usual charging time for the rechargeable battery of the autonomous vehicle, which in turn can then be planned as a period of time for (further) charging the rechargeable battery. The AIT therefore has a system for adaptive charging duration adjustment by referring back to a prediction about future orders, making a prediction about the remaining charge of the rechargeable battery and, in the case of a residual capacity that falls below a threshold value, only partially charging the rechargeable battery if an order volume is predicted to be below a threshold value within a defined period of time. The prediction about the remaining charge of the rechargeable battery is therefore made over time.

Overall, the AIT creates a schedule for charging the rechargeable battery, which may also include information about the charging stations to be used, such as their ID and/or local position. In one aspect, the created schedule can be considered as a cost function within the movement planning of the AIT. The AIT may now transmit a predicted time interval in which rechargeable battery is to be charged, such as the rechargeable battery charging plan, to other AITs via the previously described communication module for AIT-to-AIT communication. These integrate the availability of a charging station as a cost function into the movement planning. In an alternative aspect, this information is transmitted to the management system, where it is taken into account when scheduling tasks for the AIT.

In another aspect, the AIT is configured in such a way that it can independently learn when and in what area to expect transport orders: For this purpose, the AIT is configured to store and evaluate the paths traveled in a spatially resolved manner on an hourly, daily, weekly, and/or monthly basis and/or according to other seasonal aspects (or over one or more shifts). From this, the AIT generates for each point in time a probability with which it will be in certain areas on the map, whereby this can result, for example, from the ratio of the sum of added transport orders over all possible transport orders in each case over a certain period of time, e.g. as a spatial center of gravity calculation. For example, this may involve evaluating how often a transport order occurred in the 4-5 p.m. time frame in a given area of a manufacturing facility for the Tuesdays of the previous six months. If there were 14 cases of this, the probability of this is 14/21 weeks, i.e. 66%.

In the case of a waiting process in which the AIT has no order, i.e. is idle, the AIT positions itself in the areas on the map in which it has a high probability of having to execute an order or where this probability is above a threshold value. This reduces the time to travel to the respective starting point or the next free charging station should an order arrive.

The AIT may also transmit such information to the management system, thereby making it available to other AITs. In an alternative aspect, this information is transmitted via the AIT-to-AIT communication module, thereby making it available to other AITs. The AIT is also able to provide its own data relating to this in order to supplement data from other AITs and, by pooling this data, to provide a better prediction of the probabilities to be expected. In this context, the type of orders can be clustered in one aspect and, if applicable, displayed in the form of Herat maps.

Provided the AIT has a waiting position, the AIT can also communicate this position to other AITs via a wireless interface. If other AITs also have idle times and determine a high probability of an order for the area in which the AIT is already in a waiting position, another waiting position is preferably suggested to the other AITs. This can be implemented, for example, by lowering the threshold value.

The AIT is further configured in such a way that the AIT identifies areas where moving obstacles are likely to be present on the map by means of its sensor technology and/or via the communication module for AIT-to-AIT communication. For this purpose, during operation and/or any waiting periods, movements of objects in the vicinity of the AIT are recorded and stored by the sensor technology and/or the communication module for AIT-to-AIT communication in a spatially resolved manner at hourly, daily, weekly and/or monthly intervals (or with regard to shifts). The AIT and/or a management system which receives data from the AIT for this purpose and in turn transmits the results to the AIT can use the stored data to make predictions about when and where moving obstacles are to be expected. For this purpose, probabilities of occurrence are again evaluated, e.g. as outlined above. In a next step, if the AIT has no transport orders to complete, the AIT can assume a waiting position in areas where the predicted number of moving obstacles is below a threshold value at or during the predicted waiting time.

The AIT is further configured to distribute transport tasks across multiple AITs, for example. For this purpose, the AIT is capable in one aspect of performing peer-to-peer control of a fleet of AITs which is located, for example, within a site, hall, etc., or within an area defined on a map. Here, decisions made by an AIT based on rules stored in a memory are forwarded to other AITs via an interface, either the communication module for AIT-to-AIT communication, a WLAN module, or another radio interface. In one aspect, the criteria or the values assigned to the criteria that were used for decision-making, e.g. information about the availability of other AITs, are also transmitted.

After transmission of the decision and, if applicable, the decision criteria or values of the decision criteria, if an AIT has new information that affects, for example, at least one value of the decision criteria, this AIT can perform a recalculation. The decision to be made preferably concerns the same area as the previous decision. This recalculation may result in a different resource planning for at least one AIT. If a different resource planning is calculated in this way, it is, in one aspect, retransmitted to other AITs. Alternatively, such calculations may be performed by a system connected to the AIT via an interface.

BRIEF DESCRIPTION OF THE DRAWINGS

The following will describe the invention in greater detail with the aid of the drawings. The figures show the following:

FIG. 4A is a perspective view of an AIT with sensor technology in the vicinity of the load platform in accordance with a preferred embodiment of the present invention.

FIG. 4B is a sensor unit for detecting a load on the load platform in accordance with a preferred embodiment of the present invention.

FIG. 4C is rear-facing sensor technology in accordance with a preferred embodiment of the present invention.

FIGS. 6A-6C shows an AIT picking up a load

FIGS. 7A-7D illustrate fine navigation of an AIT in accordance with a preferred embodiment of the present invention.

FIGS. 20A-20B are diagrams illustrating overhang of the load—measurement on load platform in accordance with a preferred embodiment of the present invention.

FIG. 21 is a diagram of multi-level maps in accordance with a preferred embodiment of the present invention.

DETAILED DESCRIPTION OF THE INVENTION

The invention will now be explained with reference to several embodiments. These embodiments are an autonomous industrial truck. The principles applied in the embodiments may also be that of other autonomous vehicles, including various mobile robots configured for different applications.

Figure 1:
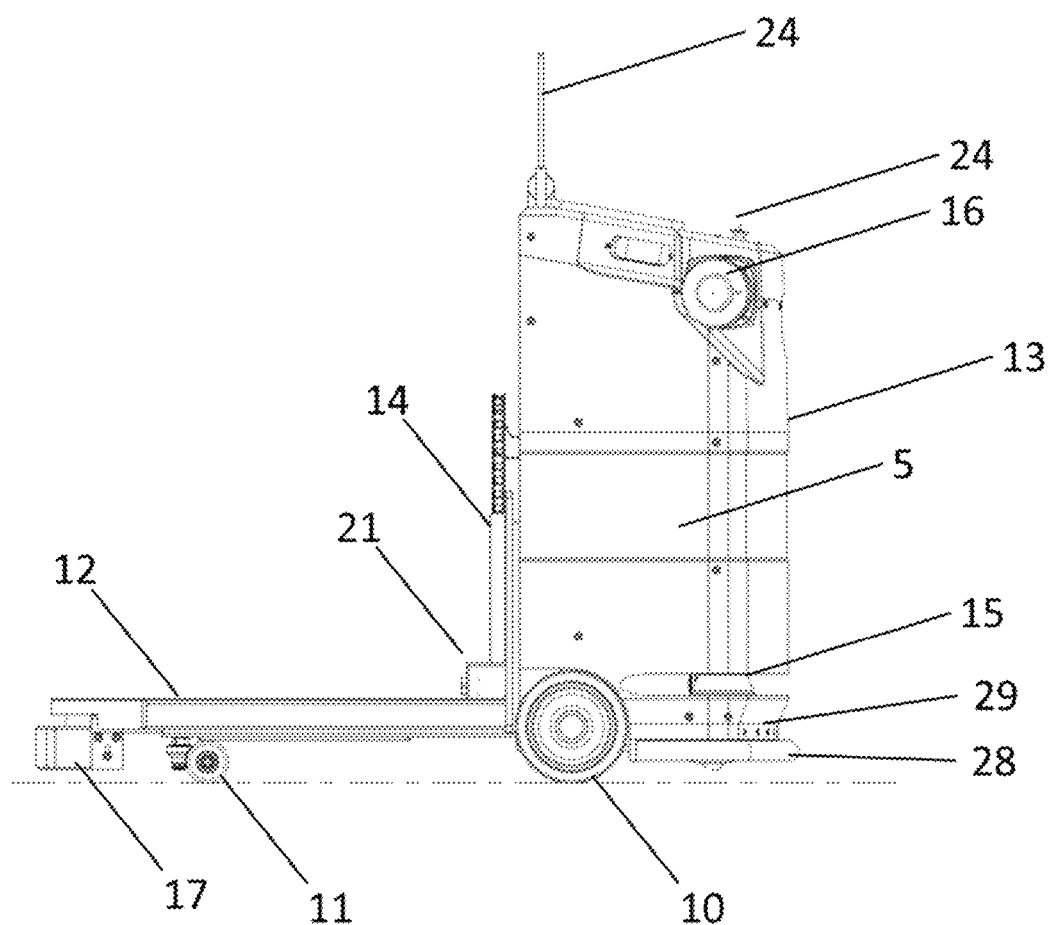
FIG. 1 is a side view of an AIT in accordance with a preferred embodiment of the present invention.

FIG. 1 depicts a side view of one embodiment of an AIT 5. Below the superstructure 13, which is located at the front, are the drive wheels 10. Below the load platform 12, which is adjacent to the superstructure 13 and located at the rear, is a caster 11. At the end of the load platform 12 and below the load platform 12 sits a rear-facing sensor unit 17 having, for example, a rear-facing sensor unit LIDAR 18, a rear-facing sensor unit camera 20, and at least one rear-facing sensor unit light 19. The at least one light may be integrated directly into the rear-facing sensor unit 17 or at another rear-facing position that also allows, for example, the field of view of the sensor unit camera 20 to be illuminated. Above the load platform 12 and adjacent to the superstructure 13, there is a load platform load sensor 21 for detecting a load 143 on the load platform 12. The load platform 12 itself is adjustable in height by means of a load platform height adjustment drive 14, which allows height adjustment by at least 20-30 mm, for example, with the height adjustment being controlled by a height adjustment sensor 39. At the front of each side is a substantially vertical LIDAR 16. Forward-facing control elements 24 are fitted on top of the superstructure 13, and at least one antenna 27 for ZigBee®, Bluetooth, WLAN, or ISM/433/868 MHz (sub-1 GHz) transmission is also seated on top of the superstructure 13.

Figure 2:
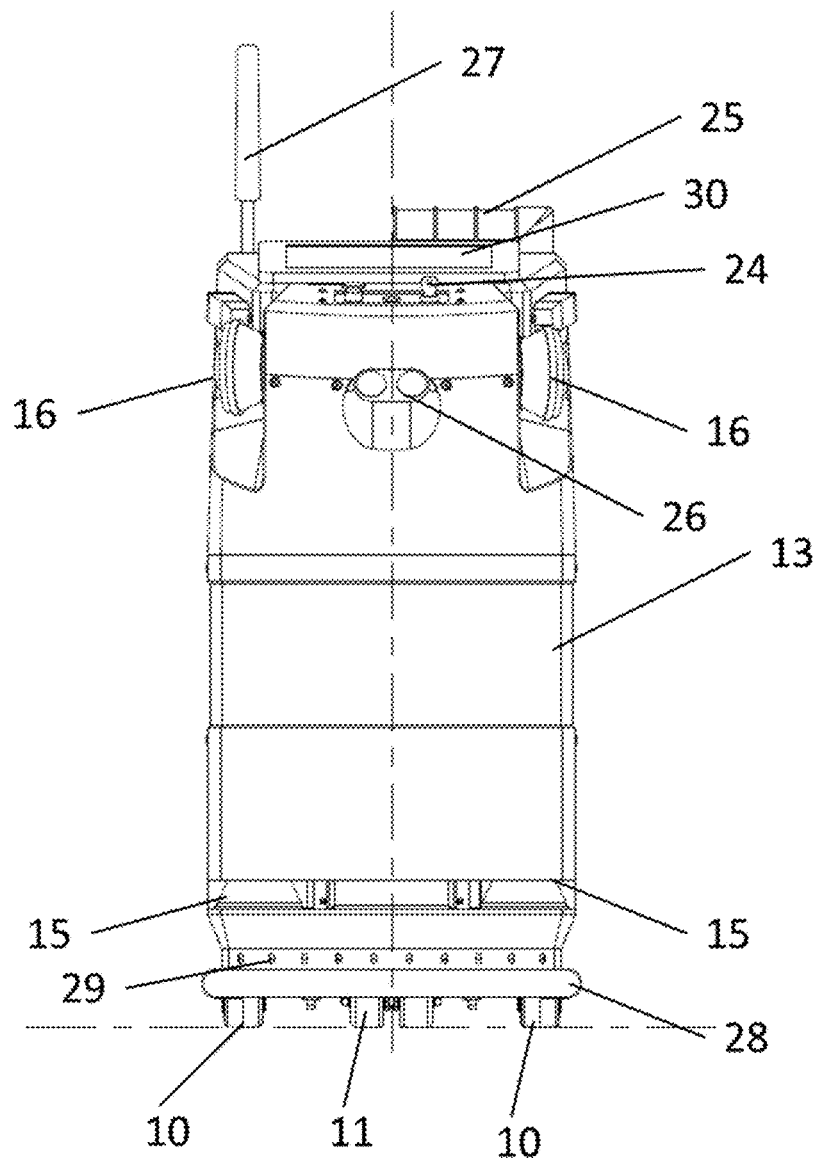
FIG. 2 is a front view of an AIT in accordance with a preferred embodiment of the present invention.

FIG. 2 shows a second embodiment of an AIT 5 from the front. The superstructure 13 is mounted on two drive wheels 10 and a caster 11, in this case a double caster. At the front there is also a pressure-sensitive bumper 28 as well as infrared ToF sensors 29 for collision detection. Two LIDAR 15, which are, for example, horizontally oriented, also scan the front area, while two substantially vertically oriented LIDAR 16 are mounted on the top of the AIT 5. Centered at the front is a projection unit 26 to project light signals onto the floor to alert people in the vicinity of the AIT 5 to the direction of travel of the AIT 5. At the top of the superstructure 13 is a panel with control elements 24 at the front, with a display 30 behind it. On top of the AIT 5, there is also at least one antenna 27 and alarm lights 25, which are designed as a traffic light.

Figure 3:
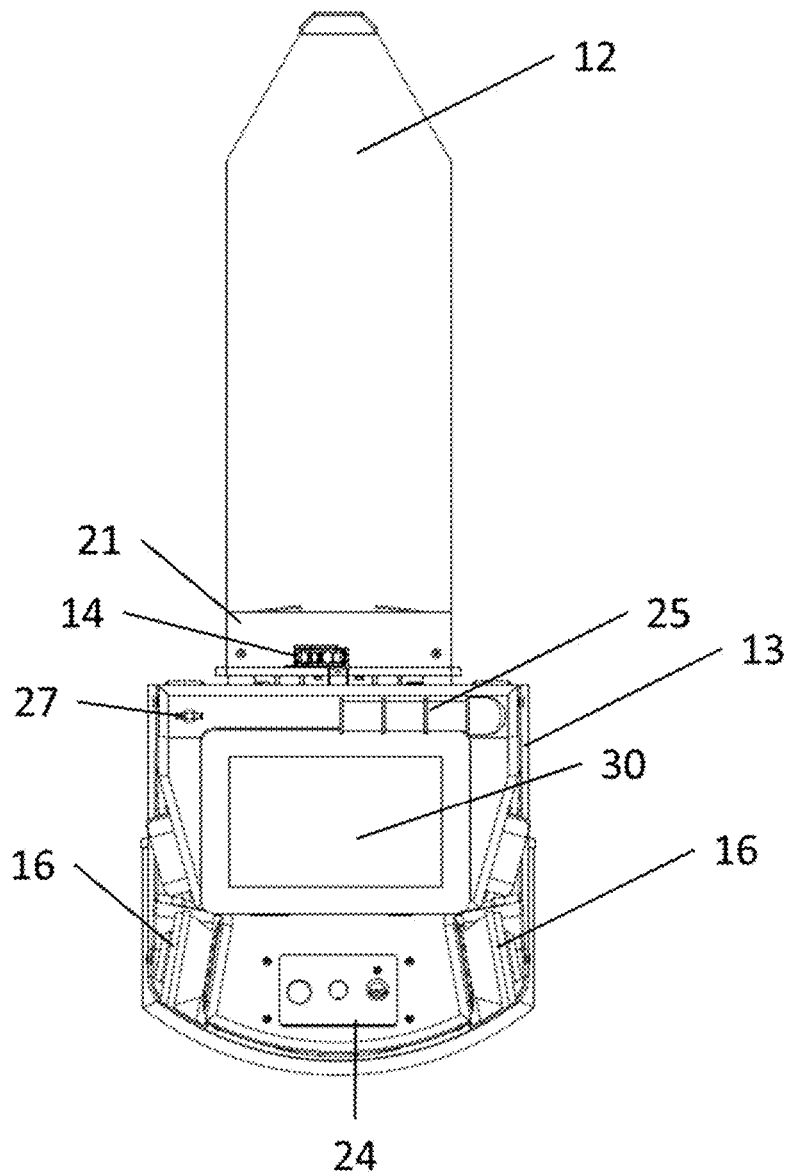
FIG. 3 is a top view of an AIT in accordance with a preferred embodiment of the present invention.

FIG. 3 shows a top view of one embodiment of the AIT 5. The display 30 is located at the top of the superstructure 13, and the panel with control elements 24 is located below it. The two LIDAR 16, which are substantially vertically aligned, are fitted on the side. Furthermore, the antenna 27 and the alarm lights 25 in the form of a traffic light are located at the top. The load platform height adjustment drive 14 is mounted so as to face the load platform 12. Mounted closer to the load platform 12 is the load platform load sensor 21 for detecting a load 143 on the load platform 12.

FIGS. 4A-4C represents an oblique rear view of one embodiment of the AIT 5. The drive wheels 10 are positioned at the bottom of superstructure 13 next to the load platform 12. To the front as well as to the side are the pressure-sensitive bumper 28 and infrared time-of-flight (ToF) sensors 29. To the side at the top are the substantially vertically mounted LIDAR 16. On top of the superstructure is the panel with control elements 24, alarm lights 25 in the form of a traffic light, and at least one antenna 27. Fitted on the side of the superstructure 13 towards the load platform 12 is the load platform height adjustment drive 14 for adjusting the height of the load platform 12. Below or in front of this is the load platform load sensor 21 for detecting a load 143 on the load platform 12, which is described in more detail in FIG. 4A. A caster 11 and a rear-facing sensor unit 17 are also accommodated below the load platform 12. FIG. 4B illustrates the load platform load sensor 21 for detecting a load 143 on the load platform 12 in greater detail. A laser distance sensor 22 is located in the center and one contact sensor 23 each, in this case a limit switch, is located to the sides of it. Alternatively and/or additionally, the load platform load sensor 21 can also be recessed into the load platform (e.g. an integrated load platform sensor 44) and detect the load 143 in the vertical direction. An optional load height sensor 45, e.g. a vertically oriented LIDAR, camera, or light-based distance sensor, allows the height of a load to be detected, for example in order to validate a load 143 or to adjust driving behavior accordingly. FIG. 4C shows the rear-facing sensor unit 17, with a rear-facing sensor unit camera 20 in the rear-facing sensor unit 17 below, above this a sensor unit light 17 in the rear-facing sensor unit 17, and the sensor unit LIDAR 18 in the rear-facing sensor unit 17. Alternatively, the sensor unit camera 20 may be positioned between two sensor unit lights 17, as shown in FIG. 4D. In this case, the individual components are also not necessarily connected to each other; in particular, the sensor unit LIDAR 18 is not connected to the sensor unit lights 17 or the sensor unit camera 20. Thus the term "sensor unit" does not necessarily mean at this point that all of its components must be engaged. Rather, they are arranged close spatial proximity to each other and pursue a common goal here, namely that of rear-facing environment detection. The sensor unit camera 20 is, for example, a wide-angle camera with a CMOS sensor that has a resolution of several megapixels (chip size: e.g. 1×2.5") and a focal length of several millimeters.

Figure 5:
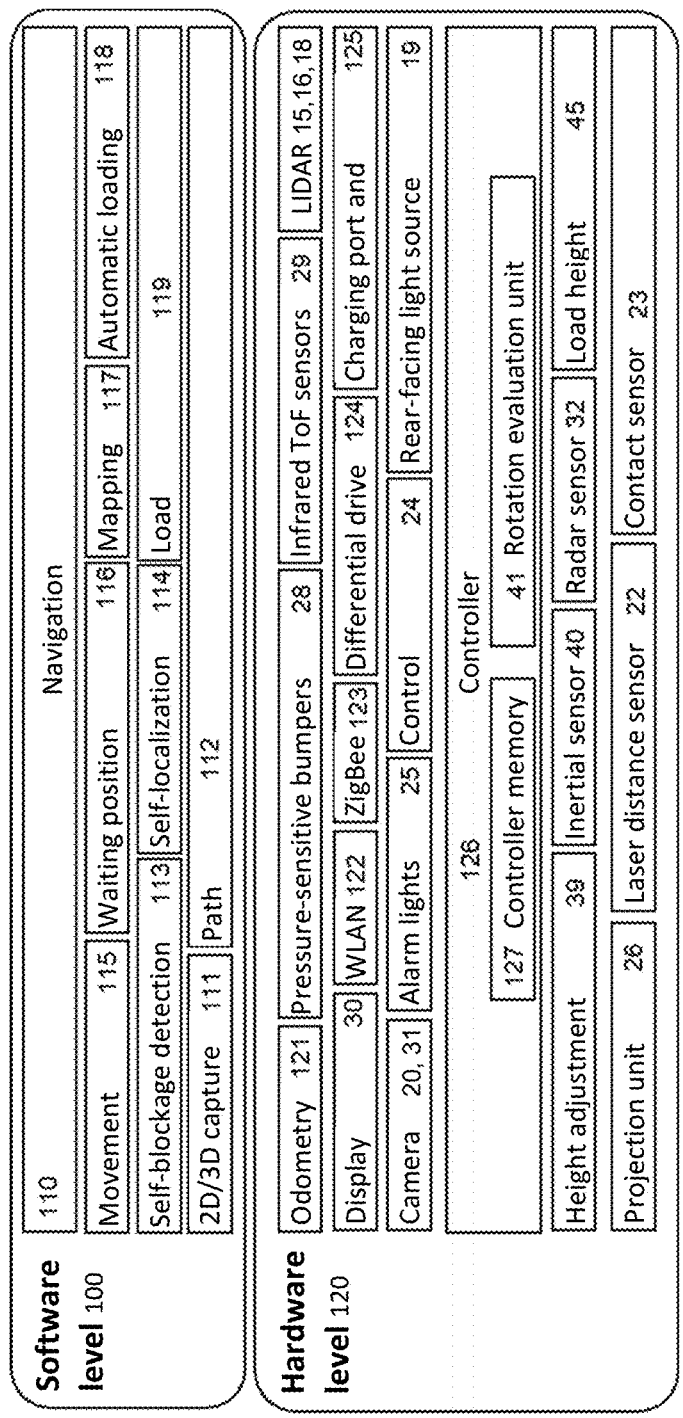
FIG. 5 is an architectural view of an AIT in accordance with a preferred embodiment of the present invention.

FIG. 5 represents an architectural view. There are two levels, the hardware level 120 and the AIT capability level 100. At the hardware level 120, there is an odometry module 121, by means of which the distance traveled by the AIT 5 is determined by measuring the distance traveled by the drive wheels 10. Pressure-sensitive bumpers 28 and infrared time-of-flight (ToF) sensors 29 are hardware-oriented mechanisms for collision detection, as are the implemented LIDAR 15, 16, 18, but they are also used for navigation, for which the sensor unit camera 20 is also used. Alarm lights 25 can warn people in the vicinity of the AIT 5, as can the projection unit 26 for projecting light signals onto the floor, which are projected in the direction of travel. A display 30 and control elements 24 allow operation of the AIT 5, which is further equipped with a wireless network such as WLAN 122, as well as with an AIT-to-AIT communication module 123, referred to as ZigBee in FIG. 5 for the sake of brevity, although other transmission standards can also be used here. A differential drive 124 with at least one motor 6 and possibly a gearbox 7 provides for the movement of the drive wheels 10. A charging port and electronics 125 are configured for charging the internal rechargeable battery 4, with the charging port being designed for galvanic or inductive charging. A controller 126 brings the sensor elements together with the differential drive 124 and ensures that an adjustment of the speed is carried out in case of obstacle detection. Furthermore, the AIT 5 has at least one rear-facing sensor unit light 19 to illuminate the field of view of the sensor unit camera 20. This rear-facing sensor unit light 19 preferably emits diffuse light in order to avoid reflections. Furthermore, a laser distance sensor 22 and a contact sensor 23 allow the detection of the position of a load 143 on the load platform 12.

At the level of the AIT capabilities (software) 100, there is a navigation module 110, a 2D/3D environment detection module 111, a path planning module 112, a self-blockade detection module 113, a self-localization module 114 for autonomous localization of the AIT 5 in its environment, a movement planner 115, a waiting position module 116 for determining the waiting position, the mapping module 117, i.e. for mapping the environment, and the charging module 118 for automatic charging, e.g. when the voltage of the rechargeable battery falls below a defined threshold value. An optional load detection module 119, which is illustrated in more detail in an example further below, is also located here.

Figure 15:
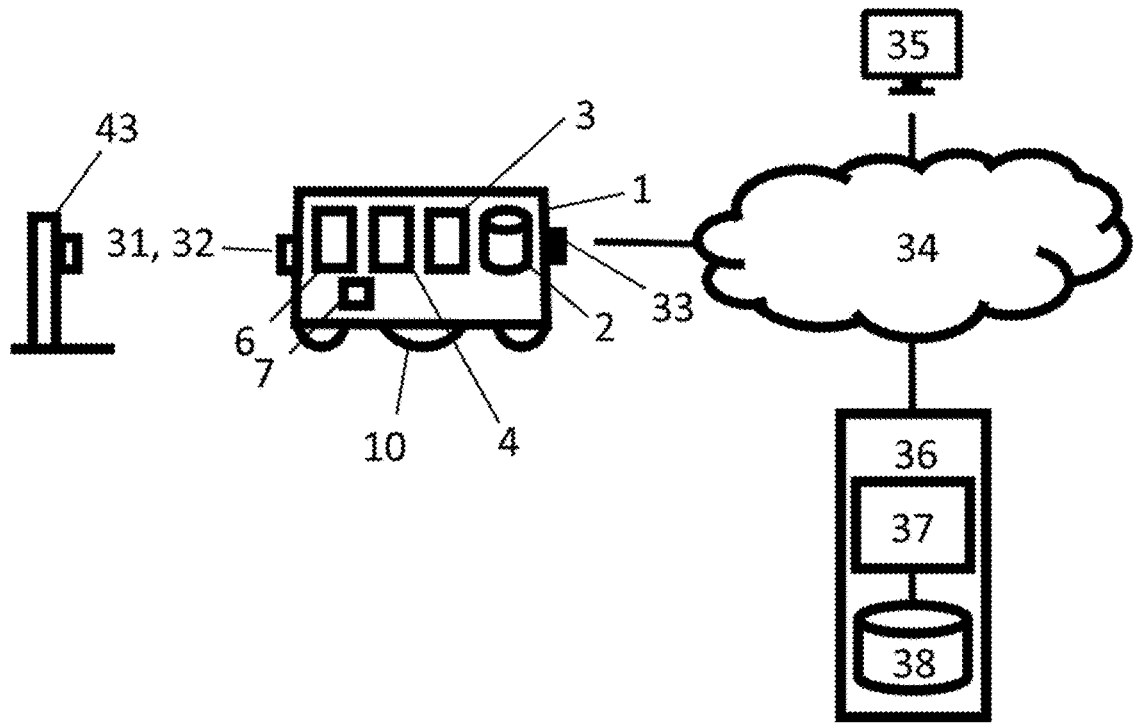
FIG. 15 is a system view of a preferred embodiment of the present invention

FIG. 15 illustrates a system view. Here, for the sake of simplicity, a mobile base 1 is assumed, having a memory 2, a processing unit 3, and a rechargeable battery 4. In addition, the mobile base has a camera 31 and/or a radar 32, possibly also a LIDAR (e.g. 15 or 16). The mobile base 1 is connected via the cloud 34 to a terminal 35 and an external system 36, which has an external processing unit 37 and an external memory 38. Furthermore, the mobile base 1 has a charging interface 33 for docking with a charging station 43.

FIGS. 6A-6C shows the procedure for picking up a load 143 and positioning it on the load platform 12. In a), if the length of the trolley 200 along with the goods carriers 204 stacked on it is shorter than the length of the load platform 12, the trolley is positioned in the front area of the load platform 12. This length is determined by the load platform load sensor 21 for detecting a load 143 on the load platform 12, for example by means of the laser distance sensor 22. If, on the other hand, as shown in b), the length of the load platform 12 is similar to that of the trolley 200, the trolley 200 is positioned until it is close to the load platform load sensor 21 for detecting a load 143 on the load platform 12, so that the contact sensors, in this case limit switches 22 are also triggered. This process ensures improved stability during transport. The load platform 12 is then raised.

FIGS. 7A-7D shows the fine navigation of an AIT 5, i.e. the sequence for positioning itself in front of a row of trolleys 200 and picking up a load 143. In step a), the AIT 5 approaches the loads 143 as part of rough navigation. The loads 143 constitute multiple rows of trolleys 200 positioned one behind the other and parallel to each other. Centered below the trolleys 200 is a marking or guide line 202, at the beginning of which is a trolley row identification device 203 for identifying a trolley row, for example a 1D, 3D or 2D identification code (e.g. an Aruco marker). In step b), the AIT 5 turns and aligns the sensor unit camera 20 in the rear-facing sensor unit 17 with the trolley row identification device 203 for identifying a trolley row, reads the identification information from the trolley row identification device 203 (using standard image processing algorithms/libraries), and compares the information to a value stored in the memory 2 in order to determine its AIT position. In one aspect, visualSLAM may be applied here. However, in the case described here, the transport order does not involve a load 143 in the second row of trolleys as shown in b), but rather a trolley 200 in the third row. In c), the AIT 5 has positioned itself directly in front of the third row by means of a turning maneuver and has moved parallel and centered into the third row until it reached the trolley 200. A memory (2, 38) (and/or from a length measurement carried out) indicates that the trolleys 200 to be transported have a depth that is shorter than the depth of the load platform 12. Therefore, the AIT 5 in d) only moves under the trolley 200 until the rear end of the load platform is just under the trolley 200, which is achieved by means of difference analyses using the laser distance sensor 22. The trolley 200 is then raised above the load platform 12 and the AIT 5 moves forward out of the row.

Figures 8A, 8B:
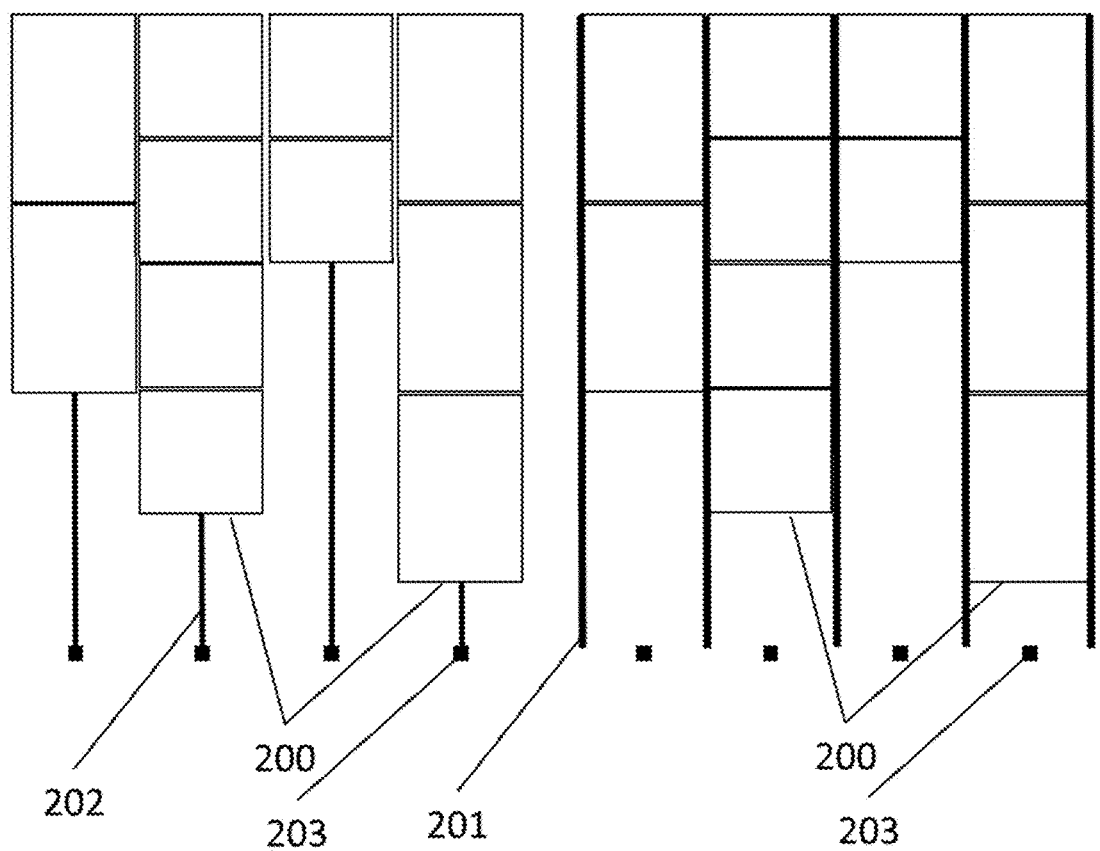
FIGS. 8A-8B illustrate center or guide line vs. rail.

FIGS. 8A-8B show the use of a center or guide line 202 vs. a rail 201 used to support the casters of the trolley 200. In both cases, the trolley row identification device 203 for identifying a trolley row is centered between the rows. It is also conceivable for the trolley row identification device 203 to be attached to one of the rails 201 in the case that rails 201 are used.

Figure 9A:
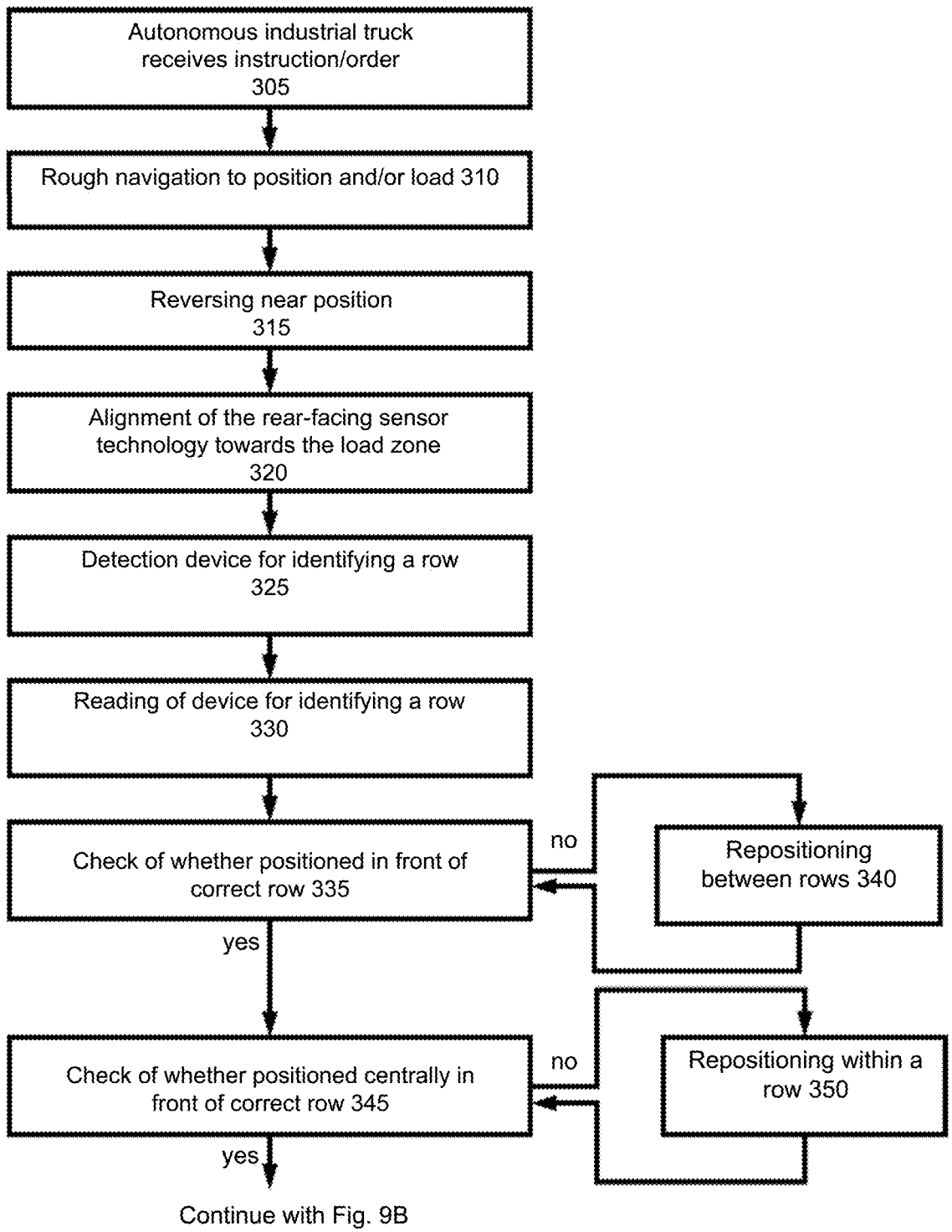
FIG. 9A-9C are flow charts of load/trolley transport in accordance with a preferred embodiment of the present invention.
Figure 9B:
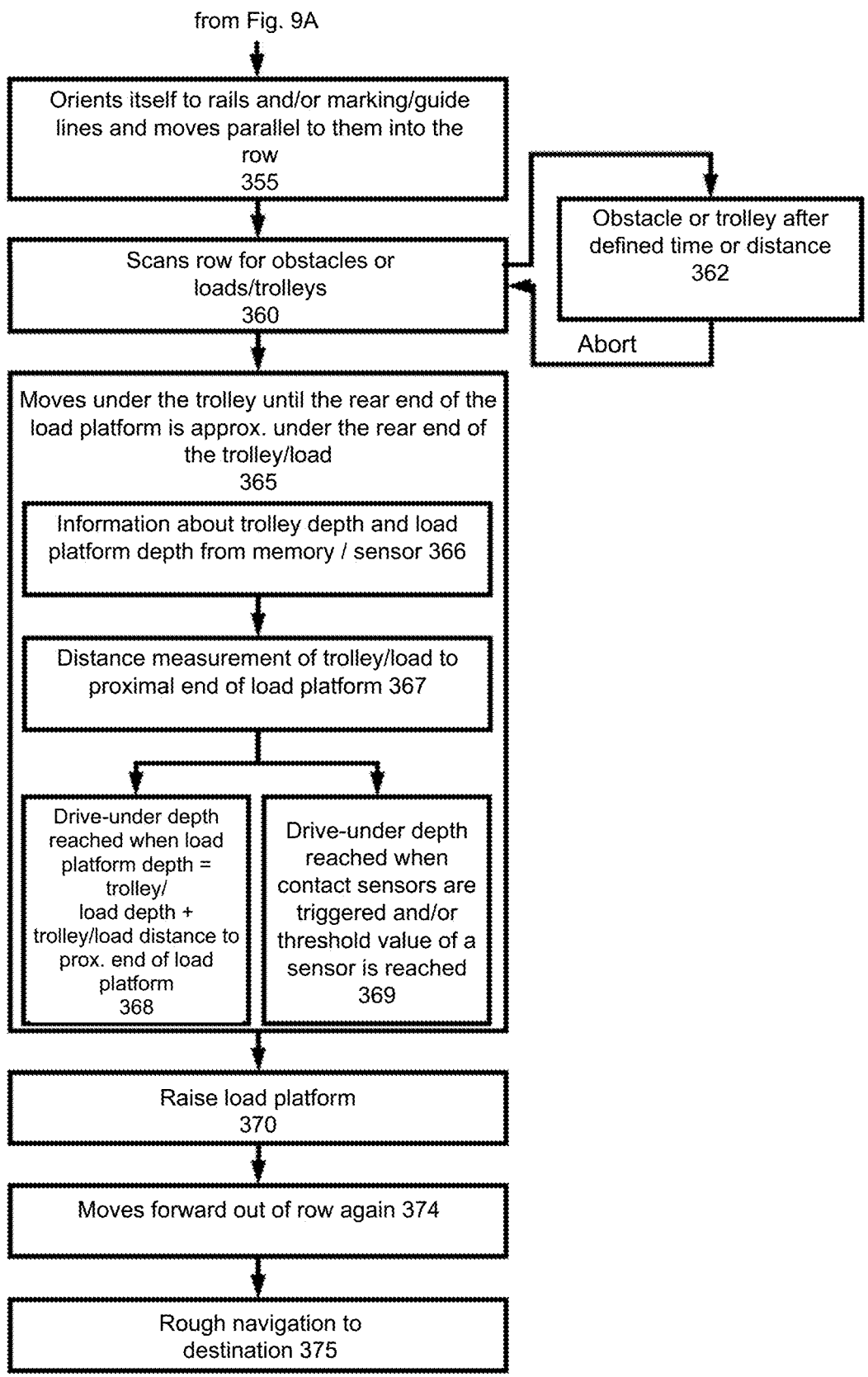
Figure 9C:
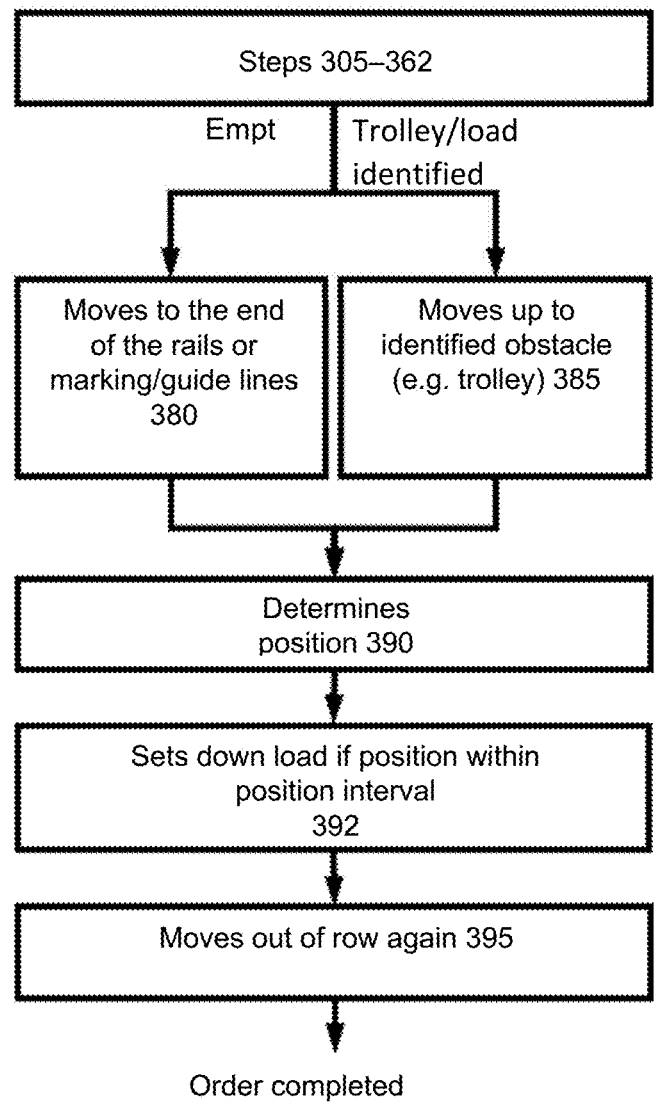

FIGS. 9A-9C show the sequence in which the AIT 5 picks up or sets down loads (143) positioned next to and/or behind each other, such as trolleys 200. This is largely the scenario described in FIGS. 7A-7D. In FIG. 9a, the AIT 5 first receives an instruction 305, e.g. to transport a trolley 200 with multiple goods carriers from one warehouse to the next. A position on the map of the AIT 5 is associated with this order, so that the AIT 5 navigates to this position—in the embodiment described in FIGS. 1-4, this positioning preferably occurs in the forward direction. This constitutes rough navigation to the position and/or load 310. Once there, the AIT 5 turns near the position 315 and directs the rear-facing sensor technology towards the load zone from 320, where usually several trolleys 200 stand parallel to each other and behind each other. In step 325, the AIT 5 uses, for example, the sensor unit camera 20 in the rear-facing sensor unit 17 to detect the trolley row identification device 203 for identifying a trolley row. Common prior art image classification methods may be used for this purpose.

The identification code from the trolley row identification device 203 for identifying a trolley row is read 330 and the AIT 5 performs a position synchronization. This means that, in the first step, a check is made as to whether the identification code obtained from the trolley row identification device 203 for identifying a trolley row matches the identification code of the trolley row in which the load 143 to be picked up is located. If this is not the case, the AIT 5 uses position data stored in a memory (2, 38) to verify where the searched row is located relative to the read-out trolley row identification device 203 for identifying a trolley row and navigates there, i.e. repositioning is carried out between the rows 340 related to the corresponding row. The repositioning includes, for example, new coordinates, and in one aspect, a different orientation in the horizontal plane. If the AIT 5 is in front of the correct row, the AIT 5 uses the position of the rails 201 and/or marking or guide lines 202 to check whether the AIT 5 is centered in the row 345 and then reverses into the row. In the process, the rows are detected by pattern recognition, for example, and their distance from the image margin is evaluated. Otherwise, repositioning is carried out within the row 350. Alternatively, the AIT 5 can move out of the row again and position itself in front of the row so that it is aligned centrally, and then reverse into the row again. If the AIT 5 is then aligned centrally, the AIT 5 orients itself according to FIG. 9b on the rails 201 and/or the marking or guide lines 202 or, alternatively, on parallel loads 143 such as trolleys 200, for example, and moves parallel to these rails 201 or the marking or guide lines 202 or loads 143/trolleys 200 (backwards) into the row 355. The AIT 5 scans the row for obstacles or trolleys 360. This step may also have been performed previously, for example. If no obstacle or trolley 200 is detected after a defined time or distance (e.g. in the memory 2) (step 362), the loading process is aborted. If there is no abort, the AIT 5 then moves under the load (143), e.g. the trolley 200, until the rear end of the load platform 12 is approximately under the rear end of the trolley 200 in step 365. For this purpose, the AIT 5 uses information about the trolley depth and the load platform depth from a memory 2, 38 or a sensor such as the camera and/or a LIDAR (15, 18, 20, 31) (step 366). Meanwhile, a continuous or discrete-time measurement is carried out during the driving operation in order to detect the distance of the trolley 200 to the proximal end of the load platform 12 (i.e. the one equipped with the load platform load sensor unit for detecting a load 143 on the load platform 12) 367. The maximum drive-under depth is reached when the load platform depth is equal to the trolley depth plus the trolley distance to the proximal end of the load platform 12 (step 368). Instead of the trolley depth, a load depth can also be used as an equivalent.

These measurements can be made by the laser distance sensor 22 or an alternative distance sensor, such as ultrasound, radar 32, etc. Alternatively, at least one of the contact sensors 23 may trigger and/or a measured threshold value of a sensor is generally triggered 369. This may be the case, for example, if the laser distance sensor 22 or an alternative distance sensor, such as ultrasound, radar 32, etc. has determined a distance value that is below distance values stored in a memory (e.g. 2). The triggering of the of the contact sensors 23 applies particularly to long trolleys 200 that are similar in length or longer than the load platform 12 of the AIT 5. In the next step, the load platform 12 is raised 370 and the AIT 5 moves forward again out of the row 374 and navigates to the destination 375 as part of rough navigation.

To set down the load 143, the AIT 5 substantially completes steps 305-362. When scanning the row for obstructions or loads 143/trolleys 200 in step 360, the AIT 5 determines if the row is empty or if there are already trolleys 200 there. For this purpose, the AIT 5 can, for example, compare the length of the row stored in the memory (2, 38)

with the obstacle-free depth determined by means of at least one sensor of the AIT 5 within the row and, if the determined depth is less than the depth stored in the memory (2, 38), recognize trolleys 200 parked in the row. Alternatively and/or additionally, trolleys 200 can also be recognized directly or indirectly, e.g. by pattern recognition methods, by 1D, 2D or 3D identification codes such as bar codes, QR codes, etc. (such methods are also applied in step 330, for example). If the row is empty, the AIT 5 moves to the end of the rails 201 and/or marking or guide lines 202 in step 380. If the row is not empty because, for example, obstacles, loads 143, or trolleys 200 have been identified in the row, the AIT 5 moves up in step 385 to an obstacle identified as such, for example a trolley 200, e.g. while maintaining a distance stored in the memory (2, 38). For this purpose, the AIT 5 can, for example, determine its position 390, sets down the load 143 each time it is located within a position interval (step 392), and navigates out of the row in step 395. This completes the order for the AIT 5. "Position interval" means that the AIT 5 may set down the load 143 depending on the position, e.g. when moving into the row within a distance that deviates from the position by a defined threshold value. In one aspect, the AIT 5 may also have implemented sorting algorithms known in the literature according to which, for example, a trolley 200 positioned between multiple trolleys 200 is removed from a trolley row and transported, or a trolley row is re-sorted. Distances to trolleys can be determined via a LIDAR (15, 16, 18), radar (32), or a camera (30).

Figure 10:
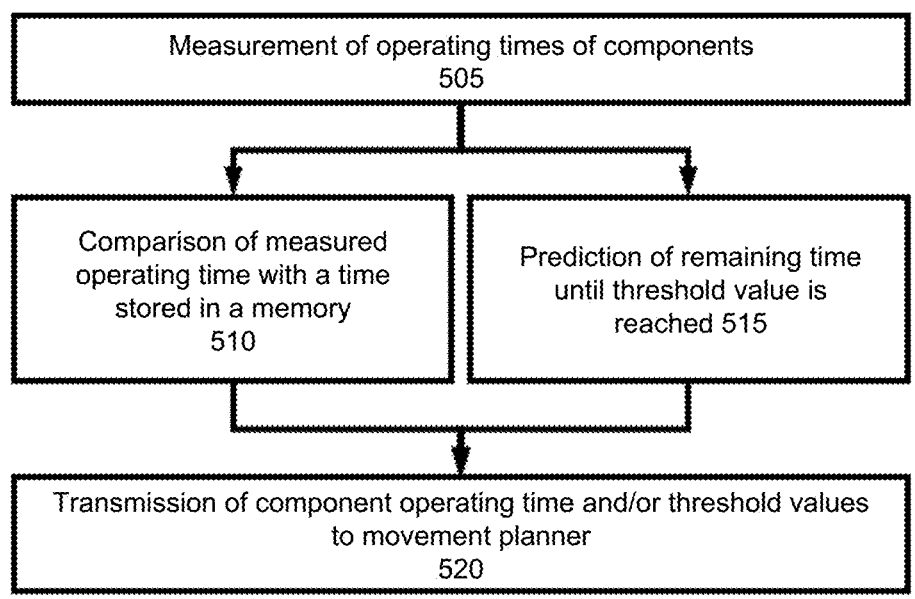
FIG. 10 is a flow chart of operating times and movement planning in accordance with a preferred embodiment of the present invention.

FIG. 10 describes how the determination of operating times of an AIT 5 can be taken into account in the movement planning. In a step 505, the AIT 5 measures the operating time of components and stores this operating time in one aspect. The AIT 5 compares the measured operating time to a time stored in a memory (2, 38) and creates a threshold comparison in step 510. In one aspect, this can mean that, for example, the determined operating time is 2000 hours, a time stored in the memory (2, 38) is 2100 hours, and the threshold comparison determines that the 2000 hours is less than the threshold value of 2100 hours.

In an alternative aspect, for example, a difference is formed from these threshold values (100 hours) and this is compared to a threshold value stored in the memory (2, 38). Alternatively to this comparison, the AIT 5 or other system (e.g. 36) to which the measured values have been transmitted may make a prediction in step 515 as to when a threshold value will be reached, which may be based on storing the measured values over time and evaluating them over time and in which standard regression techniques may be applied. The values determined by steps 510 and/or 515 can be transmitted to the movement planner 115 520, which takes them into account as part of the movement planning.

Figure 11:
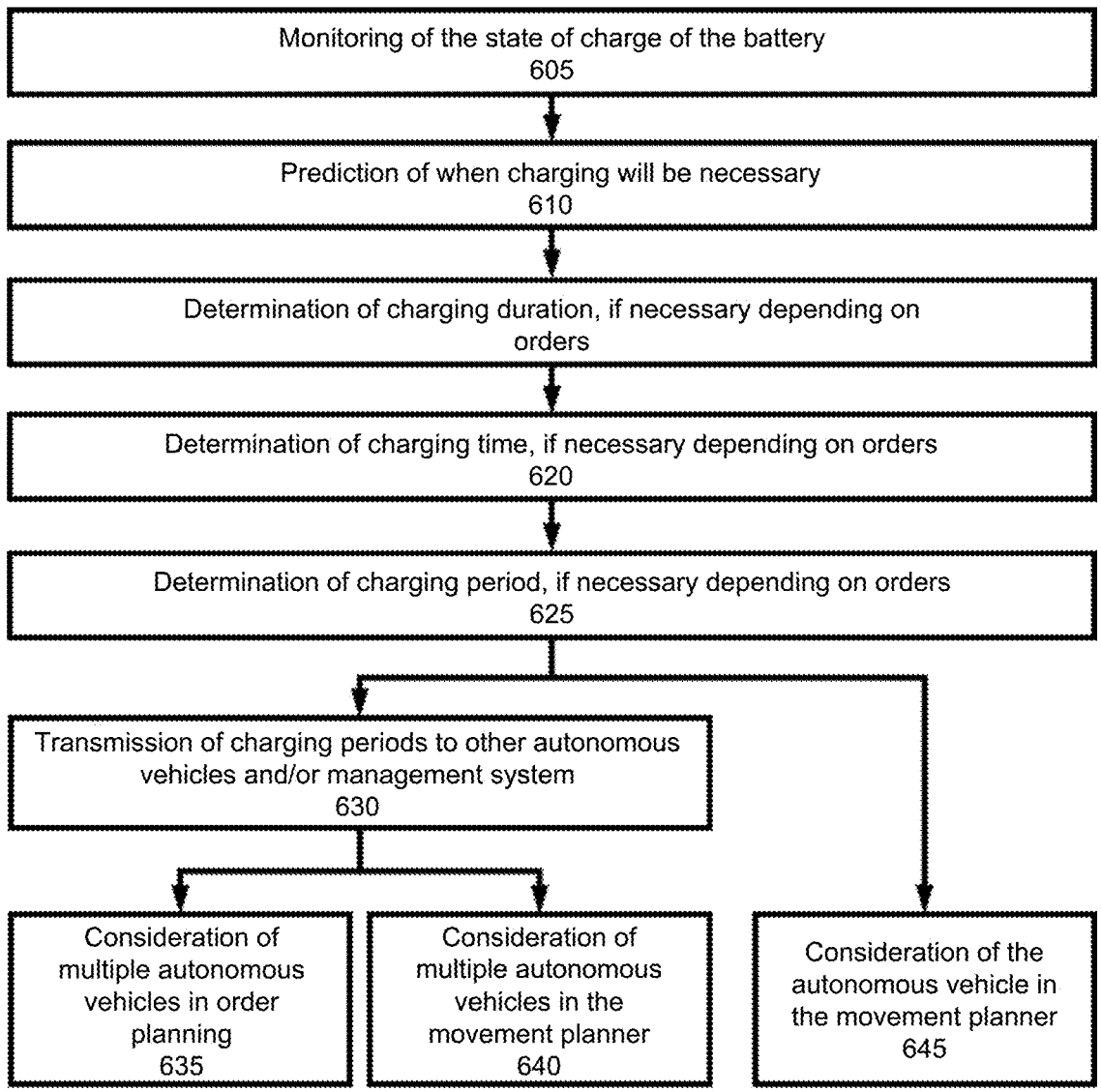
FIG. 11 is a flow chart of capacity management of charging stations of autonomous vehicles in accordance with a preferred embodiment of the present invention.

FIG. 11 illustrates how capacity management of charging stations 43 of autonomous vehicles such as an AIT 5 is implemented. The autonomous vehicle, e.g. the AIT 5, monitors the state of charge of its rechargeable battery 4 (step 605). In step 610, the autonomous vehicle records the consumption and makes a prediction as to when recharging is necessary. For this purpose, the autonomous vehicle accesses historical data from previous operation times, which in one aspect is provided via an interface (e.g. 122, 123). In an alternative aspect, the consumption data may also be transmitted to another system (e.g. 36) via an interface (122, 123) that generates the prediction. In step 615, a determination is then made of how long the charging duration must be to reach a desired state of charge. This desired state of charge may be based on orders to be completed. Subsequently, at least one charging time is determined in step 620 from when the charging operation is preferably started, if necessary also taking a distance to be covered to a charging station 43 into account. This point in time can depend on the remaining state of charge and/or on orders that the autonomous vehicle is to complete. Charging periods are then determined based on the values from steps 615 and 620, which are defined by a start time, possibly a start time interval, and a subsequent charging duration. In one aspect, these may be taken into account in the movement planner 115 of the autonomous vehicle. In another aspect, these charging periods are transmitted to other autonomous vehicles or a management system (e.g. 36) via an interface in step 630. For example, a transmission system such as the AIT-to-AIT communication module 123 (or WLAN 122) can be used here. Subsequently, in step 635, the charging periods are considered in the order planning of multiple autonomous vehicles, in particular by the management system (e.g. 36). The charging periods can also be used in the movement planner 115 of at least one further autonomous vehicle in step 640, in particular for planning its own routes and its own charging periods. For example, an autonomous vehicle such as the AIT 5 can reschedule its own charging time periods provided that the autonomous vehicle is informed that the charging station 43 will be occupied by another AIT 5 at a certain time. Finally, the determined charging periods are also taken into account in the movement planner 115 of the autonomous vehicle.

Figure 12:
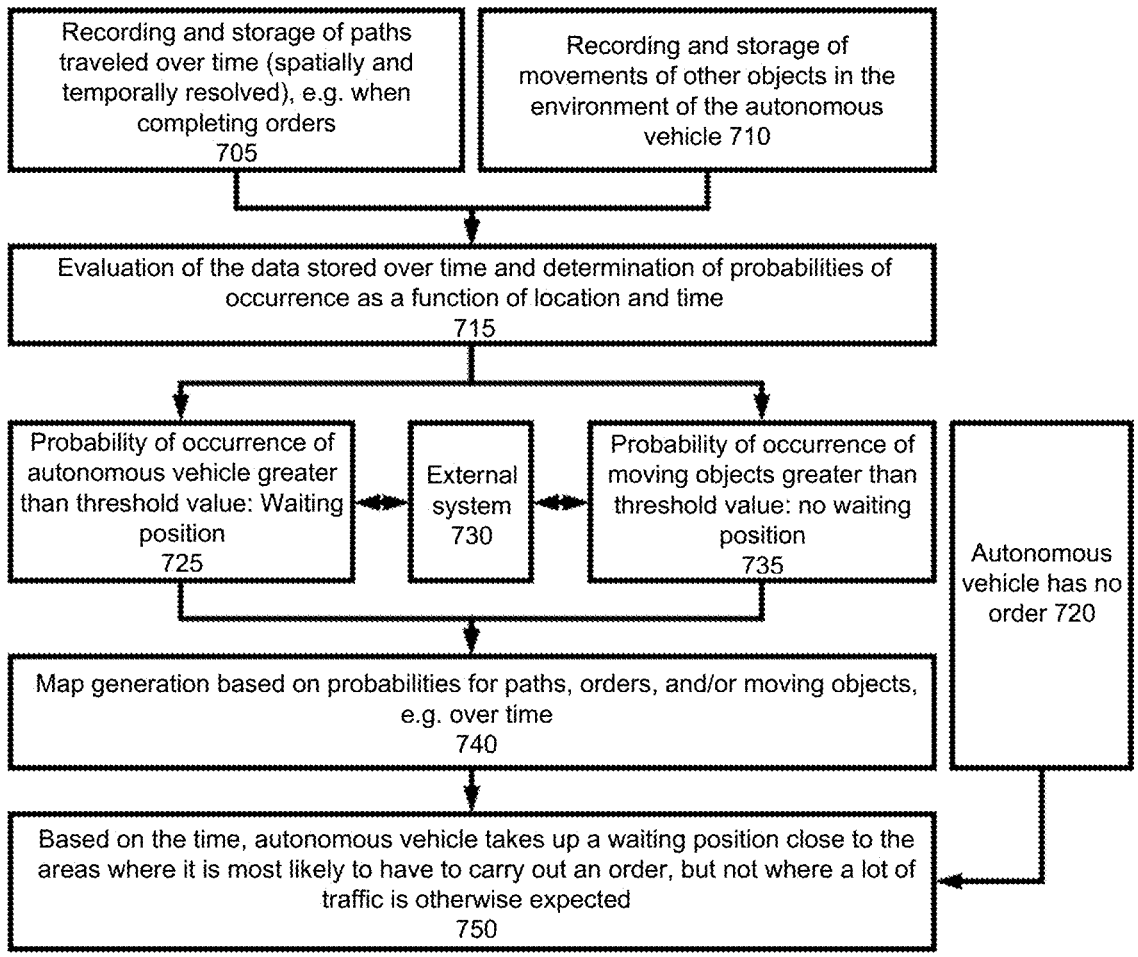
FIG. 12 is a flow chart illustrating determination of waiting areas and/or location and time of orders in accordance with a preferred embodiment of the present invention.

FIG. 12 describes how a system such as an autonomous vehicle, e.g. an AIT 5, can perform a determination of waiting areas. For this purpose, an autonomous vehicle records the path traveled over time as a function of location and time in step 705, the path having been covered, for example, in the course of completing orders. The orders may generally be a transport orders, inventory orders, disinfection orders, or other order types. In an alternative aspect, the localization of the autonomous vehicles, e.g. an AIT 5, may also be carried out by means of radio signals emitted by such an AIT 5 and detected by at least one antenna 27. Combinations of these approaches can also be realized. In a further, optional aspect, objects moving in the environment of the autonomous vehicle are detected in a spatially and temporally resolved way in step 710. In step 715, this information is stored in each case and evaluated by the system, an autonomous vehicle such as an AIT 5, or a different type of processing unit according to location and time in such a way that frequencies are determined as to when in the past the autonomous vehicle such as the AIT 5 and/or objects moving in its environment were at which locations. Based on this, probabilities are determined as part of a prediction calculation that the autonomous vehicle such as the AIT 5 will move in the detected areas or that other objects will move in detected areas. If, e.g. at a certain point in time, which may be seasonally dependent, the probability of a path being covered is above a certain threshold value, this path is determined to be a waiting position 725. If, e.g. at a certain time, which may be seasonally dependent, the probability for the occurrence of moving objects is above a certain threshold value, this path is determined to be a waiting position 735. The information from steps 725 and 735 can be transmitted to external systems (e.g. 5, 36). However, such information may also be transmitted from external systems (e.g. 5, 36) to the system in question, e.g. an autonomous vehicle. In one aspect, the information may refer to the paths or positions of the detected objects, i.e. the exchange does not occur between steps 725 and 730 or 735 and 730, but rather between steps 715 and 730 (not illustrated in FIG. 12).

Based on the determined probabilities, a map can be created in step 740 (e.g. a heat map), which contains probabilities, e.g. for paths, orders, and/or moving objects, which can be seasonally dependent (in the course of the day, week, month, shift, etc.) and which can be mutually dependent (e.g. the combination of path and moving obstacles that overlap, with a lower probability determined in the case of an overlap, making the position less eligible as a waiting position). If the autonomous vehicle, e.g. the AIT 5, has no order to execute 720, the autonomous vehicle assumes, based on this point in time in the absence of an order, a waiting position near the areas where it has a high probability of having to execute an order, but not where traffic is otherwise expected to be heavy (step 750), i.e. the autonomous vehicle will not position itself where there is a high probability of other moving objects. The described procedure may be implemented in the waiting position module 116 that is, for example, a part of the mapping module 117. With respect to the system level, the system may be a self-learning system for determining probabilities of occurrence for the location and time of moving objects, comprising a waiting position module 116 for evaluating detected position data of moving objects over time and for determining probabilities of occurrence for moving objects within defined time intervals, with the waiting position module 116 using stored and traversed paths (e.g. in the course of processing orders) determined by the path planning module 112 and/or recorded by the odometry module 121. The mapping module 117 may generate a map of waiting positions based on the evaluation of the waiting position module 116. A movement planner 115 and/or a path planning module 112 perform path planning and/or movement planning for a system based on data from the mapping module 117. The acquired position data was acquired using a camera 31, a radar sensor 32, an ultrasonic sensor, or a LIDAR (15, 16). The system (the self-learning system and/or the system for which the path planning and/or movement planning is performed) is an autonomous industrial truck 5, a disinfection robot, a cleaning robot, a service robot, or an inventory robot. A waiting position is characterized by a high probability of seasonal or shift-related orders and a low probability of encountering moving objects.

Figure 13A:
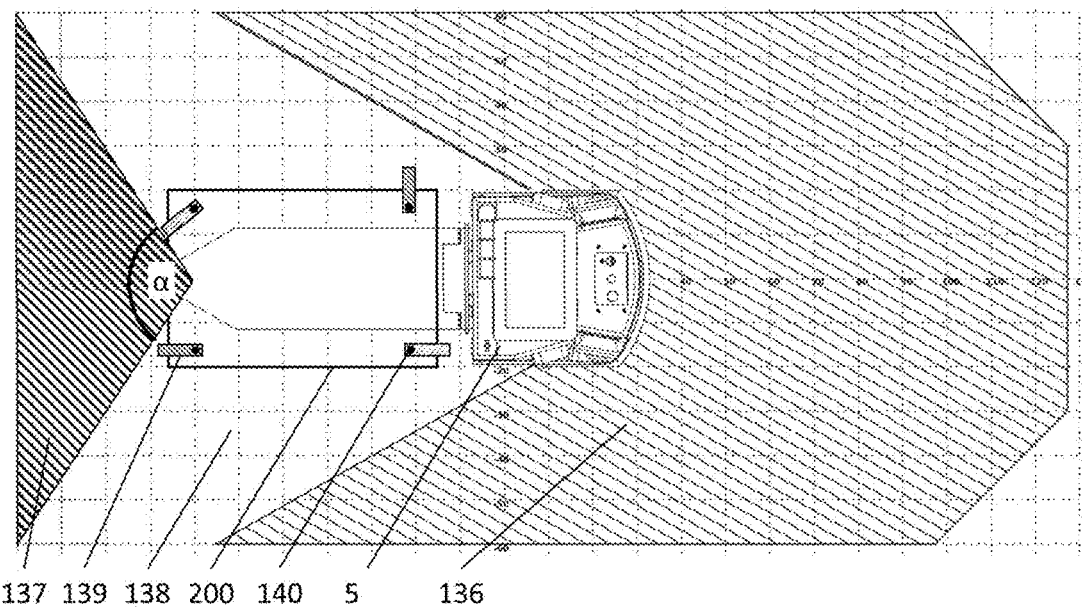
FIGS. 13A-13B are illustrations of field-of-view of rear-facing LIDAR with load on load platform in accordance with a preferred embodiment of the present invention.
Figure 13B:
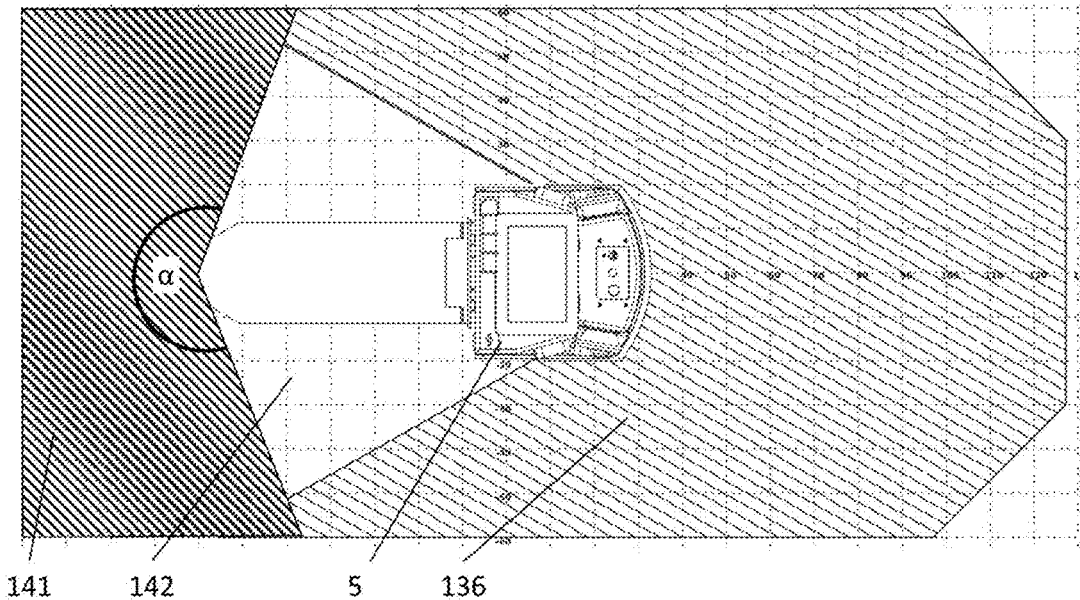

FIGS. 13a) and b) describe a possible impairment of the AIT's navigation capabilities due to the pick-up of a load 143 that particularly affects turning capabilities. FIG. 13A) illustrates such an impairment. Here, the field of view 137 of the sensor unit LIDAR 18 of the autonomous industrial truck 5 is restricted due to the pick-up of load 143 (the field of view of the front LIDAR 136 is not restricted, however). The reason for this is that, for example, a trolley 200 that has been picked up has trolley wheels 139 that are freely rotatable on a vertical axis of rotation 140 and extend into the field of view of the rear LIDAR 137. As a result, the detection angle α of the rear LIDAR is in the range 90-120° (approx. 110° shown here), depending on the arrangement of the wheels and/or positioning of the trolleys 200 on the load platform 12 of the AIT 5. This also implies that the detection of the overhang of the load 143 by at least one of the above-mentioned upward-facing sensors helps to reduce the impairment of the field of view. FIG. 13B), on the other hand, represents the angle of coverage a of the rear LIDAR without any impairment as described in FIG. 13A), which can be between 160 and 240° (shown here: 220°), i.e. field of view of the rear LIDAR without impairment by load 143. The consequence of this impairment is that the trolley load LIDAR dead zone 138 in FIG. 13A), which is located laterally as viewed from the load platform of the AIT 5, is not monitored by at least one LIDAR of the AIT 5. In contrast, the no-load LIDAR dead zone 142, which is not monitored by a LIDAR when the autonomous industrial truck 5 is unloaded, is significantly smaller in FIG. 13B). In addition, the area 142 is bounded by at least two LIDAR detection areas. This implies that monitoring the two LIDAR detection areas over time can ensure that no moving obstacle is positioned in the horizontal plane in the no-load LIDAR dead zone 142. However, this cannot be ensured in FIGS. 13A-13B) with the trolley load LIDAR dead zone 138. However, the probability can be reduced by the AIT moving over time, e.g. in the direction of travel, with the result that, depending on the driving speed, it is very unlikely that a moving obstacle will move into the trolley load LIDAR dead zone 138.

In the case of movement in the direction of travel or counter to the direction of travel, the risk of collision is also low if a moving obstacle is located in the trolley load LIDAR dead zone 304. This could be more critical in the case of a turning movement or when the AIT 5 turns. In this aspect, various devices and/or measures may be implemented to monitor the sides of the AIT 5 during a turning or pivoting movement and/or to reduce the likelihood that an obstacle, particularly a moving obstacle, is located in the area not covered by the rear and front LIDAR. In one aspect, the AIT 5 has at least one sensor that monitors the sides of the AIT 5. This sensor may be another LIDAR, ultrasonic, radar 32, infrared 29, or camera sensors 20, preferably with one sensor on each side. This at least one sensor is configured in such a way that the sensor detects the trolley load LIDAR dead zone 304 at least in part and preferably greatly minimizes the trolley load LIDAR dead zone 304, in one aspect to an area of 0.

In an alternative and/or additional aspect, a quasi-dynamic detection of the dead zone 304 is carried out over time, i.e. the area located to the side of the AIT 5 is detected by sensors due to a movement, with the actual dead zone 304, from a statically perspective, being only briefly incapable of sensory evaluation in each case. For this purpose, the AIT 5 moves forward or backward, preferably forward, at a speed that is above a threshold value, with the threshold value of the speed being 0.5 m per second, e.g. at least 1 m per second. Alternatively and/or additionally, the AIT 5 forgets obstacles detected by the sensors more slowly. In the prior art, obstacles detected by means of sensors such as the LIDAR, which are included in occupancy grid maps, where they define obstacles as occupied coordinate fields by means of probabilities, are usually assigned a relatively rapidly decreasing probability (referred to as "forgetting"), especially if the obstacles are moving obstacles. This is also useful, for example, to avoid braking for an obstacle crossing the direction of travel when this obstacle is no longer present. The AIT 5 can now provide the obstacles detected by the LIDAR (15, 16) and/or further sensors, in particular dynamic obstacles, with a lower decrease in probability in the occupancy grid maps, especially for the areas located to the side of the AIT 5. Thus the half-life of the decrease in probability can be more than doubled here, for example. Alternatively and/or additionally, it is only possible to stop taking such an obstacle in the occupancy grid map into account once the AIT 5 has moved a minimum distance away from it. In addition, such obstacles are detected for a longer time, which increases the probability of obstacle detection, in particular in combination with the above-mentioned minimum driving speed. In one aspect, forgetting is already activated prior to the turning, pivoting and/or rotating movement, with the time period in which forgetting is activated being speed-dependent. Alternatively and/or additionally, the AIT 5 is configured in such a way that the area in which the trolley wheels 305 narrow the field of view is blanked out in the evaluation of the data acquired by the rear LIDAR 18, i.e. the angle of coverage of the rear LIDAR 18 is varied and, when the AIT 5 has picked up a load 143, it is switched to the narrower field of view. Alternatively and/or additionally, the AIT 5 uses integrated warning devices such as the alarm lights (traffic light) 25 and/or a warning buzzer to warn persons located to the side of the AIT 5 during a turning, reversing, or pivoting movement.

Particularly in the case of heavy loads 143, increased slip may occur during turning or pivoting operations carried out by the AIT 5, especially when the drive wheels 10 are actuated in opposite directions, which may not only impair the navigation capabilities of the AIT 5, but also make it difficult to transport the load 143, since the slip may in some cases manifest itself by a spinning of the drive wheels 10, making it impossible to turn and/or pivot the AIT 5. The cause of this is that the drive wheels 10 are located relatively far from the center of gravity of the loaded AIT 5, which is then located primarily below the load platform 12. In one aspect, therefore, the center of gravity may be more than 20 cm away from the axle that is (virtually) located between the two drive wheels 10. The effects of this problem can be mitigated by preferably actuating only one of the drive wheels 10 during a reversing or turning operation. In addition, in one aspect, the other drive wheel 10 may be locked. In an alternative aspect, both drive wheels 10 are controlled, but one has a turning movement that is more than twice that of the other drive wheel 10, preferably more than ten times. In one aspect, these movements may be in opposite directions. This way, the center of rotation shifts further below the center of gravity of the load 143, allowing the loaded AIT 5 to be turned/rotated more easily, especially with heavy loads 143. In one aspect, heavy loads 143 are characterized by the fact that the load 143 picked up is greater than the dead weight of the AIT 5.

Figure 16:
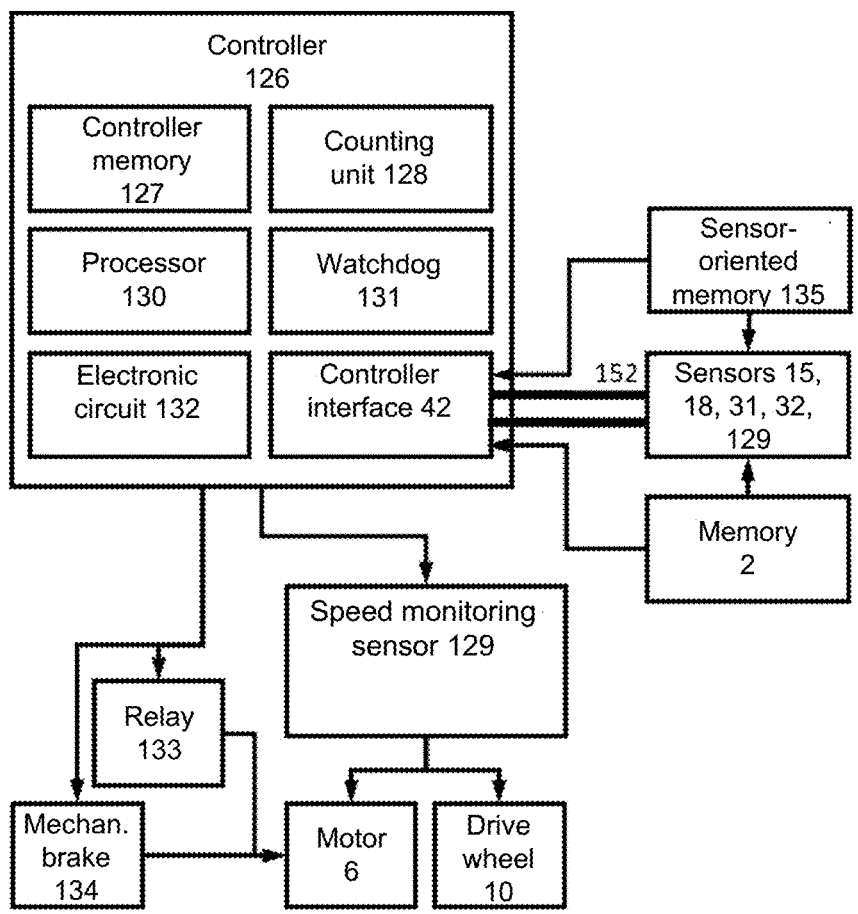
FIG. 16 is a diagram of a controller in accordance with a preferred embodiment of the present invention.

In FIG. 16, the operation of the controller 126 is shown in greater detail, which is connected to a rotation angle sensor 129 via at least one controller interface 42, has a controller memory 127, and directly or indirectly monitors the acceleration and/or speed of an autonomous vehicle (e.g. 1, 5) and can force a speed reduction. A time interval (which is, for example, speed-dependent and/or mass-dependent) and a target speed are stored in the controller memory 127, with the controller 126 monitoring the acceleration time of the motor 6 and forcing the termination of a motor movement if the target speed has not been reached within the stored time interval. Furthermore, the controller 126 comprises a counting unit 128 for determining the duration of the acceleration.

At least one defined speed to which the autonomous vehicle decelerates depending on the evaluation of a sensor (15, 16, 31, 32) can in turn be stored in a memory (2, 127, 135). This defined speed may depend on the weight and/or the geometry of the autonomous vehicle (e.g. 1, 5). Obstacles detected by at least one sensor (15, 16, 31, 32) are assessed by the sensor on the basis of distance threshold values from the memory (2, 127, 135), which may be nested distance threshold values defined, for example, in two-dimensional space. If the distances to the obstacles detected by the sensor (15, 16, 31, 32) are below at least one distance threshold value, the controller 126 brakes the autonomous vehicle (e.g. 1, 5) to a defined speed. The distance thresholds are in turn derived from the weight and/or maximum speed of the autonomous vehicle (e.g. 1, 5). The higher, for example, the weight and maximum speed of the autonomous vehicle (e.g. 1, 5) are, the greater the distance threshold values are, since within these threshold values the controller 126 must decelerate to the defined speed.

The speed and/or acceleration is/are acquired by at least two means and/or via at least two different physical measuring principles. In one aspect, the speed and/or acceleration is/are acquired, for example, by evaluating the currents and/or the torque of the motor 6 and/or by measuring the rotation angle of the motor 6, a gearbox component 7 and/or a wheel 10 by means of a sensor used for speed monitoring. The sensor used for speed monitoring by measuring the rotation angle of the motor 6 is a rotation angle sensor 129 such as, for example, a Hall sensor and/or an encoder or incremental encoder or another type of sensor that allows the rotation angle of the motor to be detected accordingly. Furthermore, in one aspect, the speed may be measured by optical sensors (e.g. 15, 16, 31), ultrasound and/or radar 32, for example by way of speed monitoring through the determination of the change in position of the autonomous vehicle (e.g. 1, 5) relative to fixed obstacles or landmarks in its environment, with the fixed obstacles and/or landmarks being stored in a map located in the memory 2 of the autonomous vehicle (e.g. 1, 5). Alternatively and/or additionally, the speed can be measured by an optical sensor 32 facing a surface that determines speed based on measured changes in the surface structure relative to the autonomous vehicle (e.g. 1, 5). The detection of the surface structure, e.g. that of the floor or a ceiling, can take place within a defined viewing window.

The sensor data (e.g. from the LIDAR 15, 16, the safety edge 28 or the rotation angle sensor 129) is also transmitted in two channels and/or through analog and digital means, i.e. one channel 152 is evaluated digitally (voltage divider on digital input pin) and one channel 152 is evaluated analog (voltage divider on analog input pin). FIG. 16 accordingly shows the transmission channels 152 twice. A processor 130 (e.g. a microcontroller or comparator) compares the sensor data obtained on two channels and/or by two different physical measuring principles. The analog measured value is converted to a digital signal in the processor 130 of the controller 126, for example (in the process of which validity ranges for high and low are assessed). The value of the digital pin is then compared with the converted logic value. Discrepancies between the data obtained via both channels and/or the sensor data obtained by the two different physical measuring principles, provided they are each above a defined threshold value, trigger the controller 126 to reduce the speed of the autonomous vehicle (e.g. 1, 5).

The at least one safety edge 28 is also evaluated in the broadest sense in two channels, since the resistance of the safety edge is measured. For this purpose, the two connecting lines are evaluated via analog means and the resistance of the safety edge is calculated (if the safety edge is not pressed, this corresponds to the terminating resistance of the safety edge, while if the safety edge is pressed, the resistance becomes very low). This "calculation" is still implemented in parallel by a hardware circuit (e.g. voltage divider) and converted into a digital signal. This digital signal then expresses in the broadest sense whether the safety edge resistance exceeds a threshold value (i.e., for example, whether the safety edge resistance is >=8 kOhm). Here too, the switching resistance state calculated in the processor 126 is compared to the digital pin and an appropriate response is triggered.

In one aspect, the controller 126 is monitored via a watchdog 131 that triggers a speed reduction of the autonomous vehicle (e.g. 1, 5) if the controller 126 is no longer supplied with power. In the process, for example, an electronic circuit 132 short-circuits the motor 6 and/or a relay 133 via actively controlled semiconductor devices such as MOSFETs, with the relay 133 and the electronic circuit 132 connected in parallel, for example. In one aspect, an electronically controlled mechanical brake (134) is triggered upon a drop in voltage, and the autonomous vehicle (e.g. 1, 5) is braked.

The speed reduction, which can be effected by the controller 126, occurs independently of instructions that applications of the autonomous vehicle (e.g. 5) send to the controller 126. In this context, applications are understood to be software programs that represent, for example, a transport order or a cleaning order, in which a certain speed is prescribed for the movement of the autonomous vehicle, for example. In addition, when the autonomous vehicle (e.g. 1, 5) is on sloping terrain, the controller 126 may maintain a speed of the motor 6 of zero in order to prevent the autonomous vehicle (e.g. 1, 5) from rolling away. The controller 126 may be used in an autonomous vehicle such as an autonomous industrial truck 5, a service robot, a disinfection robot, or a cleaning robot.

Figure 17:
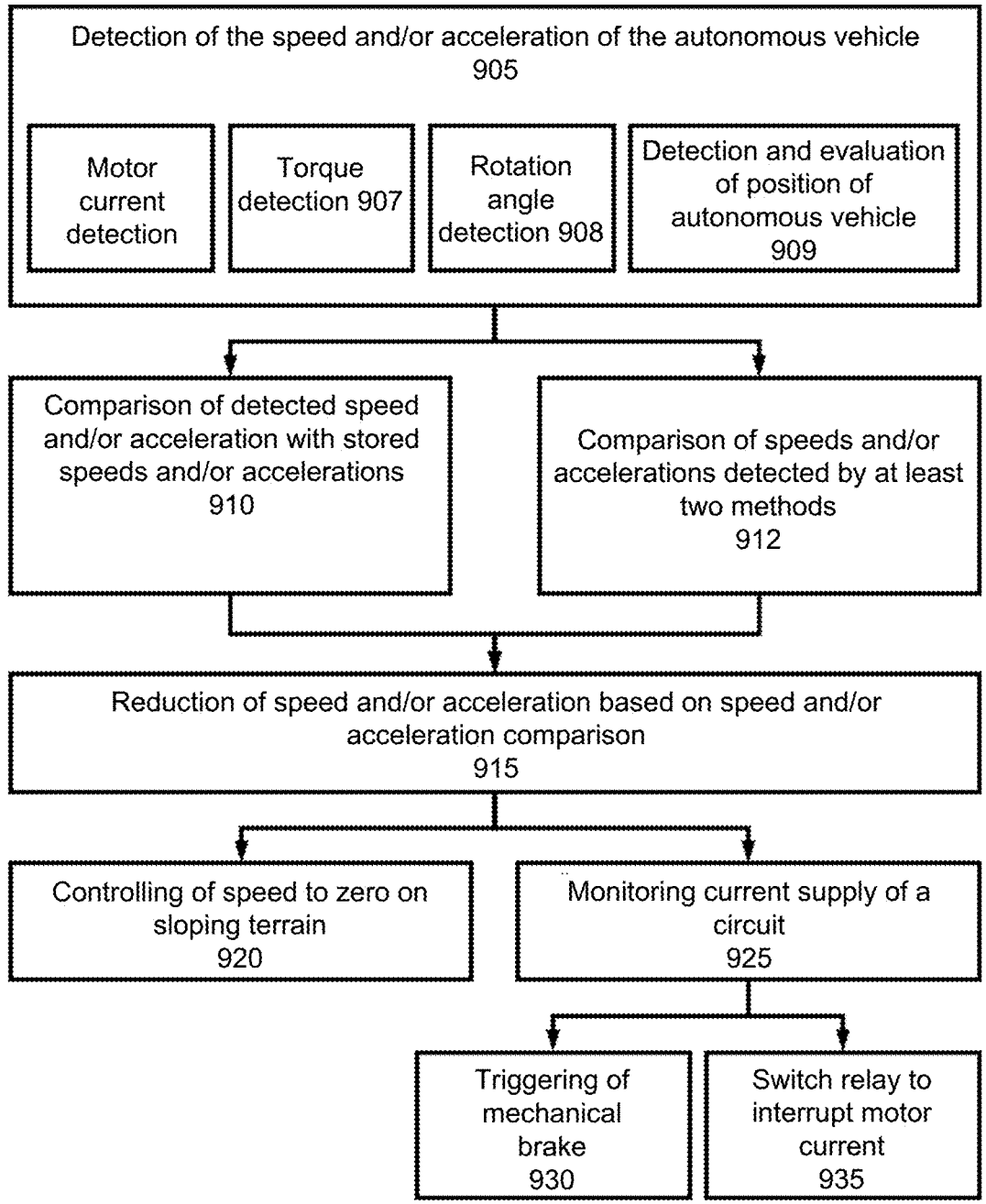
FIG. 17 is a flow chart illustrating a controller sequence in accordance with a preferred embodiment of the present invention.

FIG. 17, on the other hand, illustrates the sequence of operations in the controller 126, which monitors the speed of an autonomous vehicle (e.g. 1, 5), for example, in greater detail. The sequence of the method comprises the detection of the speed and/or acceleration of the autonomous vehicle (e.g. 1, 5) (step 905), a comparison of the detected speed and/or acceleration with stored speeds and/or accelerations (step 910), and a reduction of the speed and/or acceleration depending on the speed and/or acceleration comparison (step 915). Alternatively and/or additionally, the controller 126 comprises a method for monitoring the speed of an autonomous vehicle (e.g. 1, 5), comprising detecting the speed and/or acceleration of the autonomous vehicle (e.g. 1, 5) on two paths, comparing the speeds and/or accelerations detected on at least two paths (step 912), and reducing the speed and/or acceleration depending on the speed and/or acceleration comparison (step 915). In addition, the speed and/or acceleration of the autonomous vehicle (e.g. 1, 5) can be monitored directly or indirectly, for example. The detection signals of the speed and/or acceleration of the autonomous vehicle (e.g. 1, 5) are transmitted in two channels and/or through analog and digital means. Furthermore, the speed and/or acceleration acquired via two channels and or through analog and digital means is compared and a speed reduction is performed in case of deviations that are above a threshold value.

The speed and/or acceleration of the autonomous vehicle (e.g. 1, 5) is acquired using two different physical measuring principles. In one aspect, speed and/or acceleration monitoring involves detecting motor currents 906, which includes detecting the torque 907 of a motor 6. In an alternative and/or additional aspect, the speed and/or acceleration is detected by measuring the rotation angle 908 of a motor 6, a gearbox component 7 or a drive wheel 10, e.g. by measuring the rotation angle by means of a rotation angle sensor 129 such as a Hall sensor and/or an encoder or incremental encoder. The rotation angle can also be obtained by evaluating the retroactive generator voltage (electromotive force—known from the prior art) via a suitable circuit. Alternatively and/or additionally, the speed is measured by detecting the position of the autonomous vehicle (e.g. 1, 5) relative to its environment and evaluating the time 909 required for the position change.

In one aspect, the method implemented by the controller 126 may trigger a reduction in speed and/or acceleration independent of instructions specified by applications of the autonomous vehicle. In another aspect, the controller controls the speed of the autonomous vehicle (e.g. 1, 5) to zero when the autonomous vehicle (e.g. 1, 5) is on sloping terrain to prevent rolling away 920. In one aspect, after a time t, the electronically held brake 134 is released (step 930).

In one aspect, the controller 126 monitors the power supply 925 to a controller 126 and reduces the speed when power is no longer supplied to the controller. In one aspect, the reduction in speed can occur by triggering an electronically held mechanical brake 134 930, an electronic circuit, and/or by switching a relay 133 that interrupts the power supply to a motor (6) 935, e.g. additionally by means of a short circuit of the motor winding, which also results in an increased braking effect. Examples Example 1: Double Caster As can be seen in FIG. 2, the caster 11 is designed as a double caster. Instead of the double caster below the load platform, two wheels arranged in parallel are used, which, in one example, are each individually mounted in such a way that the wheels compensate for unevenness in the floor, but always remain in contact with the floor, even with heavy loads 143 resting on each of the wheels arranged in parallel.

In one example, the rotatable bearing about the vertical axis is omitted. Instead, an omni wheel is used, in particular a heavy-duty omni wheel, preferably a double omni wheel, with both wheels offset by 45° about the axis.

Example 2: Arrangement of Accumulator Cells

In one aspect, the rechargeable batteries of the AIT 5 are located below the height-adjustable load platform, which provides better weight distribution of the AIT 5 and improves driving stability, particularly during pivoting, turning, and reversing movements. In this aspect, the rechargeable batteries 4 are preferably arranged in such a way as to allow the ventilation of the rechargeable batteries 4 in order to prevent them from heating. For this purpose, the rechargeable batteries 4 are arranged in such a way in one aspect that this ventilation takes place in the longitudinal direction, for which purpose, in one aspect, active cooling is implemented by means of a generated air flow. In an alternative and/or additional aspect, cooling takes place by a vertical thermal flow. For this purpose, the rechargeable batteries 4 are arranged in such a way that an air flow can escape upwards. In order to achieve this, in one aspect, when the load platform 12 is lowered, grooves (preferably transverse grooves) are included between the support of the load platform 12 and the upper edge of the compartment containing the rechargeable batteries 4 through which rising air can escape when the load platform 12 is lowered. In an alternative and/or additional aspect, openings may also be recessed in the load platform 12 that are engaged with openings located below it in the installation space enclosing the rechargeable batteries 4.

In an alternative and/or additional aspect, the accumulator cells have a "floating" support, i.e. a cooling fluid such as an oil. Such storage provides, among other things, longer life for the rechargeable batteries 4 and fewer temperature-related failures. This is due to the fact that the heat of the rechargeable batteries is better distributed, thereby allowing better cooling. Furthermore, it ensures better driving dynamics, since the power applied to the wheels increases due to the mass of the oil.

Example 3: Picking Up a Load that is not a Trolley

The AIT 5 in the form of a forklift receives an order from the management system (e.g. 36) to pick up a specific load 143 at a defined location. The AIT 5 navigates forward to this location (rough navigation) and recognizes a pallet by way of a camera located within the forks, in the process of which image recognition algorithms are used in the memory of the AIT 5 which are based on classifications created by learning typical pallet features. An RFID transponder is located on the pallet, which is read by the AIT 5 (or else an optically readable identification code, such as a barcode or QR code). In one aspect, at least one antenna 27 is used for this purpose to allow the precise localization of the transponder. The code of the transponder is compared to the code describing the goods to be transported. If the code matches the code transmitted to the AIT 5 as the load 143 to be transported, the AIT 5 navigates closer to the pallet. The AIT 5 uses image classification algorithms to recognize the areas into which the forks need to be pushed. In an alternative aspect, data from a LIDAR is classified for this purpose. The movement planner 115 allows the AIT 5 and its forks to be positioned in parallel and in height in such a way that the AIT 5 can push the forks under the pallet by moving forward in order to lift the pallet. After lifting, the AIT 5 first navigates backwards and then to the destination. Depending on the height from which the pallet was picked up, it can also be lowered further before transport. In one aspect, a LIDAR, camera, and lighting are integrated into each of the forks.

Example: 4 Route Planning Depending on the State of Charge/Residual Charge of the Rechargeable Battery The remaining driving distance of the AIT 5 depends, in a first approximation, on the actual amount of (residual) energy stored in the rechargeable battery 4, the consumption that depends on the payload mass, and, in one aspect, the friction coefficient of the driving surface/ascents, etc. The AIT 5 can, in one aspect, determine the friction coefficients approximately, e.g. by determining the energy consumption per defined distance traveled, preferably when empty (and thus with the known dead weight of the AIT 5) and at constant speed, and comparing this with values for the ground conditions stored in the memory. The friction force here is proportional to the drive force. This can be determined, for example, owing to the fact that, at constant current, the shaft of the drive motor 6 lags more if the load 143 is heavier and therefore more current is required to keep the shaft synchronous (or within a max. permissible threshold value), with the rotation being evaluated by means of Hall sensors and/or encoders or incremental encoders. The mass of the AIT 5 can therefore be indirectly estimated if the coefficient of friction is known. In an alternative and/or additional aspect, the AIT 5 also determines slopes in its environment in this way. In an alternative and/or additional aspect, a change in the rate of rotation of an inertial sensor 40 can also be used, preferably the one with the largest axis value. Based on this, the AIT 5 can generate a map showing the friction coefficients of its environment and/or the energy consumption. In one aspect, to prevent the AIT 5 from having to traverse every point in the room, interpolation can be performed between different spatial positions where a measurement has taken place in order to create the map. In doing so, in one aspect, optical sensors may be used to improve the interpolation results. Preferably, a camera 31 is used, e.g. an RGB-D camera that can process both an RGB image and depth information. The latter is used to detect height differences of the plane on which the AIT 5 is moving in the environment and to assign spatial coordinates to these, which in turn can be incorporated in the XY plane in the map to be created. Especially with regard to the coefficient of friction, color images of the camera 31 can be used. This involves comparing the color or texture of the surface captured where the AIT 5 took a measurement of the coefficient of friction with the surface/texture elsewhere on the surface. If a match is found, this is taken as a reason to extend the measured coefficient of friction to all areas that have at least a similar texture in the scope of interpolation. In a next step, the AIT 5 can successively weight possible routes in the map with regard to the expected energy consumption (e.g. taking payload into account) and use this information for route planning that is optimized in terms of energy consumption.

Example 5: Mechanism for Removing a Self-Blockade within the Controller

In one aspect, the AIT 5 or an autonomous vehicle in general (such as a service robot, a cleaning robot, and/or a disinfection robot) is configured in such a way that it can remove a blockade, e.g. as a self-blockade, with this function being implemented in one aspect using a hardware-oriented method. In this case, sensors are connected, for example, in two channels to a controller that performs the function described here. In the process, they are evaluated, for example, through analog and/or digital means.

Figure 23:
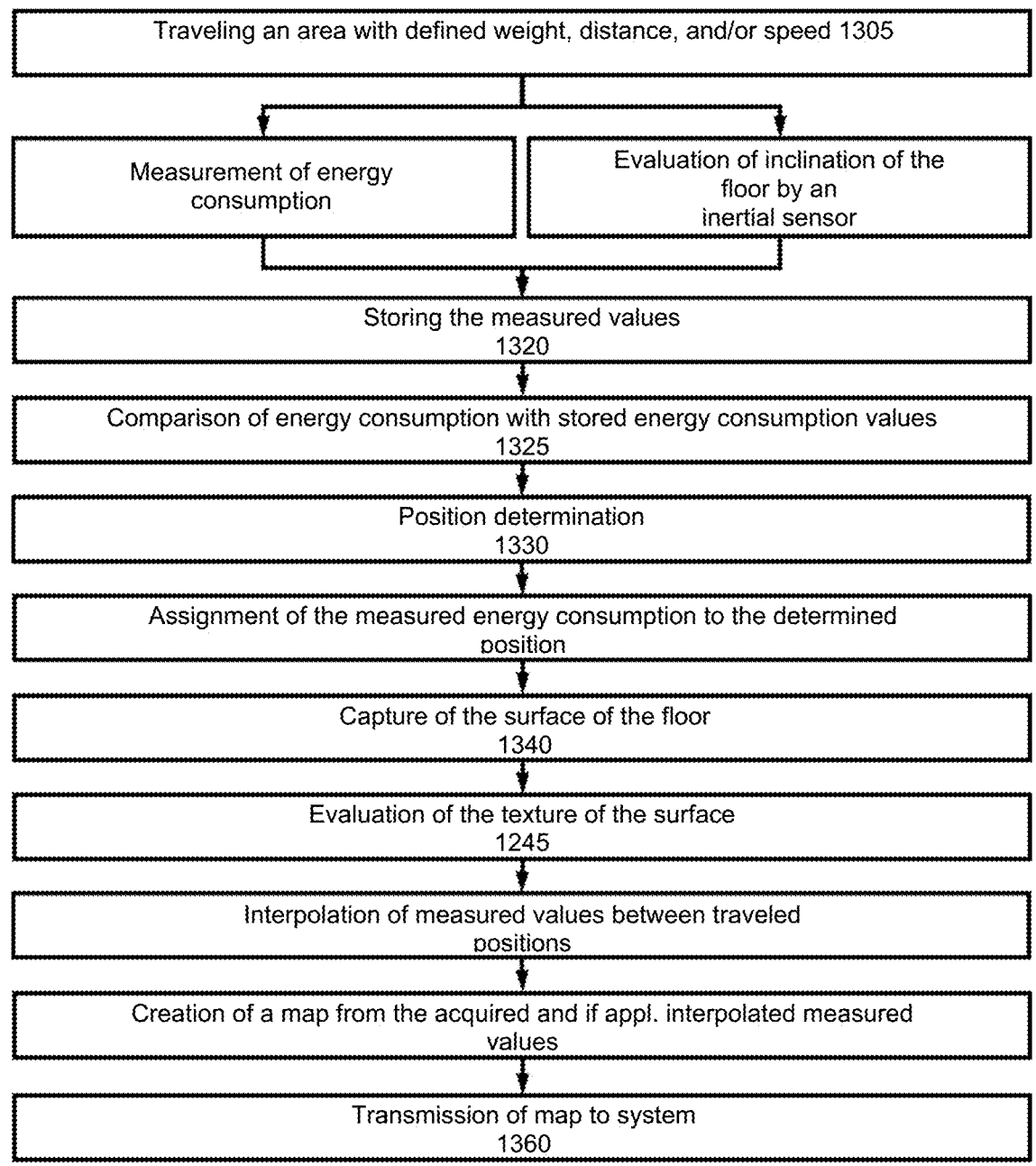
FIG. 23 is a flow chart illustrating mapping energy consumption in accordance with a preferred embodiment of the present invention.
Figure 24:
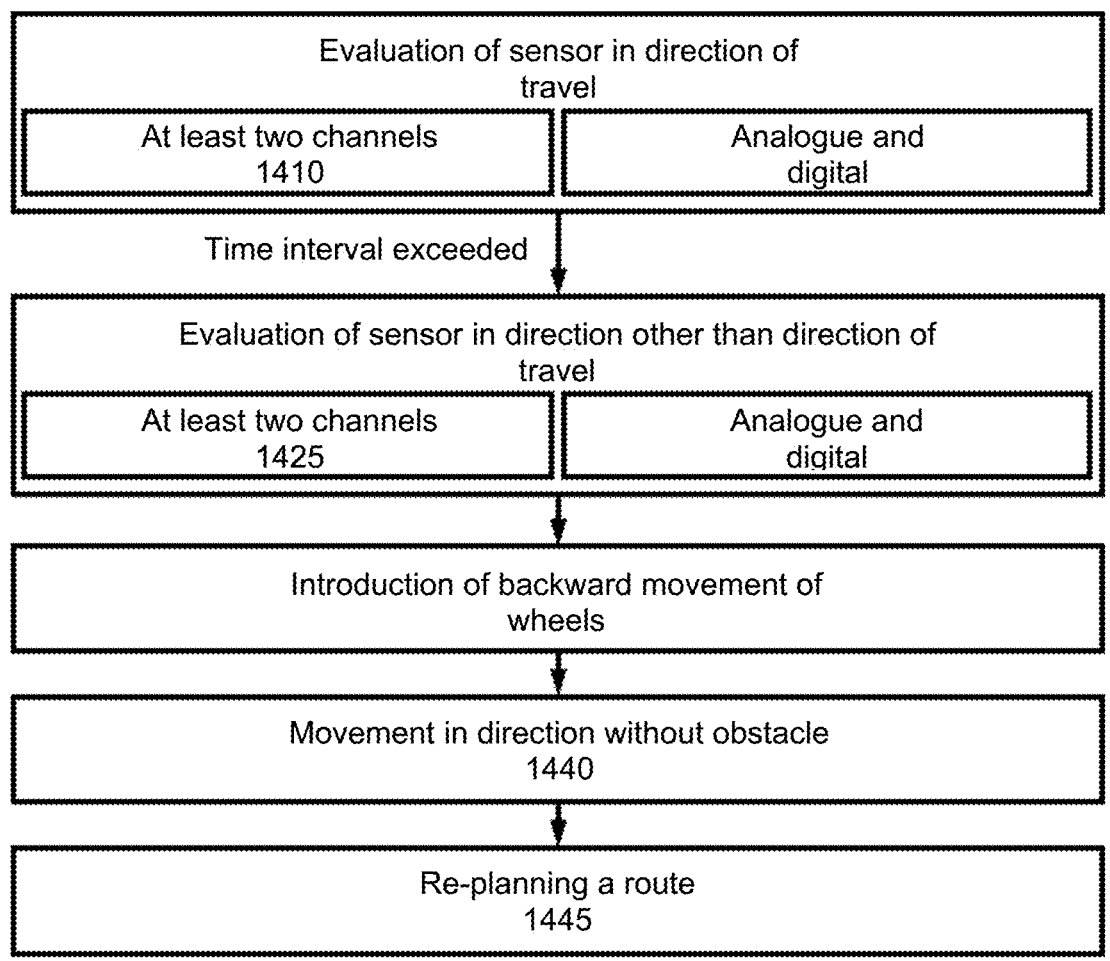
FIG. 24 is a flow chart illustrating blockade removal in accordance with a preferred embodiment of the present invention.
Figure 30A:
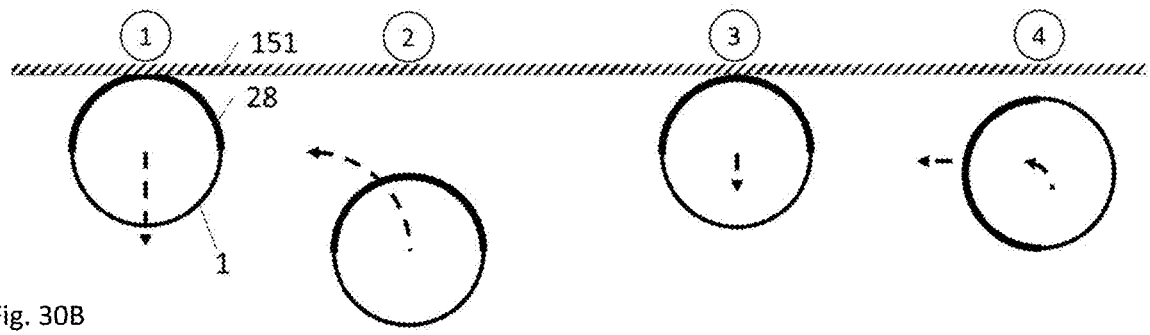
FIGS. 30A-30B are diagrams illustrating obstacle clearance in accordance with a preferred embodiment of the present invention.
Figure 30B:
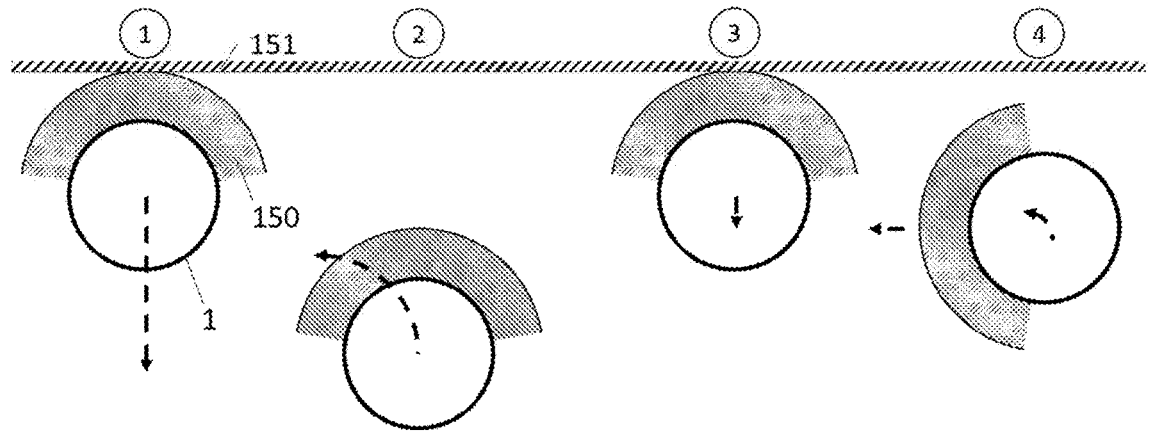

"Self-blockade" is understood to mean that at least one of the sensors detecting an obstacle in the immediate vicinity of the AIT 5 or autonomous vehicle has been triggered and, as a result, blocks the movement of the AIT 5 or autonomous vehicle for safety reasons, with the latter coming to a standstill. This includes, in particular, the triggering of the contacts in the bumper (i.e. the safety edge), e.g. in the direction of travel. Depending on the embodiment, this function of obstacle detection at close range can also be performed by other sensors, such as ToF sensors 29, ultrasound, radar 32, LIDAR 15, 16, etc. If the obstacle is now a static obstacle or temporarily static obstacle, this means that it does not disappear after a defined period of time and continues to activate the close-range sensor or a protective field within this close-range sensor. In this case, the controller of the AIT 5 or autonomous vehicle is designed in such a way that, for a short period of time, the AIT 5 or autonomous vehicle reactivates the motors 6 and the AIT 5 or autonomous vehicle starts an attempt to free itself. This is based on the assumption that no other sensor with a smaller protective field is activated, e.g. a safety edge located, for example, on the rear of the AIT 5 or autonomous vehicle, or a protective field of a LIDAR or other sensor that is rear-facing, for example. In this case, the AIT 5 or autonomous vehicle can back up a little. In doing so, the AIT 5 or autonomous vehicle preferably moves far enough away from its previous position that the relevant sensor that triggered the stop would no longer trigger, i.e., for example, the safety edge 28 no longer triggers and/or no obstacle is detected in the smallest, forward-facing protective window 150. In one aspect, the safety edge 28 is evaluated in a spatially resolved manner, i.e. the position at which it has encountered an obstacle is detected, which causes a short circuit or line discontinuity within the safety edge. For this purpose, in one aspect, the electromagnetic wave propagation or wave propagation time in the lines of the safety edge 28 can be evaluated, e.g. by way of reflection measurement in the time range (time-domain reflectometry). FIGS. 30*a*-30*b* illustrate this sequence. FIG. 30A illustrates obstacle clearance with a triggered safety edge 28, which is located at the mobile base 1 and which triggers by contact with a wall 151 (see (1)). The mobile base then backs up and initiates a curved turning movement to the left to continue to travel forwards (see (2)). Alternatively, as shown in (3), after contact with the wall 151, there can be a brief resetting and then a rotation of the mobile base 1, e.g. on the spot, in order to subsequently move forward, for example (see (4)). FIG. 30B shows a similar procedure for a mobile base 1 with a protection zone of a contactless sensor, where 150 illustrates the inner protection zone that triggers a stop of the movements of the mobile base 1. Here too, after the protective zone 150 is triggered, the mobile base 1 (1) is backed up and then rotated to move forward past the obstacle (i.e. the wall 151). Analogously to a), (3) and (4) show a brief resetting and rotating movement of the mobile base 1, e.g. on the spot or about its own axis, with a subsequent forward movement. After these possible steps, the AIT 5 or autonomous vehicle (or mobile base 1) navigates as usual. This procedure may, in one aspect, be implemented in a state machine. In summary, the situation can be illustrated as in FIG. 23: Evaluation of a sensor in the direction of travel over time 1405, e.g. at least two-channel (step 1410) or analog and digital (step 1415), evaluation of a sensor not in the direction of travel (step 1420), also at least two-channel (step 1425) or analog and digital (step 1430), initiation of a backward movement of the wheels (step 1435) provided that no obstacle is detected in step 1420. A movement is made in the direction without a detected obstacle (step 1440). The route is then re-planned (step 1445) using the path planning module 112 and/or the movement planner 115.

The mechanism for removing a blockade of an autonomous vehicle is characterized here by the following aspects AMAB1-AMAB14:

AMAB1. Method for removing a blockade of an autonomous vehicle whose speed has been reduced due to a detection of an obstacle in the direction of travel at close range by at least one sensor in the direction of travel, comprising
the evaluation of a sensor that is not directed in the direction of travel;
the initiation of a backward movement of the wheels.
AMAB2. Method according to AMAB1, comprising
the evaluation of the sensor in the direction of travel over time;
the initiation of the evaluation of the sensor not directed in the direction of travel after
a defined time interval, during which the detection of the obstacle in the direction of travel is carried out.
AMAB3. Method according to AMAB1, wherein the initiation of the backward movement of the wheels occurs when the sensor that is not directed in the direction of travel does not detect an obstacle that indicates a reduction in speed.
AMAB4. Method according to AMAB1, further comprising a movement of the robot performed in the direction in which no obstacle was detected.
AMAB5. Method according to AMAB1, wherein obstacle detection occurs in the smallest of multiple protective fields.
AMAB6. Method according to AMAB1, wherein the at least one sensor is evaluated in at least two channels.
AMAB7. Method according to AMAB1, wherein the at least one sensor is evaluated through analog and digital means.
AMAB8. Method according to AMAB1 or AMAB3, wherein the speed reduction is a reduction to zero.
AMAB9. Method according to AMAB8, wherein the motors (6) are de-energized in this state.
AMAB10. Method according to AMAB4, further comprising a re-planning of a route.
AMAB11. Method according to AMAB1, wherein the at least one sensor is a bumper or safety edge (28).
AMAB12. Method according to AMAB12, wherein the bumper or safety edge (28) is evaluated in a spatially resolved manner.
AMAB13. Method according to AMAB1, wherein the at least one sensor is at least one ultrasonic sensor, at least one radar sensor (32), at least one time-of-flight sensor (29), a camera (20, 31), and/or at least one LIDAR (15, 16).
AMAB14. Device according to AMAB1, wherein the autonomous vehicle is a service robot, an inventory robot, an autonomous industrial truck (5), a cleaning robot, or a disinfection robot.
AMAB15. Device for performing the method according to AMAB1-14.
AMAB16. Device according to AMAB15, wherein the controller is a hardware-oriented controller.
AMAB17. State machine for performing the method according to AMAB1-9.

Example 6: Slip Determination and Correction

In one aspect, the AIT 5 (which is representative of an autonomous vehicle such as a service robot, a cleaning robot, and/or a disinfection robot) is configured in such a way that it can determine slip and thereby improve its navigation capabilities. For this purpose, preferably within the odometry module 121, rotation angle sensors 129 are provided either on a motor 6 (and in this case preferably the axle) and/or on the drive wheels 10 or a gearbox, if present, in order to determine the rotation angle. The system is further configured in such way that the distance traveled can be determined via the determined angle in conjunction with the diameter of the drive wheels 10 and any intermediate gear ratios. This may involve, for example, Hall sensors, encoders or incremental encoders, etc. (see also the odometry module 121 described above). In one example, the encoders or incremental encoders (via photoelectric barrier) can read out more than 1024 steps, the Hall sensors 24. However, when a drive wheel 10 is spinning, the distance traveled by the sensors is longer than the distance actually traveled. This difference between the distance determined by the wheel sensors and the distance actually traveled is referred to as slip.

The system is implemented in the controller 126 and has latencies of less than 100 ms (e.g. 10 ms) and a high control quality, thanks to which very rapid corrections can be made. It also has at least one inertial sensor 40 (e.g. IMU with (3D) acceleration sensors, (3D) gyroscope (rotation rate) sensors and possibly (3D) compass sensors), which determines accelerations and rotation rates. First, the axis with the largest acceleration (gravitation) is determined, which indicates the vertical axis (z). The other two axes span the XY plane, within which the AIT 5 moves (for the sake of simplicity, moving on inclined planes is neglected in this description). The orientation of the AIT 5 in the room is determined via the rotation rates of the z-axis relative to the coordinate system from the navigation module 110, which covers the environment of the AIT 5. If the controller 126 now prescribes, for example, a constant speed of the two drive wheels 10, which corresponds to a movement parallel to the direction vector determined via the rotation rates, but the orientation of the AIT 5 determined in this way is now deviating, this means that at least one drive wheel 10 of the AIT 5 does not have the prescribed angular speed. However, if the rotation angle sensors 129 each measure the prescribed angles of rotation (based on the prescribed speed), one of the drive wheels 10 is spinning. The change in orientation dictates which drive wheel 10 is affected (for example, if the AIT 5 is oriented to the left, the left drive wheel 10 is affected). The controller 126 now reduces the speed of at least one drive wheel 10, e.g. both drive wheels 10, in order to reduce the slip or, for example, to regain traction, measures the orientation of the AIT 5, and adjusts the wheel speeds of the drive wheels 10 in each case until the AIT 5 moves back into the prescribed trajectory. If, for example, slip is detected on the right drive wheel 10, the turning movement of the AIT 5 can be compensated for by reducing the speed of the left drive wheel. In the case of deviation of the detected angles, threshold values may be used overall, which are stored in the controller memory 127.

In an alternative and/or additional aspect, LIDAR, radar, and/or camera data used for determining position based on recorded maps of the environment of the AIT 5 and/or for determining driving speed are used to determine differences between measured odometry values and the actual distance traveled. In one aspect, recorded route markers stored in a memory 2 or the environment of the AIT 5 defined by obstacle characteristics (such as specific, preferably fixed obstacles and their orientation in the room) can also be used here. The position determination on the maps can also be used to correct the odometry values and inertial sensor values, with this process being performed continuously or at defined intervals, since the latencies for this evaluation are significantly greater than the hardware-oriented implementation via at least one inertial sensor 40.

Figure 25:
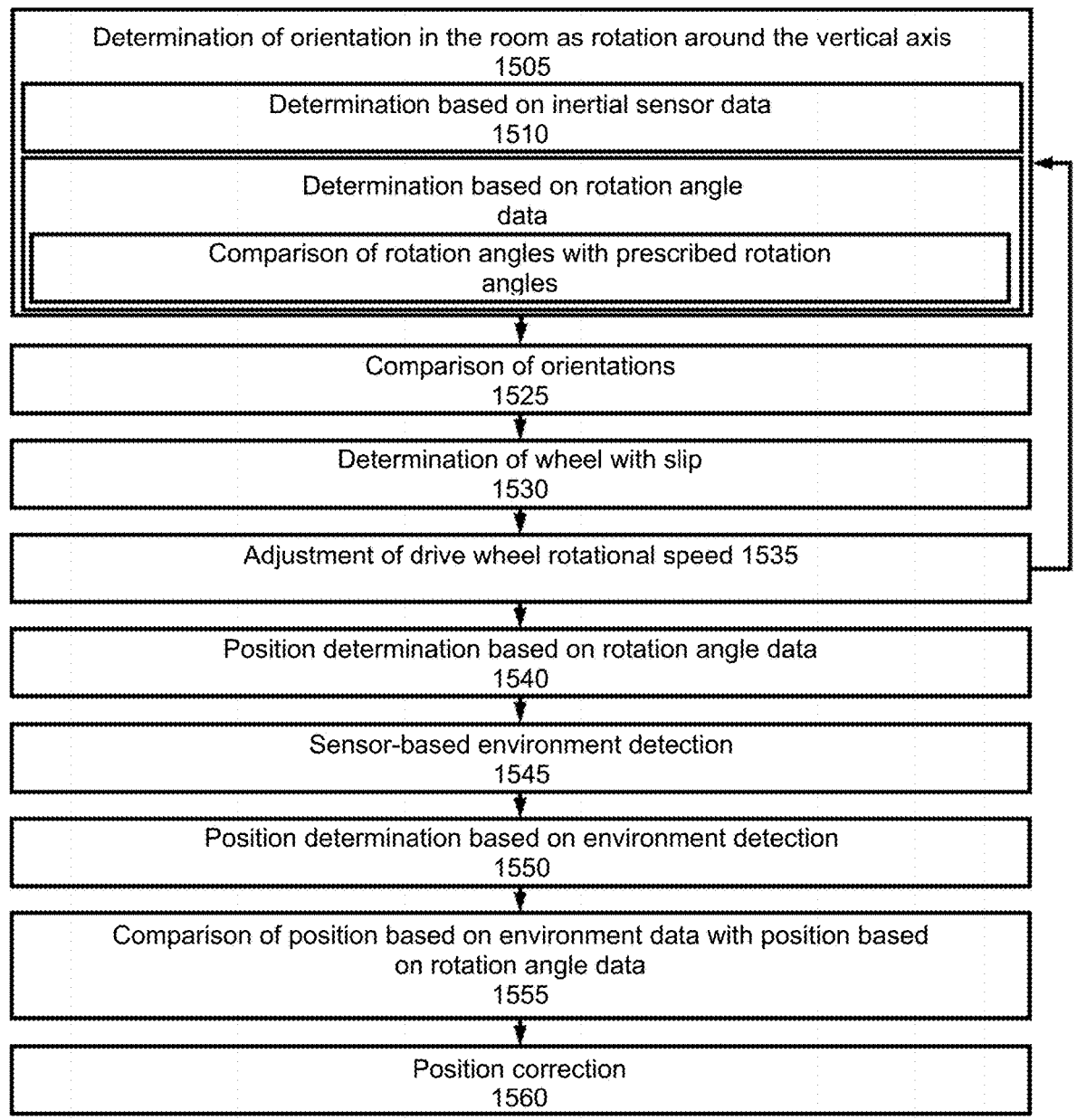
FIG. 25 is a flow chart illustrating a slip detection sequence in accordance with a preferred embodiment of the present invention.
Figure 26A:
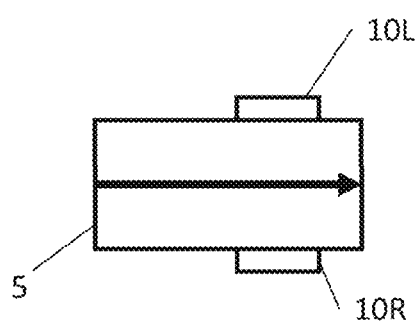
FIGS. 26A-26C are diagrams of a slip detection angle in accordance with a preferred embodiment of the present invention.
Figure 26B:
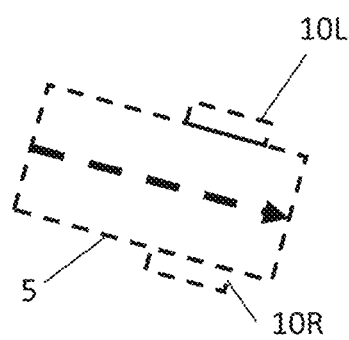
Figure 26C:
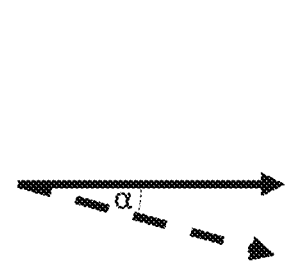

In summary, the process can be described as shown in FIG. 25, which illustrates slip detection in real time: The method for reducing the slip of an autonomous vehicle (e.g. an inventory robot, an industrial truck 5, a service robot, a cleaning robot, or a disinfection robot) comprises determining the orientation in the room as a rotation about the vertical axis (step 1505), e.g. in two different ways. In the process, inertial sensor data (step 1510) is evaluated as a first means to determine the rotation of the autonomous vehicle around the vertical axis. The data of the first path describes the true orientation of the autonomous vehicle (ground truth). In step 1515, as the second means, the orientation in the room as a rotation about the vertical axis is determined on the basis of the evaluation of rotation angle data, which is captured by means of rotation angle sensors 129. This rotation angle data describes the rotation of the drive wheels 10 of the autonomous vehicle. This can be determined directly, or indirectly via the rotation of a motor 6 and/or gearbox element 7, in each case as a component of, for example, the differential drive 124. The orientation of the autonomous vehicle based on the rotation angle data may be falsified by slip and therefore does not necessarily describe the true orientation of the autonomous vehicle. In step 1520, the measured rotation angle data is compared with prescribed rotation angle data. This means that, for example, a certain distance has been prescribed that the autonomous vehicle should cover by the time of measurement and which, based on the wheel diameter, is associated with a certain number of revolutions that can be translated into a rotation angle. A determination is therefore made as to whether the autonomous vehicle has indeed covered this prescribed distance, which is translated into a prescribed rotation angle, with this angle being compared to a sensor-determined rotation angle; if the rotation angles match, this distance has indeed been traveled. In step 1525, a comparison of the orientations, i.e. the rotations about the horizontal axis determined using the at least two methods (this horizontal axis being the axis which runs centrally between the drive wheels 10 of the autonomous vehicle, for example), is carried out. In this comparison, the deviations are determined, wherein, if a deviation of the orientation determined using at least two methods is ascertained and if the measured rotation angle data corresponds to prescribed rotation angle data of a drive wheel 10, the drive wheel 10 concerned exhibits slip. "Slip" refers to the spinning or blocking of a drive wheel 10 or the circumstance that the relative speed of the surfaces of the drive wheel 10 and of the floor with which it is engaged is not equal to zero. The drive wheel 10 with slip (step 1530) is determined as follows: FIGS. 26A-26C illustrates the determination of angle for the purpose of slip detection. FIG. 26A shows the AIT 5 with the left 10L and right 10R drive wheel. The solid arrow indicates the orientation prescribed by the inertial sensor 40 of the rotation about the vertical axis as a direction vector. FIG. 26B with the dashed arrow, on the other hand, indicates the actual orientation, measured by the rotation angle data, of the AIT 5 as a direction vector. FIG. 26C shows the angular difference a, with the direction vector of the inertial sensor serving as a reference. Here, there is a rotation of the AIT 5 in the mathematically negative direction, which is due to a spinning of the drive wheel 10R, or a relatively large spinning of the drive wheel (10R) compared to the drive wheel (10L). Slip therefore occurs at the drive wheel (10R) on the right side in the direction of travel when the rotation angle between the rotation determined by the first or third means as the reference direction vector and the rotation determined by the second means as the direction vector is mathematically negative. In step 1535, the speed of at least one drive wheel 10, e.g. the drive wheel 10 at which slip does not occur, is then adjusted. This is done until no more slip is measured, which means that a control loop is present. The drive wheel speed is adjusted for slip reduction within a time of 10 ms, for example.

These steps or aspects mentioned in the previous paragraph, for example, can be implemented in a controller 126, e.g. a motor controller, which is connected, for example, in two channels to at least two rotation angle sensors 129, where a Hall sensor, an encoder or incremental encoder, a stroboscopic tachometer, a tachogenerator, an inductive sensor, and/or a Wiegand sensor can be considered as a rotation angle sensor 129. Of these, the sensors can be connected in two channels, with one channel 152 transmitting analog signals and one channel 152 transmitting digital signals. The implementation of the sequences may in turn be implemented in a rotation evaluation unit 41 within the controller, which in turn may be connected to a camera 20, a LIDAR (15, 16), and/or a radar sensor 32, as well as a navigation module 110.

The rotation angle data is generally used to determine the position of the autonomous vehicle by way of the odometry module 121, but also to monitor the turning movements of the differential drive 124. The rotation angle data can thereby simultaneously be used to determine the direction of movement of the autonomous vehicle. The above-mentioned rotation determinations for determining the orientation of the autonomous vehicle are performed relative to a coordinate system of a map of the autonomous vehicle stored in the navigation module 110.

In one aspect, in a further step that is not implemented in the scope of the controller, for example, but rather, for example, in the navigation module 110, a sensor-based detection of the environment of the autonomous vehicle is carried out, e.g. by a camera 20, a LIDAR (15, 16), and/or a radar sensor 32, the position of the autonomous vehicle is determined on the basis of the environment data, the position of the autonomous vehicle determined on the basis of the environment data is compared with its position as determined on the basis of the rotation angle data and/or the data of the inertial sensor (IMU) 40, and the position of the autonomous vehicle is corrected upon determination of a deviation of the position. The position determination on the basis of the environment data can be performed in the scope of SLAM (Simultaneous Localization and Mapping), e.g. in the scope of a graph-based SLAM approach (see e.g. DOI: 10.1109/MITS.2010.939925) or by means of visual SLAM, where the autonomous vehicle corrects positions determined on the basis of rotation angle data by carrying out environment detection and evaluation.

The system and method for reducing the slip of an autonomous vehicle are characterized here by the following aspects ARS1-ARS25:

ARS1. Method for reducing the slip of an autonomous vehicle, comprising
the determination of the rotation of the autonomous vehicle about the vertical axis by two different means;
the comparison of the determined rotations;
the determination of the deviation;
the adjustment of the speed of at least one drive wheel (10).

ARS2. Method according to ARS1, wherein a first path for determining the rotation of the autonomous vehicle about the vertical axis comprises evaluating inertial sensor data.

ARS3. Method according to ARS1, wherein a second means for determining the rotation of the autonomous vehicle about the vertical axis comprises evaluating rotation angle data.

ARS4. Method according to ARS2, wherein the inertial sensor data describes the true orientation of the autonomous vehicle.

ARS5. Method according to ARS3, wherein the rotation angle data describes the non-true orientation of the autonomous vehicle based on slip.

ARS6. Method according to ARS3, wherein the rotation angle data describes the rotation of the drive wheels (10) of the autonomous vehicle.

ARS7. Method according to ARS3, further comprising a comparison of the measured rotation angle data with prescribed rotation angle data.

ARS8. Method according to ARS7, wherein, if a deviation of the orientation determined by at least two means is ascertained and if the measured rotation angle data matches prescribed rotation angle data of a drive wheel (10), the drive wheel (10) concerned exhibits slip.

ARS9. Method according to ARS8, wherein slip occurs at the drive wheel (10R) on the right side in the direction of travel (and vice versa) when the rotation angle between the rotation determined by the first or third means as a reference direction vector and the rotation determined by the second means as a direction vector is mathematically negative (or positive).

ARS10. Method according to ARS9, further comprising the adjustment of the speed of at least one drive wheel (10) until no slip is detected.

ARS11. Method according to ARS3, wherein the rotation angle data represents the rotation of a motor (6), gearbox element (7) and/or a drive wheel (10).

ARS12. Method according to ARS3, wherein a direction of movement of the autonomous vehicle is determined on the basis of the rotation angle data.

ARS13. Method according to ARS1, wherein the rotation is determined relative to a coordinate system of a map of the autonomous vehicle stored in the navigation module 110 and/or in the memory (2).

ARS14. Method according to ARS1, wherein the speed is adjusted within under 100 ms.

ARS15. Method according to ARS1, further comprising the determination of the position of the autonomous vehicle on the basis of rotation angle data.

ARS16. Method according to ARS15, further comprising
the sensor-based environment detection of the autonomous vehicle;
the determination of the position of the autonomous vehicle on the basis of the environment data;
the comparison of the position determined on the basis of the environment data with the position of the autonomous vehicle determined on the basis of the rotation angle data and/or inertial sensor data; and
the correction of the position of the autonomous vehicle upon determining a deviation of the position.

ARS17. Method according to ARS16, wherein the position data determined by mean of the environment detection describes the true position.

ARS18. Method according to ARS1, wherein the autonomous vehicle is an inventory robot, an industrial truck (5), a service robot, a cleaning robot, or a disinfection robot.

ARS19. Device for performing the method according to ARS1-ARS18.

ARS20. Device according to ARS19, wherein the device is, at least in part, a motor controller.

ARS21. System comprising a controller 126; an inertial sensor (40); at least one rotation angle sensor (129) such as a Hall sensor, encoder or incremental sensor, stroboscopic tachometer, tachogenerator, inductive sensor, and/or a Wiegand sensor; a circuit for evaluating the retroactive generator voltage (electromotive force); a rotation evaluation unit (41); a camera (20, 31), a LIDAR (15, 16), and/or a radar sensor (32); and a navigation module (110).

ARS22. System according to ARS21, further comprising a two-channel connection between at least two rotation angle sensors (129) and the controller (126).

ARS23. System according to ARS22, wherein one channel (152) transmits analog signals and one channel (152) transmits digital signals.

Example 7: Cost Function in the Scope of Navigation Based on Rechargeable Battery Characteristics In one aspect, the AIT 5 is configured in such a way that the AIT 5 takes a cost function into account that considers a linkage of SoH and SoC, i.e. the actual stored energy=U*SoH*SoC, (used as a basis for planning) is used, e.g. 2 KWh=20 V*100 Ah (battery test capacity)*100% state of charge ("full").

Example 8: Energy Management and Order Planning

In one aspect, the AIT 5 or an autonomous vehicle, another AIT 5 or another autonomous vehicle, or a management system connected to the AIT 5 or another autonomous vehicle is configured in such a way that the AIT 5 or autonomous vehicle manages orders, e.g. transport orders, depending on the state of charge of the rechargeable battery 4 of the or of one AIT 5 or an autonomous vehicle. This means, for example, that if the state of charge of an AIT 5 or autonomous vehicle falls below a threshold value, the latter does not accept a transport order; instead, the order is assigned to another AIT 5 or autonomous vehicle, where the assignment can be performed by the AIT 5 or autonomous vehicle itself, another AIT 5 or autonomous vehicle, or by a management system (e.g. 36). Instead of the state of charge falling below a threshold value, it is also possible for these follow-up actions to be taken if the AIT 5 or autonomous vehicle that was to perform the order has a scheduled charging operation at the time of the order or while the order is being performed.

Figure 14:
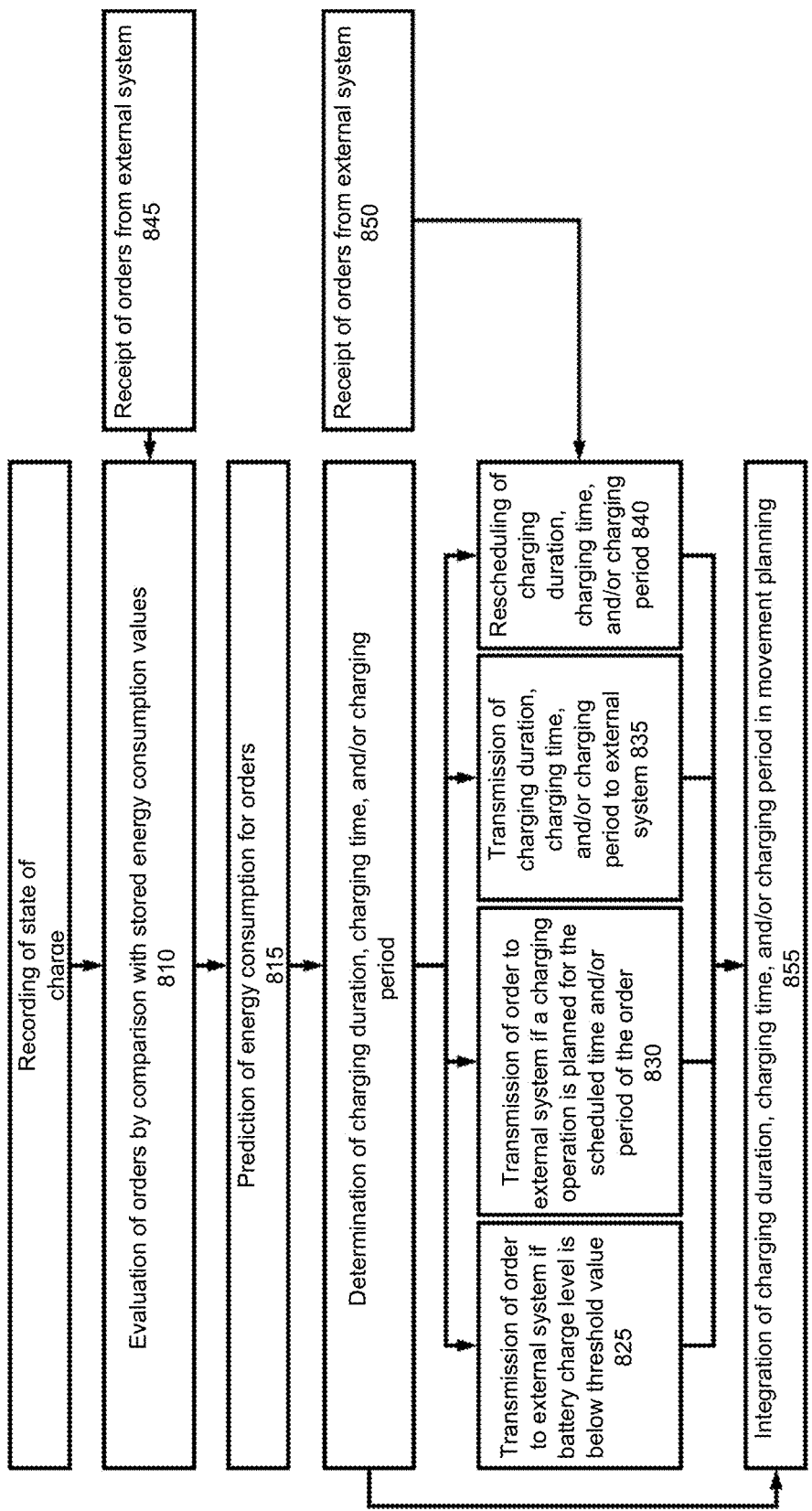
FIG. 14 is a flow chart of energy management and robot control sequence in accordance with a preferred embodiment of the present invention.

The sequence of energy management or the AIT controller can be summarized as follows in FIG. 14: Detection of the current state of charge of the rechargeable battery (step 805), e.g. by measuring the cell voltage or by impedance spectroscopy and comparison with stored values. In a next step, received orders are evaluated by comparing the orders with stored energy consumption values (step 810). The energy consumption values may be energy consumption values between two coordinates or between waypoints along a path. The orders may in turn be transmitted by an external system (step 845). The energy consumption values stored in the memory (2, 38) may, for example, be values that comprise energy consumption per distance traveled and that have been determined empirically, e.g. also as a prediction. Furthermore, such energy consumption values may also be available for the distances associated with orders and/or Euclidean distances between the coordinates of orders can be used, if applicable rounded up by a correction factor for driving around obstacles. A prediction is then made about the expected energy consumption values (step 815), e.g. by multiplying the number of orders, the distance per order and the energy consumption per defined distance. In a further step, the charging duration, the charging time and/or the charging period for the rechargeable battery 4 is determined (step 820). In this case, a determination is made as to when charging must take place, e.g. based on a predicted energy consumption value. However, it is also taken into account, for example, how orders behave over time, e.g. based on determined empirical values. For example, order gaps are taken into account, i.e. time frames between two orders to which a charging operation is assigned in order to charge the rechargeable battery 4, thereby increasing the utilization of the AIT 5. These time frames, in turn, define a possible charging duration or a start and/or end time or a charging period. In these described scenarios, the orders specify the charging periods. In one aspect, the charging periods may also represent availability for orders. In addition, the AIT 5 can, for example, also directly adjust its movements in the movement planner 115 (step 855), e.g. only implement short orders that only require a short distance to be covered, in order to allow the rechargeable battery 4 to be recharged on time, for example. For example, the charging duration, charging time, and/or the charging period are transmitted to an external system (step 835), such as a fleet management system, which does not assign any orders to the relevant AIT 5 during the planned charging operation. However, instead of a fleet management system, other AITs 5 may receive information that an AIT 5 is planning or performing a charging operation and accordingly adjust their routes as part of a movement planning process and/or not plan a charging operation of their own during this period (see e.g. step 855). In one aspect, the AIT 5 may also transmit an order to an external system when the state of charge of the rechargeable battery 4 falls below a threshold value (step 825) or when a charging operation is scheduled for the time period in which an order is planned (step 830). Depending on the order, however, a determined charging duration, charging time, and/or charging period can also be rescheduled (step 840), e.g. after receipt of orders by an external system (step 850). As a result, all transfers of orders or charging periods may entail an adjustment of the movement planning (step 855). Finally, the external system may be an autonomous vehicle such as a service robot, an industrial truck (AIT), a disinfection robot, or an inventory robot, or even an external server (37, 38).

Energy management is characterized here by the following aspects AE1 to AE11:

AE1. Computer-implemented method for monitoring the state of charge of a rechargeable battery (4), comprising
the detection of the current state of charge of the rechargeable battery (4);
the evaluation of received orders by comparing the orders with energy consumption values stored in the memory (2, 38);
the prediction of future energy consumption based on the orders received; and
the determination of the charging duration, charging time and/or charging period for the rechargeable battery (4).

AE2. Computer-implemented method according to AE1, further comprising the transmission of the determined charging duration, charging time, and/or charging period to an external system (e.g. 5, 36).

AE3. Computer-implemented method according to AE1, further comprising the receipt of orders by an external system (e.g. 5, 36).

AE4. Computer-implemented method according to AE1 further comprising
the receipt of a charging duration, charging time, and/or charging period from an external system (e.g. 5, 36); and
the rescheduling of the determined charging duration, charging time, and/or charging period.

AE5. Computer-implemented method according to AE1, further comprising the integration of the charging time, charging duration, and/or charging period in the scope of movement planning.

AE6. Computer-implemented method according to AE1, further comprising transmitting a received order to an external system (e.g. 5, 36) when the state of charge of the rechargeable battery 4 is below a threshold value.

AE7. Computer-implemented method according to AE1, further comprising the transmission of a received order to an external system (e.g. 5, 36) when a charging operation is planned for the scheduled order time or period.

AE8. Computer-implemented method according to AE3, AE4, AE6, or AE7, wherein the external system (e.g. 5, 36) is a server (37) or an autonomous vehicle.

AE9. Computer-implemented method according to AE1, wherein the stored energy consumption values are energy consumption values between two waypoints.

AE10. Device according to AE8, wherein the autonomous vehicle is a service robot, an industrial truck (5), a disinfection robot, or an inventory robot.

AE11. Device for performing the method according to AE1-AE11.

AE12. Device according to AE10, wherein the device is a service robot, an industrial truck (5), a disinfection robot, or an inventory robot.

Example 9: Autonomous Industrial Truck with Sensors

The autonomous industrial truck with sensors is characterized here by the following aspects ASNTR1 to ASNTR16:

ASNTR1. Autonomous industrial truck (5) with a height-adjustable load platform (12), at least one sensor for scanning the environment in the primary direction of travel, with the autonomous industrial truck having at least one rear-facing sensor unit (17).

ASNTR2. Autonomous industrial truck (5) according to ASNTR1, wherein the rear-facing sensor unit (17) includes at least one sensor unit camera (20).

ASNTR3. Autonomous industrial truck (5) according to ASNTR1, comprising at least one light (e.g. 19) for illuminating the field of view of the sensor unit camera (20).

ASNTR4. Autonomous industrial truck (5) according to ASNTR1, wherein the rear-facing sensor unit (17) has a spatially resolving distance sensor.

ASNTR5. Autonomous industrial truck (5) according to ASNTR4, wherein the spatially resolving sensor is a LIDAR (18).

ASNTR6. Autonomous industrial truck (5) according to ASNTR1, wherein the rear-facing sensor unit (17) is located below the load platform (12).

ASNTR7. Autonomous industrial truck (5) according to ASNTR1, further comprising a load platform load sensor (21) for determining the position of a load (143) on and/or above the load platform (12).

ASNTR8. Autonomous industrial truck (5) according to ASNTR7, wherein the load platform load sensor (21) for determining the position of a load (143) on and/or above the load platform (12) performs a contactless determination of the load position.

ASNTR9. Autonomous industrial truck (5) according to ASNTR7, wherein the load platform load sensor (21) for determining the position of a load (143) on and/or above the load platform (12) performs a contact-based determination of the load position.

ASNTR10. Autonomous industrial truck (5) according to ASNTR7, wherein the load platform load sensor (21) for determining the position of a load (143) on and/or above the load platform has at least one sensor (e.g. 44) recessed into the load platform and/or a sensor (e.g. 22) that detects parallel to the load platform.

ASNTR11. Autonomous industrial truck (5) according to ASNTR7, wherein the load platform load sensor (21) has infrared sensors for determining the position of a load (143) on and/or above the load platform (12).

ASNTR12. Autonomous industrial truck (5) according to ASNTR7, wherein the load platform load sensor (21) for determining the position of a load (143) on and/or above the load platform (12) is designed as a strain gauge.

ASNTR13. Autonomous industrial truck (5) according to ASNTR7, wherein the load platform load sensor (21) for determining the position of a load (143) on and/or above the load platform (12) comprises a laser distance sensor (22).

ASNTR14. Autonomous industrial truck (5) according to ASNTR13, wherein the laser distance sensor (22) comprises an extended measuring spot.

ASNTR15. Autonomous industrial truck according to ASNTR13, wherein the dead zone of the laser distance sensor (22) is located within the superstructure (13) of the autonomous industrial truck (5).

ASNTR16. Autonomous industrial truck according to ASNTR9, wherein the load platform load sensor (21) has at least one contact sensor (23) for determining the position of a load (143) on and/or above the load platform (12).

Example 10: Navigation for Transporting Loads

A method of navigation for transporting loads 143 is characterized here by the following aspects ANTL1 to ANTL16:

ANTL1. Computer-implemented method for controlling an autonomous industrial truck (5), comprising
the detection of the environment of the autonomous industrial truck (5) and
the detection and evaluation of patterns;
with the patterns including the recognition of a marker (202) and/or rail (201), and/or identification devices (e.g. 203).

ANTL2. Computer-implemented method according to ANTL1, wherein the marker (202), rail (201), and/or identification devices (e.g. 203) are parallel to parked trolleys (200).

ANTL3. Computer-implemented method according to ANTL1, further comprising the reading of a recognized identification device (e.g. 203) and comparison of the read-out value with a value stored in memory (2, 38).

ANTL4. Computer-implemented method according to ANTL2, wherein the identification device is a trolley row identification device (203) of a trolley row.

ANTL5. Computer-implemented method according to ANTL3 further comprising
the reading of an identification device (e.g. 203);
the determination of the position of the autonomous industrial truck (5); and
the subsequent repositioning of the autonomous industrial truck (5).

ANTL6. Computer-implemented method according to ANTL1 comprising
the reading of the length of a trolley (200) stored in the memory (2, 38);
the backward movement of the autonomous industrial truck (5);
the determination of the distance of the autonomous industrial truck (5) to obstacles or trolleys (200);
driving under a load (143) and
lifting the load platform (12).

ANTL7. Computer-implemented method according to ANTL7 further comprising
the determination of the position of the load (143) or potential load (143) on the load platform (12),
with the autonomous industrial truck (5) driving under the load (143) only up to a threshold value.

ANTL8. Computer-implemented method according to ANTL1 comprising
the determination of the distance to the end point of a marker (202), rail (201), or identification device (e.g. 203);
setting down a load (143);
with the marker (202), rail (201) and/or identification device (e.g. 203) being substantially parallel to the trolley (200) to be set down.

ANTL9. Computer-implemented method according to ANTL1 comprising
  the determination of the distance to an obstacle or trolley (200) and
  setting down a load (143).

ANTL10. Computer-implemented method according to ANTL8-9, wherein the set-down position is within a threshold value from a determined obstacle or trolley (200) in the direction of travel.

ANTL11. Computer-implemented method according to ANTL8-9, wherein the autonomous industrial truck (5) is aligned before setting down a load (143) as follows:
  alignment parallel to the at least one parked trolley (200) or a marker (202), rail (201), and/or identification device (e.g. 203);
  with the distance being lateral and at least 5 mm, in one aspect at least 10 mm.

ANTL12. Computer-implemented method according to ANTL8-10, wherein the distances to at least one parked trolley (200) are determined by means of a LIDAR (18), camera (30), or radar (32).

ANTL13. Computer-implemented method according to ANTL8-11, wherein the load (143) is set down at the end point of the marker (202), rail (201), identification device (e.g. 203), or at a distance to an obstacle or trolley (200).

ANTL14. Device for performing the method according to ANTL1-ANTL13.

Example 11: Waiting Position 1

The determination of a waiting position is characterized here by the following aspects AWA1-AWA22:

AWA1. Computer-implemented method for determining probabilities for the location and time of orders, comprising
  the recording of data regarding the location and time of completed orders;
  storing recorded data in a spatially and temporally resolved way;
  the determination of probabilities based on the recorded data regarding the time and location at which an order should be expected.

AWA2. Computer-implemented method according to AWA1, wherein the order is a transport order, an inventory order, an interaction order, or a cleaning or disinfection order AWA3. Computer-implemented method according to AWA1, wherein locations for which the probability is above a threshold value represent waiting locations.

AWA4. Computer-implemented method according to AWA1, wherein locations for which the probability is above a threshold value are stored in a navigation module (110).

AWA5. Computer-implemented method according to AWA1, wherein the temporal resolution is seasonal.

AWA6. Computer-implemented method according to AWA1, further comprising making the acquired data and/or the determined probabilities available via an interface to other systems (e.g. 5, 36).

AWA7. Computer-implemented method according to AWA1, further comprising making the acquired data and/or determined probabilities available via an interface of other systems (e.g. 5, 36).

AWA8. Computer-implemented method according to AWA1, further comprising supplementing recorded data with the data made available and a determination of the probabilities.

AWA9. Computer-implemented method according to AWA3, further comprising transmitting the waiting position data to at least one system (e.g. 5, 36) in the event that no order is performed.

AWA10. Computer-implemented method according to AWA2-AWA3, further comprising changing the threshold values if there is an object at a position with a high order probability.

AWA11. Computer-implemented method according to AWA1, wherein moving objects are detected in a spatially and temporally resolved way and the captured data is stored.

AWA12. Computer-implemented method according to AWA11, further comprising the determination of probabilities based on the recorded data regarding the time and location at which moving object should be expected AWA13. Computer-implemented method according to AWA12, further comprising the creation of at least one spatially and/or temporally resolved map of moving objects based on the captured data.

AWA14. Computer-implemented method according to AWA3 and AWA13, wherein a waiting position refers to areas where the density of moving objects is below a threshold value.

AWA15. Computer-implemented method according to AWA3 or AWA14, further comprising the positioning of an autonomous vehicle at a waiting position.

AWA16. Computer-implemented method according to AWA15, further comprising the positioning of an autonomous vehicle at a waiting position according to AWA15, if the autonomous vehicle is not performing an order.

AWA17. System for performing the method according to AWA1-AWA16.

AWA18. System according to AWA17, wherein the system is an autonomous vehicle.

AWA19. System according to AWA18, wherein the autonomous vehicle is an autonomous industrial truck, a service robot, an inventory robot, or a disinfection robot.

AWA20. System according to AWA18, wherein the autonomous vehicle is an autonomous vehicle that remains in the areas where the probability of an order is above a threshold value during phases without an order.

AWA21. System according to AWA18, wherein other systems without an order take a different position than the autonomous vehicle that does not carry out an order.

AWA22. System according to AWA17, wherein the system is a self-learning system.

Example 12: Waiting Position 2

The determination of a waiting position is characterized here by the following aspects AWB1-AWB6:

AWB1. Self-learning system for determining probabilities of occurrence for the location and time of moving objects, comprising a waiting position module (116) for evaluating acquired position data of moving objects over time and for determining probabilities of occurrence for moving objects within defined time intervals.

AWB2. Self-learning system according to AWB1, wherein the waiting position module (116) evaluates stored and traveled paths determined by a path planning module (112) and/or recorded by an odometry module (121).

AWB3. Self-learning system according to AWB1, wherein a map with waiting positions is created in a mapping module (117) based on the evaluation of the waiting position module.

AWB4. Self-learning system according to AWB3, wherein a movement planner (115) and/or a path planning module (112) performs path planning and/or movement planning for a system (e.g. 5) based on data from the mapping module (117).

AWB5. Self-learning system according to AWB1, wherein the acquired position data was acquired by means of a camera (31), a radar sensor (32), an ultrasonic sensor, or a LIDAR (15, 16).

AWB6. System according to AWB1 or AWB4, wherein the system is an autonomous industrial truck (5), a disinfection robot, a cleaning robot, a service robot, or an inventory robot.

AWB7. System according to AWB2, wherein the paths were determined while completing an order.

AWB8. System according to AWB7, where the order is a transfer order, an inventory order, a cleaning order, or a disinfection order.

AWB9. System according to AWB3, where a waiting position is characterized by a high probability of seasonal or shift-related orders and a low probability of encountering moving objects.

Example 13: Protection Mechanisms

Protection mechanisms are characterized here by the following aspects AS1-AS52:

AS1. Controller (126) for an autonomous vehicle (e.g. 5), comprising at least one rotation angle sensor (129) connected via an interface, with at least one controller memory (127), with the controller (126) directly or indirectly monitoring the acceleration and/or speed of the autonomous vehicle (e.g. 1, 5) and able to force a speed reduction.

AS2. Controller according to AS1, wherein the controller (126) has a stored time interval and a target speed in the controller memory (127), with the controller (126) monitoring the acceleration time of the motor (6) and forcing the termination of a motor movement if the target speed has not been reached within the time interval stored in the controller memory (127).

AS3. Controller according to AS1, wherein the monitoring comprises the detection and evaluation of the currents and/or the torque of the motor (6).

AS4. Controller according to AS2, further comprising a counting unit (128) for determining the duration of the acceleration.

AS5. Controller according to AS2, wherein the time interval is speed-dependent.

AS6. Controller according to AS2, wherein the time interval is mass-dependent.

AS7. Controller according to AS2, wherein the time interval is dependent on the buffer characteristics of a bumper or safety edge (28).

AS8. Controller according to AS1, wherein the autonomous vehicle (e.g. 1) is an autonomous industrial truck (5), a service robot, a disinfection robot, or a cleaning robot.

AS9. Controller according to AS1, wherein the speed reduction is performed independently of instructions that applications of the autonomous vehicle (e.g. 5) send to the controller (126).

AS10. Controller according to AS1, wherein a defined speed is stored in the memory (2, 127, 135).

AS11. Controller according to AS10, wherein the defined speed depends on the weight and/or geometry of the autonomous vehicle (e.g. 1, 5).

AS12. Controller according to AS1, wherein distance threshold values are stored in the memory (2, 135) in at least two-dimensional space.

AS13. Controller according to AS12, wherein the distance threshold values result from the maximum speed of the autonomous vehicle (e.g. 1, 5) and the defined speed.

AS14. Controller according to AS12, wherein the distance threshold values can be nested within each other.

AS15. Controller according to AS12, wherein the distance thresholds are compared with distances measured by sensors (e.g. 15, 16, 31, 32).

AS16. Controller according to AS15, wherein the sensors (e.g. 15, 16, 31, 32) detect obstacles and the distances are derived from the distance of the obstacles to the sensor (e.g. 15, 16, 31, 32).

AS17. Controller according to AS1, wherein, when the autonomous vehicle (e.g. 5) is on sloping terrain, the controller (126) maintains a speed of zero in order to prevent the autonomous vehicle (e.g. 1, 5) from rolling away.

AS18. Controller according to AS1, wherein sensor data is transmitted in at least two channels.

AS19. Controller according to AS1, wherein the sensor data is transmitted through digital and analog means.

AS20. Controller according to AS1, wherein the speed monitoring is based on two different physical measuring principles.

AS21. Controller according to AS1, wherein the speed is monitored by measuring the rotation angle of the motor (6), a gearbox component (7), and/or a drive wheel (10).

AS22. Controller according to AS1, wherein the rotation angle sensor (129) is a Hall sensor and/or an encoder or incremental encoder.

AS23. Controller according to AS1, wherein the speed is measured by optical sensors (e.g. 15, 16, 31), ultrasound, and/or radar (32).

AS24. Controller according to AS1, wherein the speed is monitored by determining the change in position of the autonomous vehicle (e.g. 1, 5) relative to fixed obstacles or landmarks in its environment.

AS25. Controller according to AS24, wherein the fixed obstacles and/or landmarks are stored in a map located in the memory (2) of the autonomous vehicle (e.g. 1, 5).

AS26. Controller according to AS1, wherein the speed is monitored by an optical sensor (32) facing a surface that determines speed based on measured changes in the surface structure relative to the autonomous vehicle (e.g. 5).

AS27. Controller according to AS26, wherein a defined viewing window is used for this purpose.

AS28. Controller according to AS1, wherein a processor (130) compares sensor data obtained on at least two channels and/or by at least two different physical measuring principles.

AS29. Controller according to AS28, wherein discrepancies between the data obtained via at least both channels and/or the sensor data obtained by the at least two different physical measuring principles, provided they are each above a defined threshold value, trigger a speed reduction of the autonomous vehicle (e.g. 5).

AS30. Controller according to AS1, wherein the controller (126) is monitored via a watchdog (131) that triggers a speed reduction of the autonomous vehicle (e.g. 5) if the controller (126) is no longer supplied with power.

AS31. Controller according to AS30, wherein an electronic circuit (132) short-circuits the motor (6) via at least one actively controlled semiconductor device.

AS32. Controller according to AS31, wherein a relay (133) short-circuits the motor (6).

AS33. Controller according to AS31 and AS32, wherein the relay (133) and electronic circuit (132) are connected in parallel.

AS34. Controller according to AS30, wherein an electronically controlled mechanical brake (134) is triggered in the event of a voltage drop (dead man's switch principle) and brakes the autonomous vehicle (e.g. 1, 5).

AS35. Method for speed monitoring of an autonomous vehicle (e.g. 1, 5), comprising
the detection of the speed and/or acceleration of the autonomous vehicle (e.g. 1, 5);
the comparison of the detected speed and/or acceleration with stored speeds and/or accelerations;
the reduction of the speed and/or acceleration based on the speed and/or acceleration comparison.

AS36. Method for speed monitoring of an autonomous vehicle (e.g. 1, 5), comprising
the detection of the speed and/or acceleration of the autonomous vehicle (e.g. 1, 5) by at least two means;
Comparison of the speeds and/or accelerations detected by at least two methods;
the reduction of the speed and/or acceleration based on the speed and/or acceleration comparison.

AS37. Method according to AS35-36, wherein the speed and/or acceleration of the autonomous vehicle (e.g. 1, 5) is monitored directly or indirectly.

AS38. Method according to AS35-36, wherein the detection signals of the speed and/or acceleration of the autonomous vehicle (e.g. 1, 5) are transmitted in two channels.

AS39. Method according to AS35-36, wherein the detection signals of the speed and/or acceleration of the autonomous vehicle (e.g. 1, 5) are transmitted through analog and digital means.

AS40. Method according to AS35-36, wherein the speed and/or acceleration of the autonomous vehicle (e.g. 1, 5) is detected using two different physical measuring principles.

AS41. Method according to AS35-36, wherein the speed and/or acceleration monitoring includes a detection of motor currents.

AS42. Method according to AS35-36, wherein the speed and/or acceleration monitoring includes a detection of torques of a motor (6).

AS43. Method according to AS35-36, wherein the stored speeds and/or accelerations are mass-dependent.

AS44. Method according to AS35-36, wherein the reduction in speed and/or acceleration is independent of instructions prescribed by applications of the autonomous vehicle.

AS45. Method according to AS35-36, further comprising controlling the speed to zero when the autonomous vehicle (e.g. 1, 5) is on sloping terrain.

AS46. Method according to AS35-36, wherein the speed and/or acceleration is/are detected by measuring the rotation angle of a motor (6), a gearbox component (7), or a drive wheel (10).

AS47. Method according to AS46, wherein the measurement of the rotation angle is performed by a Hall sensor and/or an encoder or incremental encoder.

AS48. Method according to AS35-36, wherein the speed is measured by detecting the position of the autonomous vehicle (e.g. 1, 5) relative to its environment and evaluating the time required for the position change.

AS49. Method according to AS37-40, wherein the comparison of speed and/or acceleration is a comparison of speeds and/or accelerations detected on two paths.

AS50. Method according to AS35 or AS36, further comprising monitoring the power supply to a controller (126) and reducing the speed when power is no longer supplied to the controller.

AS51. Method according to AS50, wherein the speed is reduced by releasing an electronically held mechanical brake (134) (dead man's switch principle).

AS52. Method according to AS50, wherein the speed is reduced by switching a relay (133) that interrupts the power supply to a motor (6).

AS53. Device for performing the method according to AS35-AS52.

Example 14: Evaluation of a Load

Figure 18:
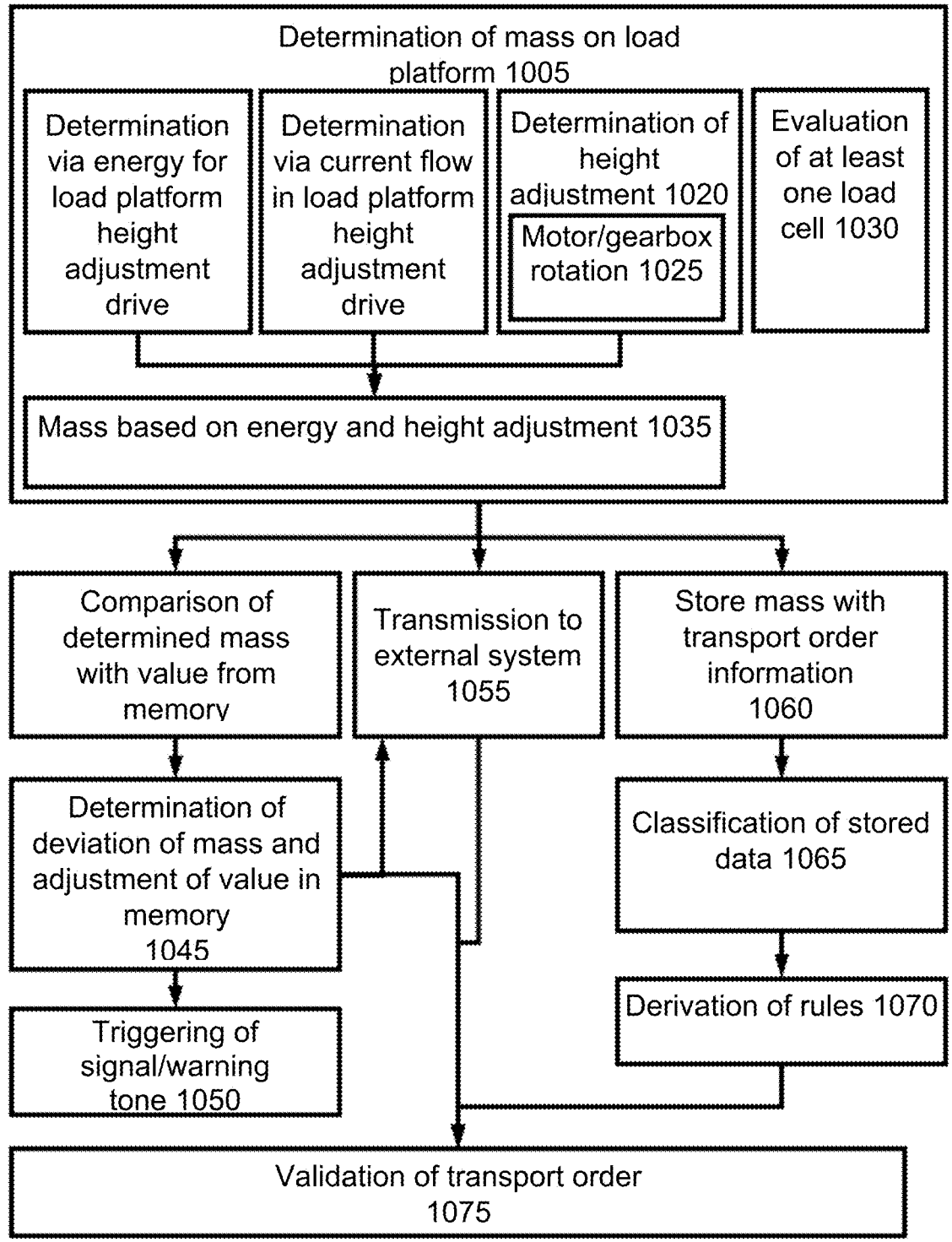
FIG. 18 is a flow chart illustrating load evaluation in accordance with a preferred embodiment of the present invention.

The sequence for evaluating a load is illustrated in FIG. 18. In step 1005, the mass on the load platform 12 is determined by one of several means: In step 1010, the energy for the load platform height adjuster 14 is determined and/or the current flow in the load platform height adjustment drive 14 is determined. In step 1020, on the other hand, the height adjustment of the load platform 12 carried out by the load platform height adjustment drive 14 is evaluated, e.g. by determining the rotation of the motor or a gearbox of the load platform height adjustment drive (step 1025). Based on these parameters, the mass can be determined via mass=energy/(g*height) in step 1035. Alternatively and/or additionally, at least one load platform load sensor 21 can be evaluated, which is designed as a load cell, e.g. specifically as a strain gauge (step 1030).

A comparison of the determined mass with a value from a memory (2, 38, 127) is then carried out (step 1040), e.g. in the form of a threshold comparison. If it is ascertained that the determined mass deviates from the value from the memory (2, 38), a value in the memory (2, 38) is adjusted, for example. This value may, for example, be transmitted to an external system 36 (step 1055), a signal or warning tone may be triggered (step 1050), and/or a validation of the transport order may be performed (step 1075). In one aspect, the determined mass may be stored along with transport order information 1060, followed by a classification of the stored data 1065 and a derivation of rules 1070, followed by the validation of the transport order 1075. "Transport order information" refers, for example, to the start and target positions of a load 143, a schedule for transport, etc. The classification of the stored data in step 1064 may imply, for example, the derivation of patterns, in one aspect such that, for example, certain masses are associated with certain routes or seasonal aspects such as shifts, from which rules may be derived in step 1070 that, for example, allow mass deviations to indicate possible errors in the production process, which in turn results in an alarm (step 1050), which is determined in the scope of the validation in step 1075. In one aspect, the validation of the transport order may imply an abort of the order, e.g. if the determined mass does not match a stored mass and thus the AIT 5 has picked up an incorrect load 143, for example.

Mass determination and validation are characterized here by the following aspects AMV1-AMV15:

AMV1. Computer-implemented method for evaluating a load (143) of an autonomous industrial truck (5),
the determination of the mass of a load (143) on the load platform (12) of the autonomous industrial truck (5);
the comparison of the determined mass on the load platform (12) with a mass stored in a memory (2, 38, 127).

AMV2. Computer-implemented method according to AMV1, wherein the mass is determined via the energy required by the load platform height adjustment drive (14) and/or the current flow in the load platform height adjustment drive (14) and the determination of the height adjustment of the load platform (12).

AMV3. Computer-implemented method according to AMV2, wherein the height adjustment of the load platform (12) is performed by evaluating the revolutions of the motor (6) and/or a gearbox (7) or gearbox component.

AMV4. Computer-implemented method according to AMV1, wherein the mass is determined by means of at least one load platform load sensor (21), which is designed as a load cell.

AMV5. Computer-implemented method according to AMV1, further comprising the storing of the determined mass together with information from the associated transport order.

AMV6. Computer-implemented method according to AMV1, further comprising transmitting the determined mass to an external system (36) connected via an interface (122, 123).

AMV7. Computer-implemented method according to AMV1, further comprising the determination of a deviation of the determined mass from a threshold value and adjusting a value in a memory (2, 38).

AMV8. Computer-implemented method according to AMV7, further comprising
the triggering of a light signal and/or a warning tone and/or
the transmission of information to an external system (36) via an interface (122, 123) when in each case a deviation of the determined mass from a threshold value has been detected.

AMV9. Computer-implemented method according to AMV1, further comprising the storing of the determined mass and information from a transport order in a memory (2, 38).

AMV10. Computer-implemented method according to AMV9, wherein the information from the transport order comprises the start and/or target position of a load (143), dimensions of the load (143), and/or temporal parameters.

AMV11. Computer-implemented method according to AMV9, further comprising a classification of the stored data.

AMV12. Computer-implemented method according to AMV11, further comprising the derivation of rules based on the classification.

AMV13. Computer-implemented method according to AMV11, further comprising storing values in a memory (2, 38) with which the measured masses are compared.

AMV14. Computer-implemented method according to AMV1, further comprising a validation of the transport order based on the determined mass.

AMV15. Computer-implemented method according to AMV14, wherein a validation is a direct or indirect verification of production quantities stored in a production planning system with the mass of the transported load (143).

AMV16. Device for performing the method according to AMV1-AMV15.

Example 15: Position and/or Overhang of the Load

Figure 19:
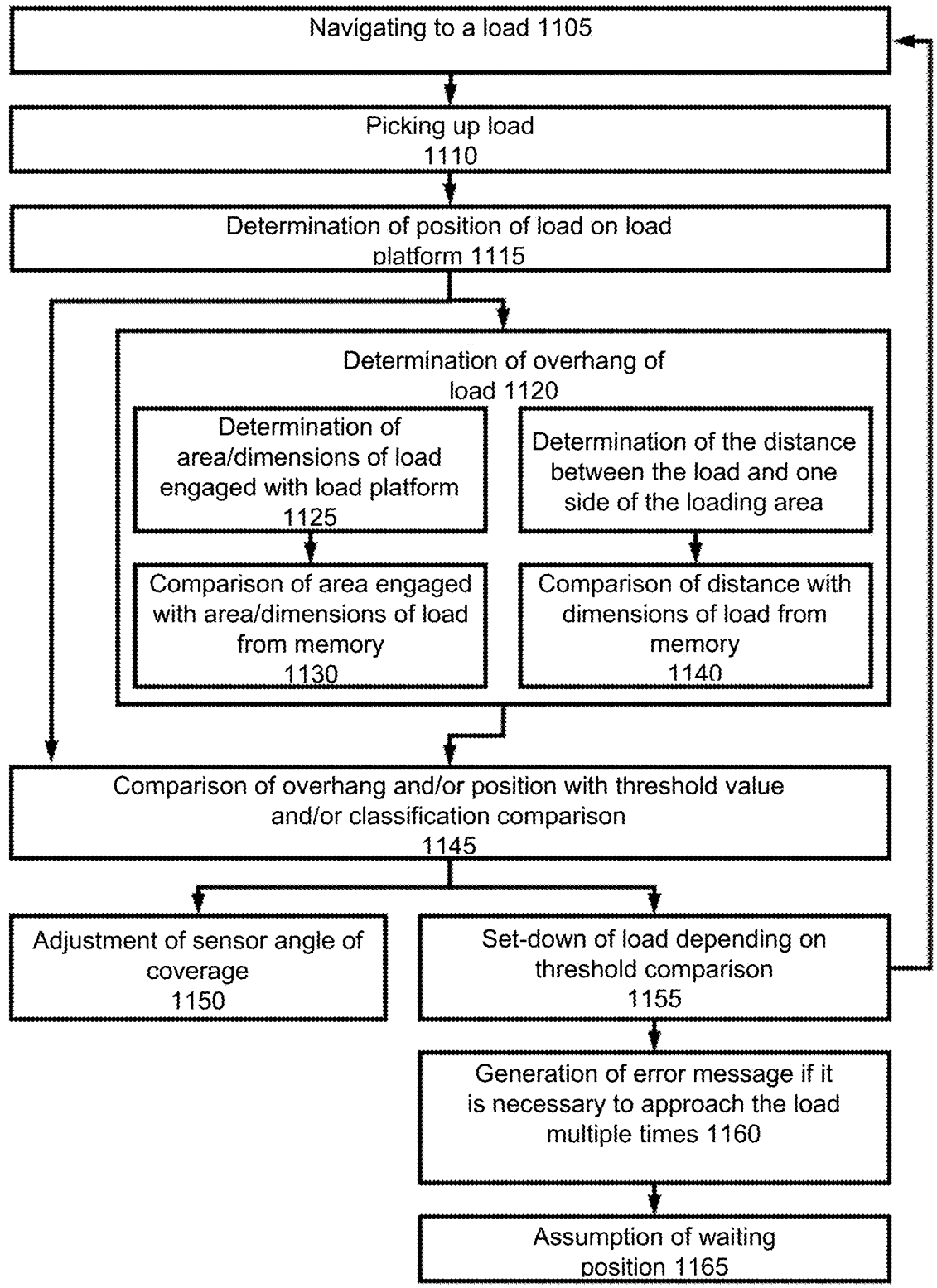
FIG. 19 is a flow chart illustrating position or overhang of a load in accordance with a preferred embodiment of the present invention.

In one aspect, the evaluation of the position of the load 143 and/or the overhang of a load 143 is illustrated in FIG. 19. It should be noted in advance that the overhang does not necessarily have to be determined directly; the position of the load 143, for example, is enough, possibly in combination with a classification indicating that certain positions entail an overhang and/or require an intervention.

The autonomous industrial truck 5 navigates towards a load 1105. It picks up the load 143 1110, determines the position of the load 143 on the load platform 1115, in one aspect an overhang of the load 143 beyond the load platform 1120, e.g. in the pick-up direction of the load 143, which in one aspect may be the rear of the autonomous industrial truck 5.

The position of the load 143 and/or the overhang of the load 143 (step 1120) is/are determined in one aspect, as illustrated in FIG. 20A, by means of at least one load platform load sensor 21, preferably by several such sensors, in such a way that the area of the load platform 12 that is engaged with the load 143 is determined (step 1125), and subsequently a comparison is made of the engaged area with an area stored in a memory (2, 38), with this area indicating the area and/or dimensions of the load (step 1130). Alternatively and/or additionally, a classification can be stored in the memory (2, 38), which, in step 1145, directly predetermines whether the subsequent steps 1150 et seq. should be carried out on the basis of the determined position (e.g. hardly occupied integrated load platform sensors 44 in FIG. 20A. Based on the comparison, a determination is then made as to which portion of the surface overhangs, whereby it is possible, for example, to determine an overhang in three directions of the load platform 12. The overhang is then determined again from the dimensions of the load 143. This means, for example, that in FIG. 20A the load platform load sensors 21 that do not detect any load (those on the left as well as on the lower edge) determine which area of the load platform 12 is free. Since the distance of these load platform load sensors 21 to the edge of the load platform 12 is known (see, for example, distances F, G) and the dimensions of the load 143 are known (B1, B2), as well as the dimensions of the load platform 12 (L1, L2), the overhang of the load 143 beyond the load platform 12 can be determined (D, G), for example, by B1-E1 D or B2-L1 G, with the approximated values resulting, for example, from the lack of definition defined by the sensor distance (e.g. H1, H2) and, for example, the ratio of B1/L2 or B2/L1. Depending on the type and number of sensors used, the lack of definition mentioned above can be reduced.

Alternatively and/or additionally, the overhang is determined by the contact sensor 23 and/or the laser distance sensor 22, which determine(s) the distance of the load 143 to the portion of the load platform 12 facing the superstructure 13 to the load 143 (step 1135) and, in particular, allows a rear overhang to be calculated, again by comparing the dimensions of the load 143 stored in the memory (2, 38) with the load platform dimension that is also stored (step 1140). FIG. 20B indicates that the contact sensors 23 can only provide a very rudimentary idea of the overhang, since the contact sensors 23 only detect whether the load 143 is resting. The laser distance sensor 22 can determine at least the depth of the charge 143 or the overhang on the rear of the AIT 5, where the overhang D can be determined as A+B1-L2 if B1 and L2 as well as the measured distance A are known.

The determined overhang (e.g. D) is compared to a threshold value 1145 and, based on the comparison, e.g. if the threshold value is exceeded, the load 143 is set down (step 1155). The threshold value is stored in memory 2 and may be dependent on the load 143 that is picked up. For example, the threshold value may be higher for larger loads 143 than for smaller loads 143, which have a higher probability of having their center of gravity close to the edge of the load platform 12 if the overhang is constant (e.g. D), thereby potentially making the load 143 unstable during travel. A renewed navigation to the load 143 (step 1105) or, in the case of trolleys 200 arranged in rows, driving into an (empty) area of a trolley row is carried out, with the further steps 1110 to, if applicable, 1145 then being performed. If the load 143 is set down multiple times or if the necessity for this is detected, in one aspect an error message 1160 is generated and, for example, a waiting position 1165 is assumed. In one aspect, if the threshold comparison does not result in the load 143 being set down, an angle of coverage of a sensor (step 1150), for example of the LIDAR sensor unit 18 (which faces the rear), is adjusted to prevent interference by the load 143, provided that the load 143 is a trolley 200 whose wheels, as explained for FIGS. 13A-13B, are within the field of view of the LIDAR sensor unit 18 when picked up.

The overhang of a load is characterized here by the following aspects AUL1-AUL14:

AUL1. Computer-implemented method for controlling an autonomous industrial truck (5), comprising
the pick-up of a load (143);
the determination of the position of the load (143) on the load platform (12);
the assessment of the position.

AUL2. Method according to AUL1, wherein an assessment of the position includes a classification with respect to a possible setting down of the load (143).

AUL3. Method according to AUL1, wherein an assessment of the position includes
a determination of the overhang of the picked-up load (143) beyond the load platform (12) and
a comparison of the overhang with a threshold value.

AUL4. Method according to AUL2 or AUL3, further comprising setting down the picked up load (143) depending on the threshold comparison and/or classification.

AUL5. Method according to AUL1, wherein the determination is carried out by evaluating a horizontally measuring sensor (e.g. 22, 23).

AUL6. Method according to AUL1, wherein the determination is carried out by evaluating a vertically measuring sensor (e.g. 44).

AUL7. Method according to AUL4, wherein the overhang is determined by comparison with values stored in the memory (2).

AUL8. Method according to AUL7, wherein the stored values include at least one dimension of the load platform (12) and/or the load (143).

AUL9. Method according to AUL3, wherein the overhang of the load (143) in the pick-up direction is evaluated.

AUL10. Method according to AUL3, further comprising the generation of an error message if the load (143) is set down multiple times.

AUL11. Method according to AUL3, wherein a determination is made of how far the load (143) overhangs.

AUL12. Method according to AUL4, further comprising picking up the load (143) again.

AUL13. Method according to AUL12, wherein picking up the load (143) again comprises a renewed navigation to the load (143).

AUL14. Method according to AUL10, further comprising the autonomous industrial truck (5) assuming a waiting position.

AUL15. Method according to AUL1, further comprising adjusting an angle of coverage of a rear-facing sensor (e.g. 18).

AUL16. Device for performing the method according to AUL1-AUL9.

Example 16: Navigation Module with Multi-Level Map

The AIT 5 is configured in such a way that a map is stored in its navigation module 110, e.g. in a map module 144 that is divided into different zones. In one aspect, the map consists of different levels that are optionally available. In one aspect, this includes an energy consumption map level 145 that maps the area in which the autonomous vehicle, e.g. an AIT 5, is moving with respect to the required energy consumption. The energy consumption results from a slope, the coefficient of friction of the floor, etc., and may be load-dependent, i.e. dependent in particular on the mass of the load 143, which can be determined by the autonomous vehicle (see FIG. 18 and the explanations provided for this, e.g. in Example 13) or is stored in a memory (2, 38), making this map level dynamic with respect to the load in one aspect. Another map level may be a moving obstacles map level 146 representing the density of moving obstacles. This representation may be temporally dynamic such that the obstacle density varies seasonally, e.g. in an hourly, daily, weekly, or shift-based rhythm, etc., where the obstacle density may be defined as a probability that a moving obstacle is located in the relevant area. The possible procedure for determining the obstacles is described, for example, in FIG. 12 and in the explanations provided for this. Another level, the difficult-to-detect obstacles map level 147, shows fixed obstacles that must be avoided but that are not necessarily recognized by the sensor technology that is usually used for position determination, e.g. a camera (20, 31), a LIDAR (15, 16, 18), etc. These may be channels in the floor, manhole covers, thresholds, etc., which may cause the autonomous vehicle to be strongly shaken upon encountering them, which could endanger the load 143, for example. Another level, the normal obstacles map level 148, takes obstacles detected by the above-mentioned sensors into account, representing a typical map of an autonomous vehicle or robot, with fixed obstacles and/or landmarks (e.g. configured as occupancy grid maps). Another level, the traffic rules level 149, may include traffic rules, e.g. a preferred direction of travel, a right-hand driving rule, one-way street rules, etc. The map levels can also be integrated in one aspect. An example is obstacles that are partially unrecognized or only poorly recognized by the sensor technology and zones that are subject to certain traffic rules, where integration implies here that the areas with non-recognizable or poorly recognizable obstacles are entered in the map as restricted zones or slow driving zones. In an alternative and/or additional aspect, at least two map levels are used for navigation purposes. The navigation module with multi-level map is characterized here by the following aspects ANM1-ANM13:

ANM1. Navigation module for an autonomous vehicle with a map which consists of different zones and which is constructed from multiple levels.

ANM2. Navigation module according to ANM1, wherein the autonomous vehicle is an autonomous industrial truck (5), a service robot, a cleaning robot, a disinfection robot, or an inventory robot.

ANM3. Navigation module according to ANM1, comprising an energy consumption map level (145).

ANM4. Navigation module according to ANM3, wherein the stored energy consumption is stored based on the coefficient of friction and/or slopes in the surface on which the autonomous vehicle is moving.

ANM5. Navigation module according to ANM3, wherein the stored energy consumption depends on the load (143) which the autonomous vehicle is transporting and/or the planned speed that the autonomous vehicle may assume in the relevant area.

ANM6. Navigation module according to ANM1, comprising a moving obstacles map level (146) representing the probability of occurrence of moving obstacles.

ANM7. Navigation module according to ANM6, wherein the probability of occurrence of moving obstacles is seasonally dependent.

ANM8. Navigation module according to ANM1, comprising a difficult-to-detect obstacles map level (147) representing in particular those fixed obstacles that cannot be detected or can only be detected poorly by the sensor technology used for obstacle detection.

ANM9. Navigation module according to ANM1, comprising a normal obstacles map level (148) representing fixed obstacles and/or landmarks.

ANM10. Navigation module according to ANM1, comprising a traffic rules map level (149).

ANM11. Navigation module according to ANM10, wherein the traffic rules include a preferred direction of travel, a right or left-hand driving rule, and/or one-way street rules.

ANM12. Navigation module according to ANM1, wherein at least two levels may be combined.

ANM13. Navigation module according to ANM1, wherein the autonomous vehicle uses at least two levels of the map to calculate a route.

Example 17: Peer-to-Peer Fleet Management

Figure 22:
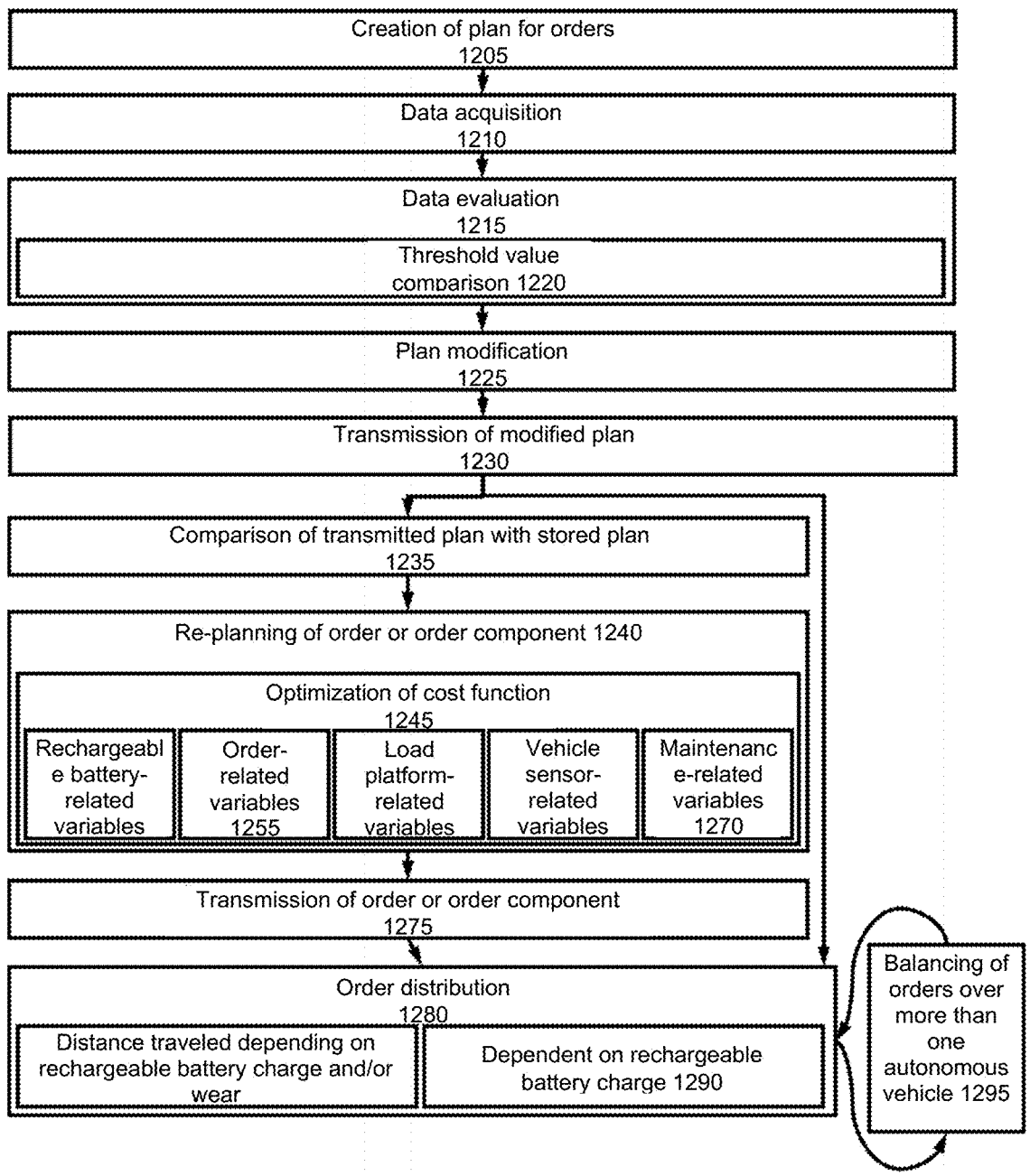
FIG. 22 is a flow chart illustrating fleet management in accordance with a preferred embodiment of the present invention.

In one aspect, peer-to-peer fleet management is implemented, meaning that planning operations for orders are not only implemented centrally via a server (e.g. 37), but also by autonomous vehicles such as the AIT 5 directly and in communication with other vehicles (e.g. 5). The method for this is illustrated in greater detail in FIG. 22. The method can be implemented in at least one autonomous vehicle or in part on an external system 36. In a first step 1205, a plan for processing orders for at least one autonomous vehicle is created. This plan may, for example, directly or indirectly include coordinates for starting or target positions. "Directly" means that the autonomous vehicle specifically targets positions. "Indirect" means that, for example, a warehouse or a machine is specified as a position, which is in turn assigned coordinates elsewhere. The plan may include times (times, days, etc.), and the plan may include the type of load or the type of order, such as accompanying a person, or furthermore a defined autonomous vehicle, for example, etc. In a further step 1210, data is collected by an autonomous vehicle. This data may be, for example, the position of the autonomous vehicle, the state of charge of the rechargeable battery 4 of the autonomous vehicle, the previous driving performance with regard to wearing parts, etc. This data can be measured directly or indirectly, e.g. by reading a value in the memory 2. The data 1215 is evaluated, e.g. by way of a threshold comparison 1220, in which, for example, the recorded state of charge of the rechargeable battery 4 is compared to a value which reflects, for example, a critical or order-dependent minimum state of charge (with this minimum state of charge describing, for example, a distance which the autonomous vehicle can still cover before it becomes necessary to recharge the rechargeable battery 4). In a next step 1225, the created plan for processing orders for at least one autonomous vehicle is modified. This means that, for example, it has been determined on the basis of the data evaluation that the battery charge is below a threshold value, as a result of which the order can no longer be executed. This means that at least the plan for the autonomous vehicle in question is modified, e.g. from executing a transport order to a charging operation. A modified plan is then transmitted in step 1230. Again, the recipient of the modified plan can be at least a second autonomous vehicle or at least an external system 36, e.g. a central fleet management server. Then, in a next step, the order can be assigned to another autonomous vehicle, a route can be changed as an order component, etc. Specifically, in step 1235, for example, the transmitted plan can be compared with a stored plan (which is stored in memory 2 or 38). Here, for example, the plan change 1225 made by the autonomous vehicle can be detected if, for example, the stored plan is the original plan created in step 1205 and possibly transmitted. However, the stored plan may also be a plan of a second autonomous vehicle, e.g. to evaluate whether the second autonomous vehicle has capacity to take over an order that the first autonomous vehicle cannot execute.

Based on the comparison in step 1235, at least one order component (e.g. the start time for processing the order) up to the complete order is re-planned in step 1240. This is accompanied, for example, by optimization of at least one cost function 1245, which is implemented in the movement planner (115) and/or a path planning module (112). The cost function may involve battery-related variables 1250, i.e., for example, state of charge and/or remaining life or remaining capacity of the rechargeable battery 4, which may imply, for example, short trips and/or frequent charging intervals. Alternatively and/or additionally, order-related variables 1255 may be included in the cost function, e.g. the type of load 143 to be transported (with, for example, certain loads 143 being assigned to certain autonomous vehicles), the distance to be traveled (which may be minimized, for example), the availability of other autonomous vehicles (which may be reflected, for example, in fewer orders for the first autonomous vehicle), and/or the urgency of the order (which may in turn imply that orders are accepted despite low battery charge). In one aspect, this also includes mass and/or dimensions of the load 143. Alternatively and/or additionally, load platform-related variables are taken into account in step 1260, including, for example, the dimension of the load platform 12, a maximum load weight, and/or a possible lift height of the autonomous vehicle, each of which may be relevant with respect to the load 143 to be transported. Alternatively and/or additionally, vehicle sensor-related variables 1265 can also be used, for example, if special evaluations are to be carried out by the sensor technology used in the context of the orders, e.g. body pose evaluations based on a camera. Alternatively and/or additionally, maintenance-related variables can be used in step 1270, such as the maintenance status and/or the remaining time until a maintenance event of the autonomous vehicle. The at least one order component or order is then transmitted to an autonomous vehicle in step 1275.

After step 1275 or 1230, an order distribution 12805 may be executed, with the path distance dependent on battery charge and/or wear (step 1285). Specifically, orders associated with path distances that are below a threshold value may be allocated to autonomous vehicles that have a rechargeable battery charge and/or life that is below a threshold value and/or wear parameters of other components that are above a threshold value. Alternatively and/or additionally, the order distribution may be dependent on the charge of the rechargeable battery (step 1290). Specifically, an order may be transmitted to a second autonomous vehicle when the state of charge of a rechargeable battery of a first autonomous vehicle is below a threshold value. In one aspect, the orders are balanced among more than one autonomous vehicle 1895, i.e. the orders are distributed as evenly as possible. This means that, for example, the orders are distributed among autonomous vehicles in such a way that the total distance traveled, the transported load volume, etc. is roughly the same within a defined time period. This defined time period is longer than the time period that can be covered with a complete charge of the rechargeable battery 4. This prevents uneven wear of multiple vehicles, for example.

The peer-to-peer fleet management is characterized here by the following aspects APF1-APF24:

APF1. Computer-implemented method for controlling a fleet of autonomous vehicles, comprising
  the creation of a plan for processing orders for at least one autonomous vehicle;
  the acquisition of data by an autonomous vehicle;
  the evaluation of the acquired data;
  the modification of the created plan for processing orders for at least one autonomous vehicle;
  the transmission of the modified plan.

APF2. Method according to APF1, wherein the autonomous vehicle is an autonomous industrial truck (5), a service robot, an inventory robot, a cleaning robot, or a disinfection robot.

AFP3. Method according to APF1, further comprising the comparison of the transmitted plan by a first autonomous vehicle with a plan stored in the memory (2) of the autonomous vehicle.

AFP4. Method according to APF1, further comprising the re-planning by the autonomous vehicle of at least one order component of the plan stored in the memory (2) of the autonomous vehicle based on the transmitted plan.

AFP5. Method according to APF1, further comprising the transmission of at least one order component of the modified plan to at least one further autonomous vehicle.

AFP6. Method according to APF1 or APF4, wherein planning and/or re-planning comprises optimizing at least one cost function.

AFP7. Method according to APF6, wherein the state of charge and/or remaining life of a rechargeable battery (4) is/are considered as a cost function.

APF8. Method according to APF6, wherein the type of load (143) to be transported, the distance to be covered, the availability of other autonomous vehicles, and/or the urgency of the order are considered as a cost function.

APF9. Method according to APF6, wherein dimensions of the load platform (12), the maximum load weight and/or a possible lift height of the autonomous vehicle are considered as a cost function.

APF10. Method according to APF6, where the equipment of the autonomous vehicle with sensors and related evaluation methods of the autonomous vehicle are considered as a cost function.

APF11. Method according to APF6, wherein the maintenance status and/or the time remaining until a maintenance event of the autonomous vehicle are considered as a cost function.

APF12. Method according to APF1, further comprising the distribution of orders among multiple autonomous vehicles in such a way that orders associated with path distances that are below a threshold value are allocated to autonomous vehicles that have a rechargeable battery charge and/or life that is below a threshold value and/or wear parameters of other components that are above a threshold value.

APF13. Method according to APF1, wherein an order is transmitted to a second autonomous vehicle when the state of charge of a rechargeable battery (4) of a first autonomous vehicle is below a threshold value.

APF14. Method according to APF1, wherein an order is transmitted to a second autonomous vehicle when a first autonomous vehicle has planned a charging operation for the planned order time or period.

APF15. Method according to APF1, wherein planning is performed by a first autonomous vehicle.

APF16. Method according to APF1, further comprising the distribution of orders over multiple autonomous vehicles in such a way that the utilization of the multiple autonomous vehicles is approximately equal over a defined period of time.

AFP17. Device for performing the method according to AFP1-AFP16.

APF18. Device according to APF17, wherein the device is an autonomous industrial truck (5), a service robot, an inventory robot, a cleaning robot, or a disinfection robot.

APF19. Device according to APF18, comprising a movement planner (115) and/or a path planning module (112) for optimizing cost functions.

Example 18: Mapping of Location-Dependent Energy Consumption

In one aspect, the AIT 5 or autonomous vehicle in general (e.g. in the form of a service robot, cleaning robot, or disinfection robot) is configured in such a way that it can map energy consumption on a surface, i.e. the rules described below are stored in the mapping module 117, for example. This is described in greater detail in FIG. 23. In step 1305, the autonomous vehicle travels an area with a defined weight, distance and/or speed, with a defined speed being, for example, a constant speed. In one aspect, this means or that, if it is the AIT 5, the AIT 5 does not pick up any loads in between. The energy consumption 1310 over time is measured, wherein this is measured, for example, by measuring the current applied to the drive 124 (i.e., in particular, to the motor 6), with the energy being determined via the applied voltage from the integral of $u(t)*i(t)*dt$, where the parameter $u(t)$ represents the instantaneous voltage, $i(t)$ represents the instantaneous current consumption, and $t$ represents the measured time. Alternatively and/or additionally, the inclination of the floor is evaluated by an inertial sensor 40 in step 1315. This is done in order to detect any slopes or inclinations that are associated, for example, with increased or, in some cases, reduced energy consumption. During the measurement by the inertial sensor 40, the acceleration values of the inertial sensor can be used in combination with the current orientation of the autonomous vehicle, for example. With the aid of the value for gravitation/gravitational acceleration, a tilt of the z-axis or the axis of rotation can be determined.

The measured values are stored 1320. In one optional aspect, the energy consumption is compared to stored energy consumption values 1325, which allows, for example, normalization by comparing the measured energy consumption (e.g. per distance) to a standard energy consumption value, for example, which is used to make a prediction for the energy consumption value associated with an order. Furthermore, the position of the autonomous vehicle is determined, e.g. by means of the odometry module 121. The energy consumption measured in each case is assigned to the position 1335. Based on this, for example, the measured values between traveled positions can be interpolated 1350, e.g. as a linear interpolation. In one aspect, a camera 20 is used to record the surface of the floor in the vicinity of the autonomous vehicle 1340, preferably in the direction of travel, and the recorded images are evaluated with respect to textures 1345. For this purpose, Scikit Image in Python or in OpenCV can be used, e.g. based on local binary patterns. In step 1350, the interpolation is performed in such a way that areas with approximately the same texture are assigned the same energy values. For this purpose, maps created for the texture, for example, are superimposed with maps for the energy values in order to achieve a positional synchronization, which makes an assignment of the positions possible. Subsequently, a map is created from the acquired and evaluated data (in one aspect including the texture data determined in steps 1340 and 1345), which is stored in the memory 2 and/or transmitted via an interface (122, 123) to an external system 36 or else to another autonomous vehicle, such as another AIT 5 (step 1360). Based on the map, the autonomous vehicle, such as the AIT 5, may then, for example, make route selection decisions within the movement planner (115) or the path planning module (112).

The mapping of location-dependent energy consumption is characterized here by the following aspects AKE1-AKE12:

AKE1. Computer-implemented method for determining the influence of a surface on the energy consumption of an autonomous vehicle, comprising
traversing an area;
measuring the energy consumption;
storing the measured values;
determining the position of the autonomous vehicle and assigning the measured energy consumption to the determined position.

AKE2. Method according to AKE1, comprising an evaluation of the inclination of the floor by an inertial sensor (40).

AKE3. Method according to AKE2, wherein the acceleration values of the inertial sensor (40) in combination with the current orientation of the autonomous vehicle are used to evaluate the slope or inclination.

AKE4. Method according to AKE1, comprising the comparison of the energy consumption with stored energy consumption values.

AKE5. Method according to AKE1, further comprising capturing the surface of the floor.

AKE6. Method according to AKE5, further comprising the evaluation of the texture of the sensed surface.

AKE7. Method according to AKE6, comprising the assignment of the energy consumption values acquired for a texture to all positions with a substantially identical texture.

AKE8. Method according to AKE6, further comprising the interpolation of measured values between traveled positions.

AKE9. Method according to AKE1, further comprising the creation of a map from the acquired data.

AKE10. Method according to AKE2, further comprising transmitting the map to other systems via an interface (122, 123).

AKE11. Method according to AKE9, further comprising using the map for route selection decisions of the autonomous vehicle.

AKE12. Device for performing the method according to AKE1-AKE11.

AKE13. Device according to AKE12, wherein the autonomous vehicle is an autonomous industrial truck (5), an inventory robot, a service robot, a cleaning robot, or a disinfection robot.

Example 19: Adaptive Charging Duration Adjustment

Figure 27:
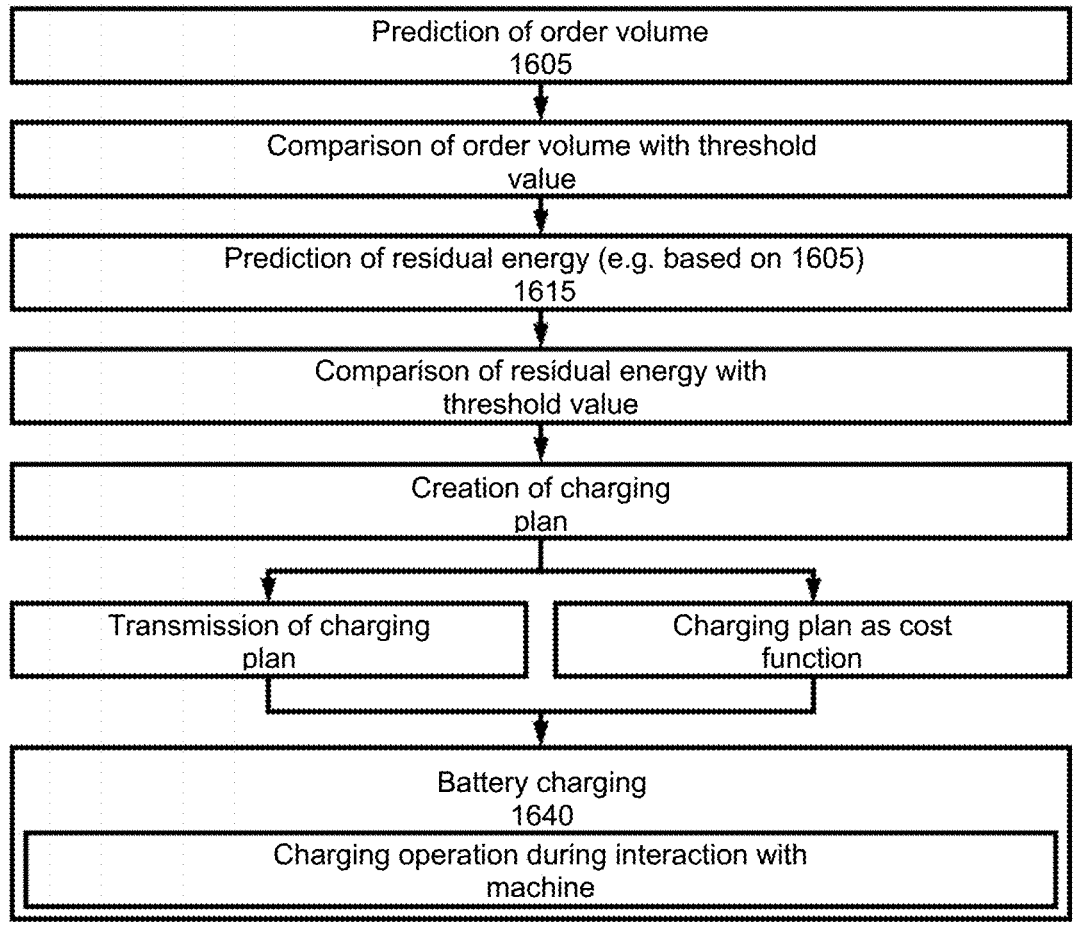
FIG. 27 is a flow chart of load prediction generation in accordance with a preferred embodiment of the present invention.

In one aspect, the autonomous vehicle (e.g. the AIT 5, a service robot, an inventory robot, a cleaning robot, or a disinfection robot) has an adaptive charging duration adjustment function that creates a charging plan according to which the autonomous vehicle is charged. The sequence implemented in this process is shown in FIG. 27. Accordingly, in step 1605, a prediction is made about the future order volume for the autonomous vehicle. This is based, for example, on order histories stored in a memory (2, 38) that indicate the utilization times of the autonomous vehicle over time, which are subject, for example, to seasonal fluctuations (e.g. over the course of a day, week, month, or shift). On the basis of this data, predictions can be made about when orders will be carried out, for example, and these predicted orders can be based on probabilities of occurrence. These predictions also include, for example, order pauses, i.e. time frames of different lengths in which there is a probability that no orders will occur. The order volume, e.g. these time frames without orders, is compared with stored threshold values 1610. If, for example, a time frame of a minimum length (threshold value) is predicted within a defined period, such as 5 or 10 min, this time frame can be used, for example, for (at the least partial) charging of the rechargeable battery 4.

In step 1615, a prediction is made about the residual energy of the rechargeable battery 4, e.g. by measuring the instantaneous voltage of the rechargeable battery 4 or the individual cell impedance by means of impedance spectroscopy and comparing with comparison values stored in a memory (2, 38), which assign a residual energy quantity to a voltage value. Furthermore, based on the prediction in step 1605, e.g. by multiplying operating times and/or driving distance lengths with energy consumption values stored in the memory (2, 38), a prediction can be made about the residual energy, indicating how the amount of residual energy in the rechargeable battery 4 will change, e.g. within the following minutes or hours. The residual energy is compared to a threshold value (step 1620) that represents a residual energy level from which the rechargeable battery 4 must be recharged. The threshold values can be, for example, 20% or 50% and may depend, for example, on the further predicted order volume. Based on this, a charging plan is created for the partial charging of the rechargeable battery when the order volume and the residual energy fall below the threshold values 1625, which specifies when the autonomous vehicle is charged, with pauses between orders preferably being used for charging 143. These pauses have a minimum length based on the threshold values, which may depend on the predicted order volume and/or the amount of energy to be charged. The charging plan itself may contain information about charging stations 43, such as their ID and/or their local position, which can be defined, for example, depending on the distance and/or may depend on the sites of the predicted orders. The latter means, for example, that a charging station 43 is determined for charging operation which is located in an area for which orders are forecast which are close to or ideally adjacent to the charging period in terms of time.

The charging plan may be transmitted in a subsequent step 1630, for example, to another autonomous vehicle (e.g. 5) or to an external system 36, which is done via an interface (122, 123). Alternatively and/or additionally, the loading plan can also be used as a cost function in the scope of a movement planning, which is performed by the path planning module 112 or the movement planner 115 and accordingly describes a route selection (if applicable time-dependent).

In a next step, the rechargeable battery 4 is charged, e.g. according to the charging plan. The charging station 43 used for this can be located at (or near) a machine with which the autonomous vehicle interacts, so that charging takes place, for example, during the interaction of the autonomous vehicle with the machine (step 1645). This means that the autonomous vehicle is charged via charging contacts (or inductively, if applicable), e.g. in the position in which it interacts with the machine.

The adaptive charging duration adjustment is characterized here by the following aspects AAL1-AAL10:

AAL1. Method for the adaptive charging duration adjustment of an autonomous vehicle, comprising
- generating a prediction about the future order volume of the autonomous vehicle;
- comparing the order volume with at least one threshold value;
- generating a prediction about the residual energy of a rechargeable battery (4);
- the comparison of the residual energy with a threshold value;
- the creation of a charging plan for the partial charging of the rechargeable battery (4)
- when the order volume and the residual energy fall below the threshold value.

AAL2. Method according to AAL1, wherein the prediction about the residual energy of the rechargeable battery (4) is based on the prediction about the future order volume.

AAL3. Method according to AAL1, wherein order data from the past stored for the prediction is evaluated over time, including seasonal fluctuations or fluctuations between shifts.

AAL4. Method according to AAL1, wherein the charging plan includes information about charging stations (43), such as their ID and/or their local position.

AAL5. Method according to AAL1, further comprising the transmission of the charging plan for charging the rechargeable battery (4) via an interface (122, 123) to at least one system (5, 36).

AAL6. Method according to AAL1, further comprising the consideration of the charging plan as a cost function in the scope of a movement planner.

AAL7. Method according to AAL1, wherein the autonomous vehicle is an industrial truck (5), a service robot, an inventory robot, a cleaning robot, or a disinfection robot.

AAL8. Method according to AAL4, wherein the charging station (43) is located at or near a machine with which the autonomous vehicle interacts.

AAL9. Method according to AAL8, further comprising charging the rechargeable battery (4) during the interaction of the autonomous vehicle with the machine.

AAL10. Device for performing the method according to AAL1-AAL9.

Example 20: System with Field-of-View Restriction

Figure 28:
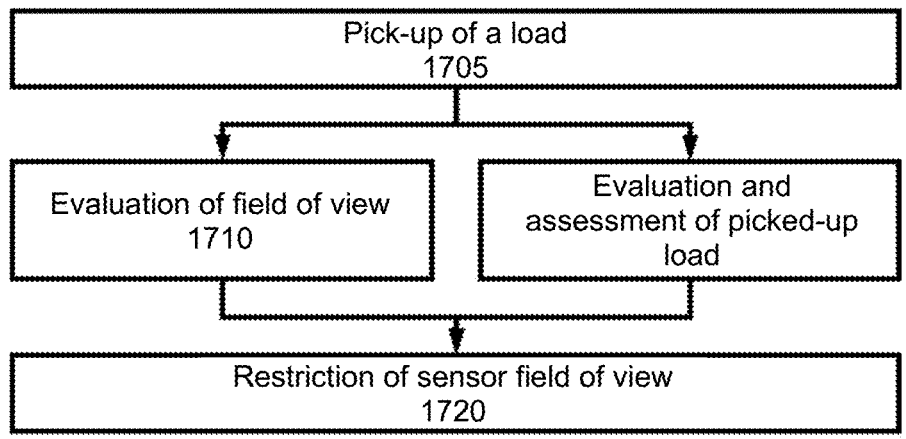
FIG. 28 is a flow chart of a sequence for visual range restriction in accordance with a preferred embodiment of the present invention.

The rationale for the field-of-view restriction was indicated following the explanation of FIGS. 13A-13B and the subsequent paragraphs. The following is intended as a brief explanation of the sequence and the system behind it. FIG. 28 is intended as an aid. Here, a load 143 is picked up in step 1705 which, for example, covers at least part of the field of view of a sensor (e.g. 18). In step 1710, the field of view 143 of a sensor is evaluated by pattern matching in order to determine the extent to which it is restricted by the picked-up load 143. "Pattern matching" means that the data recorded by the sensor is compared with data from the memory 2, in which patterns are stored that describe when a field-of-view restriction occurs. For example, a correlation analysis is carried out and, if a correlation is exceeded, the sensor's field of view is restricted in step 1720. In one aspect, the angle by which the field of view is restricted may depend on pattern matching. In an alternative and/or additional aspect, an assessment and evaluation of the picked-up load 143 is performed in step 1715. Specifically, for step 1715, this means that a determination is made based on the transport orders or the picked-up load as to whether a restriction of the field of view occurs, with such information being stored in the memory 2. The field-of-view restriction in step 1720 means that the field of view is reduced by 40-190° in the horizontal plane, with the field of view being restricted, for example, proportionally starting from the edge area of the field of view in each case. "Field-of-view restriction" means, e.g. alternatively and/or additionally, that sensor data from this area is not evaluated.

In other words, a system is provided for controlling an autonomous vehicle having a height-adjustable load platform 12 for picking up a load 143, at least one sensor unit 17 having a sensor for detecting the environment on the side from which a load 143 is picked up by the load platform 12, and in which the field of view of the at least one sensor of the sensor unit 17 is restricted by a picked-up load 143. The non-evaluated part of the field of view of the sensor of the sensor unit 17 comprises at least one edge area of the field of view. The field of view of the at least one sensor of the sensor unit 17 without a picked up load 143 is 130-270° in the horizontal plane and is reduced to about 90-120° after the load 143 is picked up. The at least one sensor of the sensor unit 17 is a LIDAR 18, a camera (20, 31), a radar sensor 32, and/or an ultrasonic sensor.

The field-of-view restriction is characterized here by the following aspects AES1-AES10:

AES1. Method for controlling an autonomous vehicle, comprising
- the pick-up of a load (143) and
- the restriction of the field of view of at least one sensor.

AES2. Method according to AES1, comprising evaluating the sensor's field of view by means of pattern matching.

AES3. Method according to AES1, comprising evaluating the picked-up load and assessing whether it is associated with a restriction of the field of view.

AES4. Method according to AES1, wherein the restricted field of view is at least partially obscured by part of the picked-up load (143).

AES5. Method according to AES1, wherein the restriction is a reduction in the horizontal angle of coverage of the sensor from 40-190°.

AES6. Method according to AES1, wherein a restriction of the angle of coverage means a non-evaluation of data acquired in this area.

AES7. Device for performing the method according to AES1-AES6.

AES8. System for control of an autonomous vehicle having a height-adjustable load platform (12) for picking up a load (143), at least one sensor unit (17) having a sensor for detecting the environment on the side from which a load (143) is picked up with the load platform (12), and in which the field of view of the at least one sensor of the sensor unit (17) is restricted by a picked-up load (143).

AES9. System according to AES6, wherein the non-evaluated part of the field of view of the sensor of the sensor unit (17) comprises at least one edge area of the field of view.

AES10. System according to AES6, wherein the field of view of the at least one sensor of the sensor unit (17) without a picked-up load (143) is 130-270° in the horizontal plane.

AES11. System according to AES6, wherein the field of view of the at least one sensor of the sensor unit (17) after picking up a load (143) is 90-120° in the horizontal plane.

AES12. System according to AES6, wherein the at least one sensor of the sensor unit (17) is a LIDAR (18), a camera (20, 31), a radar sensor (32), and/or an ultrasonic sensor.

Example 21: Autonomous Vehicle with Adjusted Occupancy Grid Map Update

Figure 29:
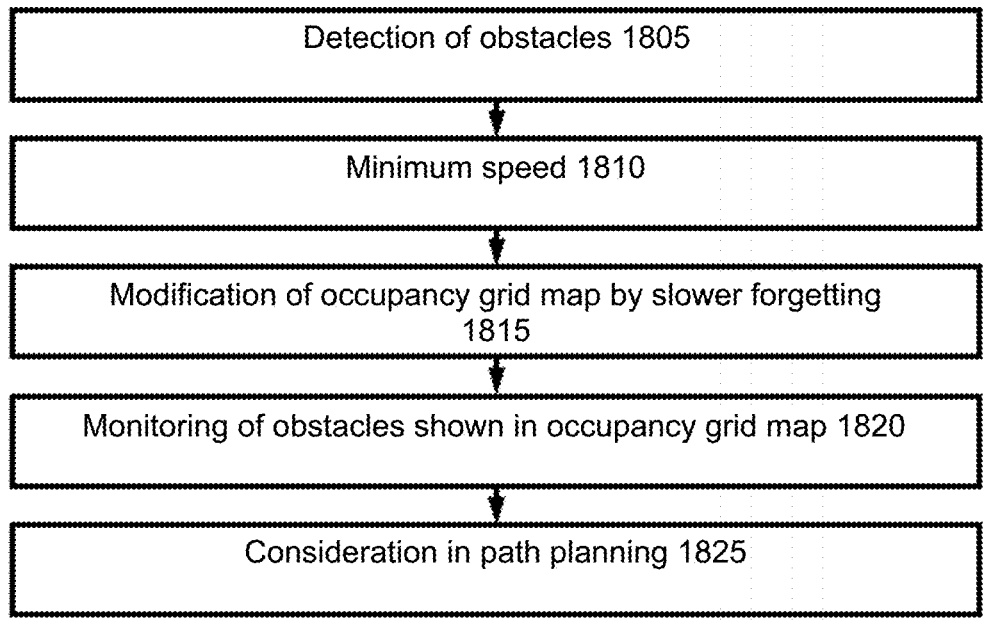
FIG. 29 is a flow chart illustrating an adjusted occupancy grid map update in accordance with a preferred embodiment of the present invention.

In one aspect, the sensor arrangement of an autonomous vehicle, such as an AIT 5, is designed in such a way that lateral areas are not completely detected by sensors, e.g. when a load 143 is being transported. This means that the autonomous vehicle indirectly observes laterally detected obstacles for longer, which is achieved by adapting occupancy grid maps created using the sensor data. These are adapted in such a way that laterally detected obstacles are forgotten more slowly, which ensures that slow obstacles are also perceived, which in turn means that, when turning, reversing or swiveling movements are executed, these obstacles are taken into account with a higher probability in the path planning of the autonomous vehicle, even if the obstacles may not be detected by the sensor technology. The sequence is summarized in FIG. 29: Obstacles 1805 located laterally of the autonomous vehicle, such as an AIT 5, are detected. In one aspect, the autonomous vehicle has a minimum speed 1805, e.g. at least 0.1 m/second. In step 1815, the occupancy grid map, which is created based on detected obstacles, is modified in such a way that the fields marked as occupied (by obstacles) are forgotten more slowly over time, e.g. more slowly than in the areas where obstacles are continuously detected by the sensors, i.e. the half-life of the obstacles registered there is longer, e.g. at least twice as long. These obstacles shown in the occupancy grid map are monitored during turning, reversing and pivoting movements (step 1820) and are taken into account during route planning 1825, e.g. in the movement planner 115 when re-planning a path.

The adjusted occupancy grid map update is characterized here by the following aspects AAB1-AAB8:

AAB1. Method for control of an autonomous vehicle having a height-adjustable load platform for receiving a load (143), comprising
the detection of obstacles located laterally of the autonomous vehicle;
the modification of the occupancy grid maps generated by a sensor with the detected obstacles in such a way that these obstacles detected in the occupancy grid maps as occupied marked fields in the occupancy grid map are forgotten more slowly over time; and
the monitoring of the detected obstacles on the basis of the occupancy grid maps during a turning, reversing, or pivoting motion of the autonomous vehicle.

AAB2. Method according to AAB1, wherein the autonomous vehicle is an autonomous industrial truck (5).

AAB3. Method according to AAB1, wherein "forgetting slower" means that the probability decay in time, which is usually performed for occupied fields, is performed more slowly.

AAB4. Method according to AAB3, where the half-life of the probability decay more than doubles.

AAB5. Method according to AAB1, comprising a minimum speed of the autonomous vehicle.

AAB6. Method according to AAB5, wherein the minimum speed is at least 0.1 m/second.

AAB7. Method according to AAB1, wherein the speed of forgetting is a function of the speed of the autonomous vehicle.

AAB8. Method according to AAB1, further comprising accounting for the detected obstacles in the route planning.

AAB9. Device for performing the method according to AAB1-AAB8.

Example 22: System for Slip Reduction with Turning Movements of Heavier Loads

Slip reduction with turning movements of heavy loads (143) is characterized here by the following aspects ASDL1-ASDL11:

ASDL1. Method for reducing the slip of an autonomous vehicle having two drive wheels (10) and a load platform (12) for receiving a load (143), with the center of gravity of the autonomous vehicle after receiving the load (143) not lying on the axis of the drive wheels (10), with the drive speed of one drive wheel (10) being greater than that of another drive wheel (10) during reversing and/or pivoting maneuvers.

ASDL2. Method for controlling the drive wheels (10) of an autonomous vehicle with two drive wheels (10) and a load platform (12) for picking up a load (143), with the center of gravity of the autonomous vehicle after picking up the load (143) not lying on the axis of the drive wheels (10), with the drive speed of one drive wheel (10) being greater than that of another drive wheel (10) during turning and/or pivoting maneuvers.

ASDL3. Method according to ASLD1 or ASLD2, wherein the turning movement of the drive wheels is in opposite directions.

ASDL4. Method according to ASLD1 or ASLD2, wherein the rotational speed of one drive wheel (10) is more than twice the rotational speed of the other drive wheel (10).

ASDL5. Method according to ASLD1 or ASLD2, wherein the rotational speed of one drive wheel (10) is more than ten times the rotational speed of the other drive wheel (10).

ASDL6. Method according to ASLD1 or ASLD2, wherein the rotational speed of one drive wheel (10) is zero or near zero.

ASDL7. Method according to ASLD1 or ASLD2, wherein the autonomous vehicle is an autonomous industrial truck (5).

ASDL8. Method according to ASLD1 or ASLD2, wherein a caster (11) is located under the load platform (12).

ASDL9. Method according to ASLD1 or ASLD2, wherein the weight of the picked-up load (143) is greater than the weight of the autonomous vehicle.

ASDL10. Method according to ASLD1 or ASLD2, wherein the center of gravity of the load (143) is greater than 20 cm from the axis of the drive wheels (10).

ASDL11. Device for performing the method according to ASDL1-ASDL10.

Example 23: Automatic Calibration of the Odometry Unit and the Inertial Sensor

Figure 31:
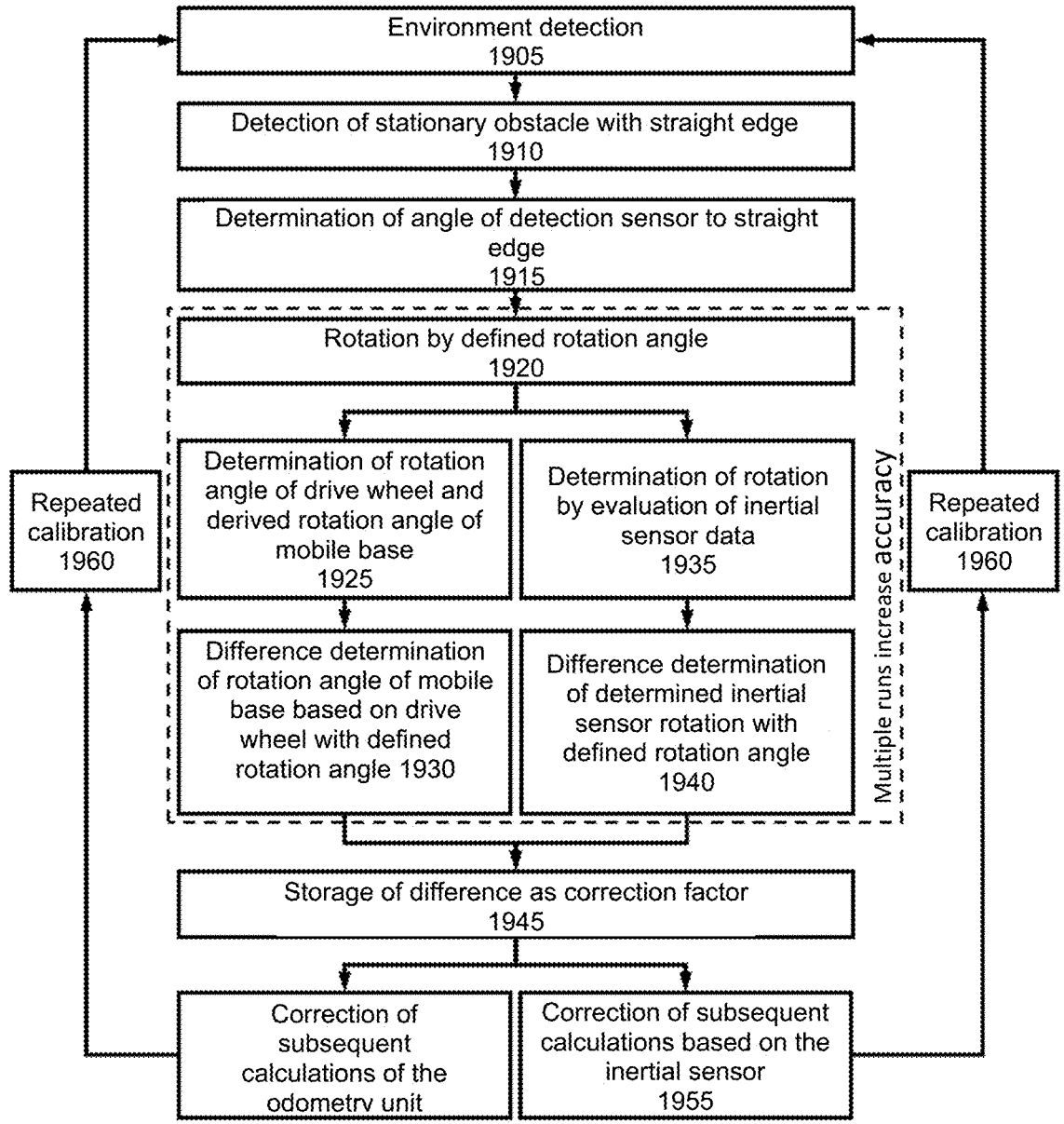
FIG. 31 is a flow chart illustrating calibration of an odometry unit and/or inertial sensor data evaluation in accordance with a preferred embodiment of the present invention.
Figure 32:
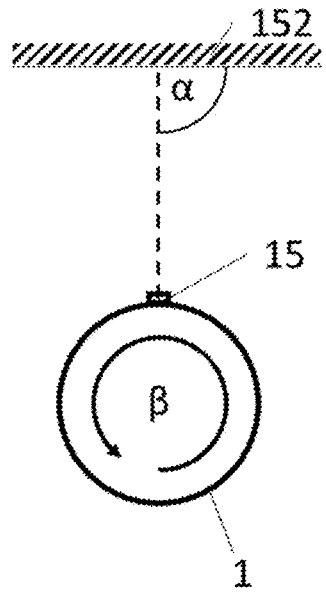
FIG. 32 is a diagram illustrating calibration based on edge in accordance with a preferred embodiment of the present invention.

In one aspect, an implementation for an automatic calibration of the odometry unit 121 and/or the inertial sensor (IMU) 40 is stored in the mobile base 1. Initially or over time, these may exhibit inaccuracies. This may be due to wear (wear of the drive wheels 10, but also floor irregularities, undetected slip, etc.) or drifting. With regard to the inertial sensor 40, it is possible that this exhibits manufacturing-related, material-related, or temperature-related, etc. inaccuracies and/or was possibly installed with a slight tilt, with even small deviations occurring by evaluation of the sensor data over time, which is done by way of integration (summation), thus resulting in an increase in the magnitude of errors. Accordingly, an automated correction sequence, e.g. repeated on a regular basis, is implemented to calibrate the odometry unit 121 and/or inertial sensor 40. In the case of the odometry unit 121, this relates, for example, to the wheel distance, the variance of which can lead to inaccurate rotation angles of the mobile base 1 and thus to incorrect navigation. The sequence can be described as shown in FIG. 31:

Environment detection 1905 is performed, for example by a sensor such as a camera (31), radar (32), and/or LIDAR (e.g. 15). Stationary obstacles are detected and evaluated to determine whether these obstacles have a straight edge (152) (step 1910). FIG. 32 shows this by way of example. The obstacles with a straight edge may be, for example, a wall (151). Whether a detected obstacle is straight can be detected, for example, by comparing connections of the obstacle coordinates made by direction vectors and evaluating the orientation of these direction vectors, with an identical orientation indicating that the obstacle is straight. The angle of coverage between the sensor detecting the obstacle, such as the camera (31), radar (32), and/or LIDAR (e.g. 15), is then determined (step 1915), denoted as a in FIG. 32. The mobile base 1 is then rotated by a defined rotation angle ($\beta$ in FIG. 32) (step 1920), the rotation angle being determined by evaluating the angle of coverage a. That is, the angle of coverage a is monitored over time. For a rotation of 360°, this must be constant, for example, at the beginning and end of the rotation. This at least one rotation can be by any angle as long as the angle $\beta$ relative to an obstacle such as one with a straight edge 152 is detected and evaluated in order to externally validate the rotation. In one aspect, rotation is performed to the right and left, which is useful for determining the correction factor described below. With a view to the odometry unit 121, a determination of the rotation of at least one drive wheel 10, in one aspect of both drive wheels 10, is performed, which is performed by evaluating the rotation angle sensors 129. For example, the circular path that is described when the drive wheels 10 are driven in opposite directions by the mobile base 1 can result, to put it simply, from half the distance between the drive wheels 10, which is factored into the circular calculation as a radius, with the circumference of the circle formed over this corresponding to the distance that the drive wheels 10 must travel, for example, in order for the mobile base 1 to rotate by 360°. The number of revolutions then depends on the circumference of the drive wheels 10. The exact radius, in turn, depends on the respective points of contact of the drive wheels 10 on the floor and may differ, for example, due to wear. The circumference of the drive wheels 10 ultimately results in a rotation angle that the drive wheels 10 cover in order to describe the prescribed circular path. This rotation angle of the drive wheels 10 (i.e. around the axis of rotation of the drive wheels) has a default value which is stored in the controller memory 127 and which corresponds, for example, to a rotation angle of the mobile base 1 by 360° (i.e. an angle around the vertical axis, angle $\beta$). That is, a determination of the rotation angle of a drive wheel 10 and a derived rotation angle $\beta$ of the mobile base 1 is made here (step 1925). Subsequently, a difference determination of the rotation angle of the mobile base based on the drive wheel 10 with the defined rotation angle is carried out (step 1930). In the case of two rotations, i.e. one to the left and one to the right, the measured difference values are averaged. More than one rotation (in one direction or even in both directions) can increase the accuracy of the difference value determination. The following calculation example shows how this is carried out: Environment detection and evaluation of the angle relative to the straight edge ($\alpha$) are used to determine how far the mobile base 1 has rotated (which can be referred to as "ground truth"). Assuming a wheel distance of 60 cm (radius: 30 cm), this corresponds to a circle length of 188.5 cm. With a diameter of the drive wheels of 10 cm (circumference: 31.42 cm), this is exactly 6 wheel revolutions. However, if only 5.9 wheel revolutions were determined by comparison with the ground truth, for example, this then results in a correction factor of 6/5.9=1.017. The true wheel distance (radius) can thus be calculated back as follows: 5.9*31.42=185.38 is the circumference. This divided by pi yields a wheel distance of 59 cm. 60/59=1.017. The calculation can also be made with several rotations (steps 1920-1940) and averaging, e.g. to reduce random influences when identifying systematic deviations and thus to increase the measurement accuracy. In step 1945, the correction factor is stored in the controller memory 127 and taken into account for future rotation angle specifications for the odometry unit 121 1950.

A similar procedure is applied for the calibration of the inertial sensor 40. After the above-mentioned step 1920, the rotation is determined in step 1935 by evaluating the inertial sensor data, also with the evaluation of the angle $\alpha$ to the straight edge 152 as ground truth. The rotation of the mobile base 1 is determined by integrating the data of the vertical axis (Z-axis) of the inertial sensor 40. In step 1940, the difference of the rotation angle $\beta$ is compared to a prescribed rotation angle (the ground truth) on the basis of the inertial sensor data. The following example illustrates a possible calculation. Here, the drift of the inertial sensor 40 is also taken into account, which may be externally prescribed, for example, by forming a prediction based on the data sheet, the measurement of environmental parameters, and defined movements of the inertial sensor 40. The two prescribed rotations of the mobile base 1 (once around to the left, once around to the right) take place within approximately the same time period. The angle of the inertial sensor summed up for the rotation is compared to the ground truth. For example, this may express itself by the accumulated angle 357.4° plus drift of 1° resulting in a deviation of 360° (ground truth) minus (357.4°+1°)=1.6° with a rotation in one direction and of 360° minus (−357.2°+1° drift with rotation (in the same period) in the other direction, with a delta of 3.8°, where the average value of the deviation amounts to 2.7°, which corresponds to the correction factor. This is then also followed by step 1945 (storing the correction factor in the memory (e.g. 127)) and performing a correction of the subsequent calculations based on inertial sensor data 1955. These calculations ensure, for example, that the prescribed rotation corresponds to a correct rotation (i.e. the rotation ensures by virtue of the correction factor that, for example, a prescribed rotation of 90° actually corresponds to 90°). A repeated calibration is carried out in 1960, e.g. within defined time periods or the completion of defined distances or a defined number of orders.

The method for the calibration of an odometry unit is characterized here by the following aspects AKO1-AKO15:

AKO1. Method for calibrating an odometry unit (121) and/or an inertial sensor (40) of a mobile base (1), comprising the detection of the environment of the mobile base (1);

the detection of a stationary obstacle with a straight edge (152);

the determination of the angle of coverage of the edge (152);

performing at least one rotation of the mobile base (1) by a defined rotation angle;

wherein the determination of the rotation angle is performed by evaluating the angle of coverage.

AKO2. Method according to AKO1, wherein one rotation is performed to the right and one to the left.

AKO3. Method according to AKO1, wherein the defined rotation angle is at least 360°.

AKO4. Method according to AKO1, further comprising the determination of the rotation angle of at least one drive wheel (10) and an associated rotation angle of the mobile base (1).

AKO5. Method according to AKO4, further comprising the determination of the difference of the rotation angle of the mobile base (1) to a prescribed rotation angle.

AKO6. Method according to AKO1, further comprising the determination of the rotation of the mobile base (1) by evaluating inertial sensor data.

AKO7. Method according to AKO2, wherein the rotation to the left and to the right each takes place over the same period of time.

AKO8. Method according to AKO6, further comprising the determination of the difference of the rotation angle based on the inertial sensor data to a prescribed rotation angle.

AKO9. Method according to AKO8, wherein the difference determination takes into account a prescribed drift of the inertial sensor (40).

AKO10. Method according to AKO5 or AKO8, wherein the prescribed rotation angle results from the rotation of the evaluated angle of coverage.

AKO11. Method according to AKO5 or AKO8, wherein the prescribed rotation angle results from the relative rotation to the straight edge (152).

AKO12. Method according to AKO5 or AKO8, wherein the difference is determined by averaging at least one rotation to the left and at least one rotation to the right.

AKO13. Method according to AKO5 or AKO8, further comprising storing the determined difference as a correction factor in a memory (2, 127).

AKO14. Method according to AKO5 or AKO8, further comprising the correction of all subsequent calculations based on the data of the odometry unit (121) and/or the inertial sensor (40) by the respective determined correction factor.

AKO15. Method according to AKO1-AKO14 after a defined period of time, a defined distance, or defined number of orders.

AKO16. Device for performing the method according to AKO1-AKO15.

Example 24: Waypoint-Based Evaluation

For the described approaches of location-dependent parameters for route selection decisions, e.g. the determination of the energy consumption per covered distance in Example 4, the waiting position determination and, in particular, the obstacle detection and spatial evaluation of obstacles for the determination of waiting positions or routes, e.g. during the completion of orders in Example 11 and 12, the individual map levels in Example 16, the mapping of the location-dependent energy consumption in Example 18 or the adaptive charging duration adjustment in Example 19 (there, for example, also the energy consumption values per route, orders per route, etc.), a graph-based evaluation can be carried out in one aspect, e.g. in the scope of path planning. This is based, for example, in part on nodes created along a path traveled by a robot as part of a graph-based SLAM approach (known in the prior art (see e.g. DOI: 10.1109/MITS.2010.939925)). Here, the determination of (e.g. path-related) energy consumption, obstacle detection, the type of orders to be completed (e.g. the mass to be transported, etc.), traffic rules, etc., can be assigned as edge weights to the edges between nodes (i.e. waypoints along a path). These edge weights, in turn, are then taken into account in path planning.

Example 25: Adaptation of Driving Behavior

Figure 33:
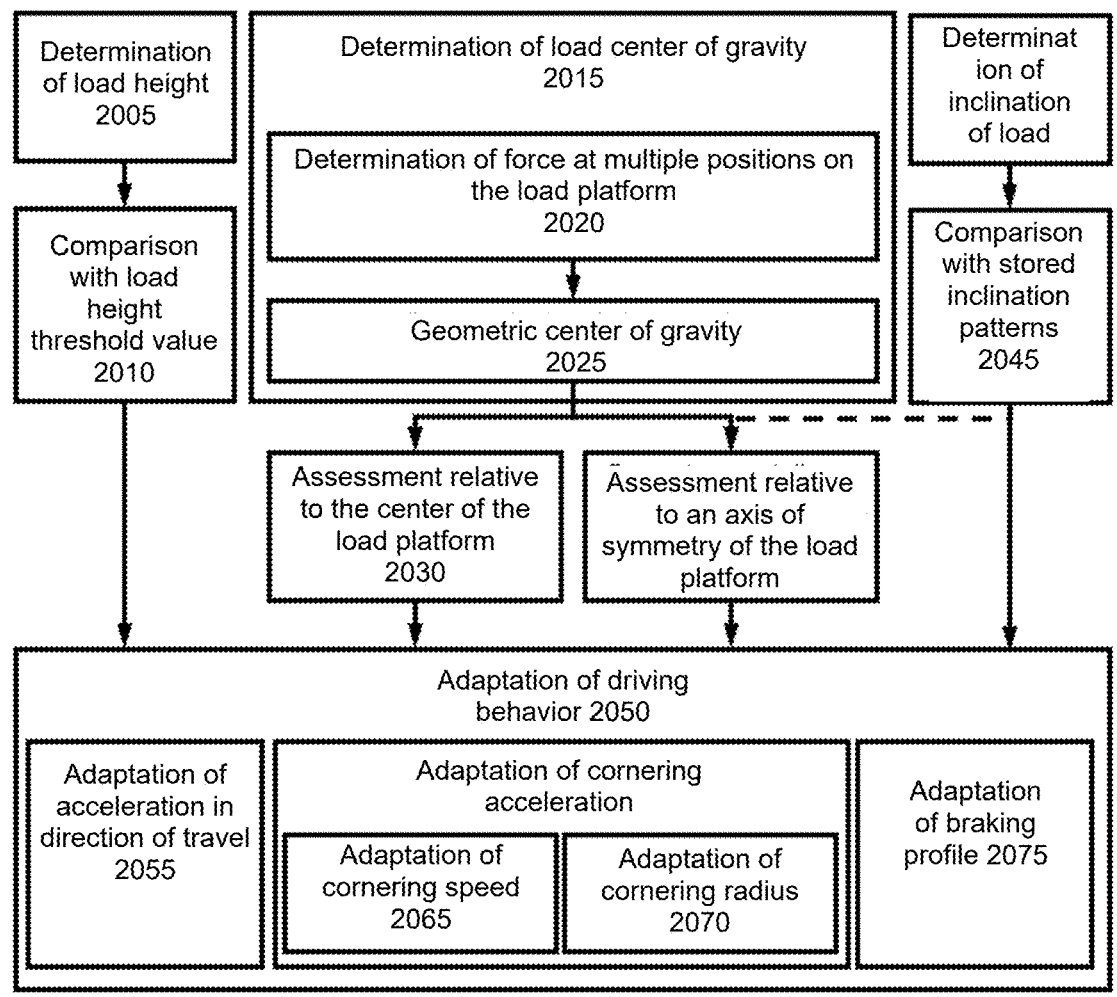
FIG. 33 is a flow chart illustrating a sequence for the adaptation of driving behavior depending on the load in accordance with a preferred embodiment of the present invention.

As shown in FIG. 33, an adaptation of the driving behavior of the AIT 5 to the load 143 is implemented in one aspect. In the process, the AIT 5 detects the height of the load 143 by means of the load height sensor 45 (step 2005). In step 2010, the detected load height is compared to one or more threshold values stored in the memory (2, 38). Based on the result of the threshold comparison, the driving behavior is adapted 2040. Alternatively and/or additionally to the determination of the load height, the center of gravity of the load 2015 is determined. This is achieved, for example, by detecting the force at several positions of the load platform 12 in step 2020, e.g. by means of at least one load platform load sensor 21. The determined forces are then evaluated, for example, such that the geometric center of gravity of the forces is determined (step 2025) and this is assessed as the center of gravity of the load. In one aspect, this assessment is made relative to the center of gravity of the load platform 12 (step 2030). Alternatively and/or additionally, an assessment is made relative to an axis of symmetry of the load platform (step 2035), i.e. longitudinal or transverse to the direction of travel. In one aspect, the load height and the center of gravity of the load are evaluated together. Based on the evaluation/assessment, the driving behavior is adapted 2050. Different driving characteristics are stored for different load heights and/or load centers of gravity. In one aspect, the acceleration is adapted in the direction of travel 2055, e.g. when starting or braking. Alternatively and/or additionally, the cornering acceleration of the AIT 5 is adapted 2060, e.g. reduced. Specifically, for example, the cornering speed 2065 or the cornering radius 2070 is adjusted. Specifically, for example, the cornering speed is reduced with increasing height of the load 143 or the speed when cornering is adjusted such that there is a maximum speed that is dependent on the cornering radius, for example. Alternatively and/or additionally, the cornering radius is increased as the height of the load increases. In one aspect, the braking profile is also modified 2075, e.g. such that a longer braking distance is selected when a load height threshold is exceeded.

With respect to the center of gravity of the load, e.g. when a center of gravity of the load in the direction of travel to the right of the axis of symmetry of the load platform 12 or the center of the load platform is detected, a left turn is made at a lower speed and/or a larger cornering radius than a right turn. This applies vice versa, for example, for a center of gravity of the load to the left of the center of the load platform 12 (or the axis of symmetry along the load platform 12). If, for example, the center of gravity of the load is located in the rear part of the load platform 12 in the direction of travel (i.e. behind the center or the transverse axis of symmetry), braking maneuvers are performed more slowly.

In one aspect, a load platform load sensor 21 is alternatively and/or additionally at least one inertial sensor that determines the inclination of the load platform 12 from the horizontal 2040. This inclination is then compared 2045 with stored inclination patterns stored in a memory (2, 38). These patterns may have been created, for example, by positioning defined load variables (in the horizontal plane), load weights, and positioning of the center of gravity of the load with respect to at least one axis of symmetry (e.g. parallel to the main direction of travel and/or perpendicular to it), so that when an inclination is determined, the position underlying the inclination (e.g. with a known mass) can be inferred. Alternatively and/or additionally, pattern matching involves an assessment with regard to the axes of symmetry mentioned above. Based on the pattern matching, an assessment is made in one aspect according to steps 2030 and 2035, or alternatively directly according step 2050 et seq. Since the inclination primarily indicates the position of the center of gravity, the subsequent evaluations are carried out analogously.

The method for adapting the driving behavior is characterized here by the following aspects AFV1-AFV11:

AFV1. Method for adapting the driving behavior of an autonomous industrial truck (5), comprising:
the detection of the height of the load (143) and/or the determination of the center of gravity of the load;
the assessment of the height of the load (143) and/or the center of gravity of the load, and
the adaptation of the driving behavior of the autonomous industrial truck (5).

AFV2. Method according to AFV1, wherein the assessment of the height of the load (143) comprises a load height threshold comparison.

AFV3. Method according to AFV1, wherein the determination of the center of gravity of the load comprises the detection of the force at multiple positions of the load platform (12) and a determination of the geometric center of gravity of the pressure (143).

AFV4. Method according to AFV1, wherein the assessment of the center of gravity of the load comprises an assessment relative to the center of the load platform (12).

AFV5. Method according to AFV1, wherein the assessment of the center of gravity of the load comprises an assessment relative to an axis of symmetry of the load platform (12).

AFV6. Method according to AFV1, wherein the center of gravity of the load is determined by determining the inclination of the load platform and comparing it with stored patterns.

AFV7. Method according to AFV1, wherein the adaptation of the driving behavior comprises an adaptation of the acceleration in the direction of travel.

AFV8. Method according to AFV1, wherein the adaptation of the driving behavior comprises an adaptation of the cornering acceleration.

AFV9. Method according to AFV8, wherein the adaptation of the cornering acceleration comprises an adaptation of the cornering speed.

AFV10. Method according to AFV8, wherein the adaptation of the cornering acceleration comprises an adaptation of the cornering radius.

AFV11. Method according to AFV1, wherein the adaptation of the driving behavior comprises an adaptation of the braking profile.

AFV12. Device for performing the method according to AFV1-AFV11.

Example 26: Method for Setting Down a Load

The following describes a method for controlling an AIT to set down a load, as performed in aspects AABL1-AABL15 as follows:

AABL1. Method for controlling an autonomous industrial truck (5), comprising the determination of a position and the subsequent repositioning of the autonomous industrial truck (5).

AABL2. Method according to AABL1, wherein the position determination includes a position determination of a load (143) and/or overhang of a load (143) beyond the load platform of the autonomous industrial truck (5).

AABL3. Method according to AABL2, further comprising
the comparison of the determined position and/or the determined overhang with a threshold value, and
if the threshold value is exceeded
setting down the load (143) and/or
the generation of an error message.

AABL4. Method according to AABL2, wherein, based on the length of a trolley (200) stored in a memory (2, 38) and the determined position of a load (143), the movements of the autonomous industrial truck (5) are controlled in such a way that one side of the load platform (12) of the autonomous industrial truck (5) does not protrude substantially from under a trolley (200) to be transported.

AABL5. Method according to AABL1, wherein the autonomous industrial truck (5) moves below a trolley to be transported (200) until it reaches a threshold value.

AABL6. Method according to AABL1, wherein at least one marker (202), rail (201), and/or identification device (e.g. 203) located parallel to parked loads (143) is detected.

AABL7. Method according to AABL1, wherein an optical and/or wireless reading of an identification device (203) for identifying a load (143) is performed.

AABL8. Method according to AABL7, wherein the identification device (e.g. 203) for identifying a load (143) is a device for identifying a row of trolleys.

AABL9. Method according to AABL6-8, wherein, the autonomous industrial truck (5) is repositioned based on the recognized marker (202), rail (201), or identification device (e.g. 203) or the reading of the identification device.

AABL10. Method according to AABL9, wherein the repositioning occurs between different rows with load (143) or within a single row with load (143).

AABL11. Method for controlling an autonomous industrial truck (5), wherein, in order to set down a trolley (200), the distance to the end point of a marker (202) or rail (201), and/or the distance away from or up to an identification device (e.g. 203) is determined, with the marker (202) and/or rail (201) being substantially parallel to the trolley (200) to be set down.

AABL12. Method according to AABL11, wherein the autonomous industrial truck (5) aligns itself at a distance of more than 5 cm, preferably approx. 70 cm, in front of a marker (202), rail (201), and/or identification device (e.g. 203) so that it is substantially parallel to the marker (202), rail (201), and/or identification device (e.g. 203), and/or it aligns itself parallel to the sides of parked trolleys (200) while maintaining a distance to the sides of these trolleys that is greater than 5 mm, preferably greater than 10 mm.

AABL13. Method according to AABL12, wherein the distances to the trolley sides are determined contactlessly.

AABL14. Method according to AABL6-12, wherein the area in which the marker (202), rail (201), and/or identification device (e.g. 203) is/are located is illuminated and optically detected.

AABL15. Device for performing the method according to AABL1-14.

Example 27: Alternative Load Platform Height Adjustment

Figure 4E:
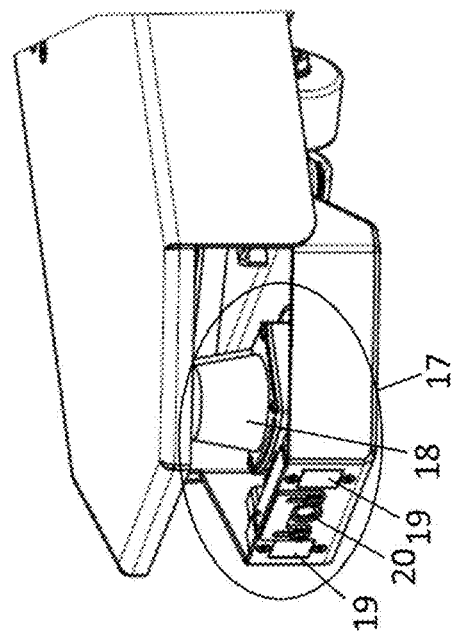
FIGS. 4D and 4E show an AIT with rear-facing sensor technology of a different design in accordance with another preferred embodiment of the present invention.
Figure 4D:
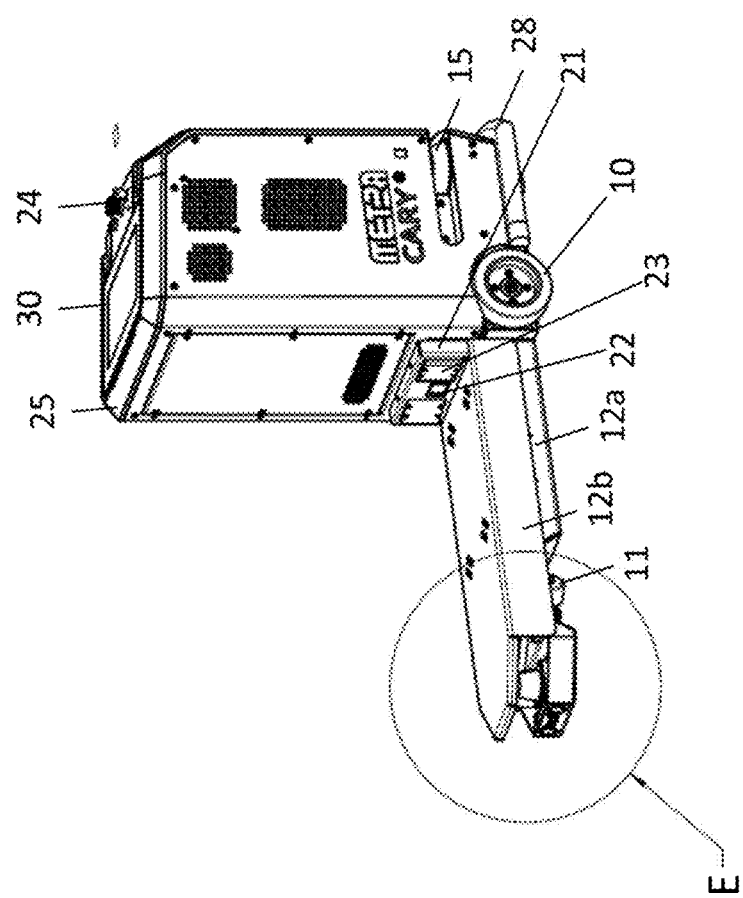
Figure 34A:
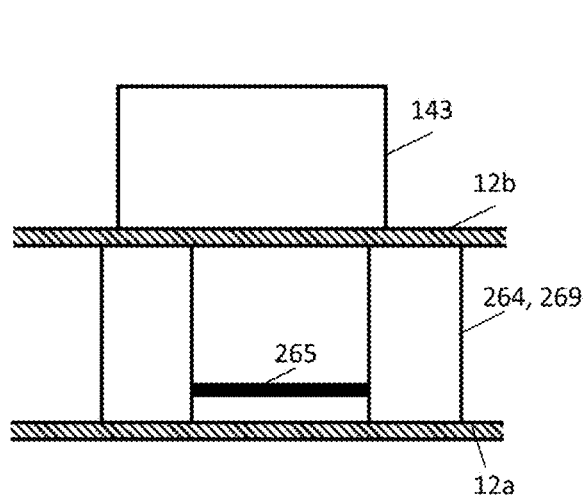
FIGS. 34A-34B are side views of a cylinder and load platform in accordance with a preferred embodiment of the present invention.
Figure 34B:
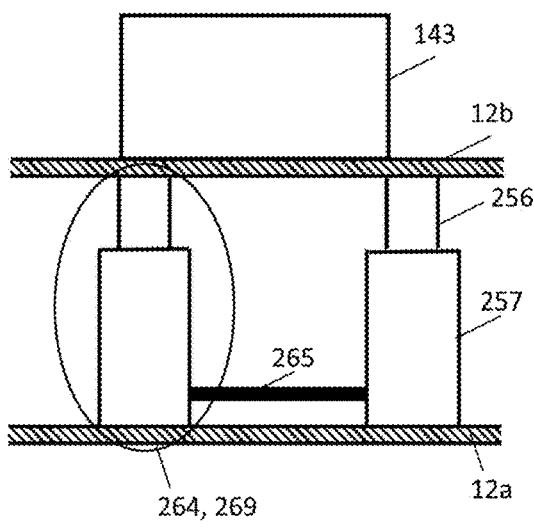

FIGS. 1, 3, and 4 show a load platform height adjustment drive 14 whose drive is located in the superstructure 13. This requires installation space in the superstructure 13, e.g. at the expense of a larger rechargeable battery 4, which in turn limits the operating duration of the AIT 5. Furthermore, a load platform height adjustment drive 14 only on or in the superstructure 13 means that a strong leverage effect acts on the load platform 12 when a load 143 is lifted, in particular on the upper, height-adjustable load platform part 12*a*. This makes it necessary, for example, to take additional forces into account based on the leverage effect in the load platform height adjustment drive 14 or to dimension it adequately. In one variant, the AIT 5 is configured in such a way that the load platform height adjustment drive 14 is located directly in the load platform 12. The load platform 12 has a lower load platform part 12*a*, to which, for example, the rear-facing sensor unit 17 or the caster 11 are fixed and which, for example, also forms the base for the superstructure 13, and the upper load platform part 12*b*, as shown in FIG. 4D-4E. In this embodiment example, this lower load platform part 12*a* is coupled to the upper load platform part 12*b* via at least one height adjustment device 269, which engages with the load 143 when the load is applied, as shown in FIGS. 34A-34B.

In this case, in which the load platform height adjustment drive 14 is located below the upper load platform part 12*b*, less force must be applied to lift a load 143 than if the load platform height adjustment drive 14 is positioned on or in the superstructure 13 (see FIGS. 1, 3, 4*a*). At the same time, this means that heavier loads 143 can be lifted with the same force of the load platform height adjustment drive 14, since the leverage effect due to the load 143 is largely eliminated.

In one aspect, the height adjustment device 269 comprises at least one cylinder 264. This at least one cylinder 264 is aligned parallel to the vertical, for example, and is adjustable in its vertical position, which allows the height of the load platform 12, i.e. the upper load platform part 12*b*, to be varied. These cylinders 264 are varied in height, for example, by means of hydraulics, pneumatics, or a cable pull. In one alternative aspect, the height is adjusted by means of a gear-based mechanism. In one example, the cylinder 264 is at least one threaded cylinder, with at least one portion of the cylinder 264 being movably mounted and at least one other portion being fixed, such that vertical height adjustment is enabled by means of the rotation of the movable portion.

Figure 35B:
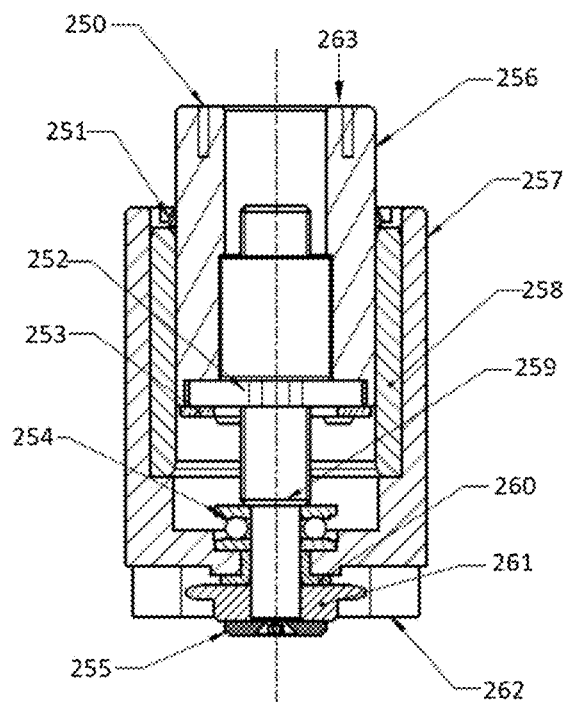
FIGS. 35A-35C are side, cross-section and end views of a thread-based cylinder in accordance with a preferred embodiment of the present invention.
Figure 35A:
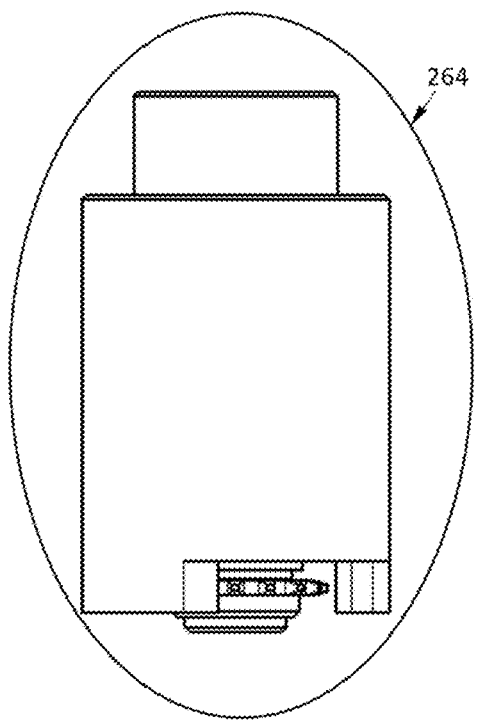
Figure 35C:
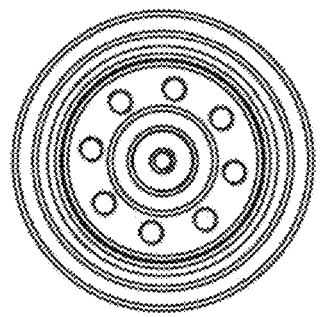

FIGS. 35A-35C illustrates a possible embodiment of a cylinder 264 with thread-based height adjustment. This cylinder 264 is attached to the upper mounting surface 263 with the upper load platform part 12*b*, for which purpose the upper-side threaded holes 250 located on the lifting shaft 256 are used. The lifting shaft 256 is in turn moved vertically by a spindle 259, which is based on a gear 261 connected to the spindle 259. The lifting shaft 256 is turn radially enclosed by a radial plain bearing 258, and there is a sealing ring 251 in the upper part. The spindle nut 252 in turn ensures that the spindle 259 is secured to the stroke shaft 256 where the spindle 259 is vertically restricted in its degrees of freedom by a mounting plate 253. The spindle 259 is in turn fixed within the lift housing 257 of the cylinder 264 by means of a deep groove ball thrust bearing 254. The gear 261, in turn, is limited in its degrees of freedom axially by a plain bearing 260 located above on the spindle 259 and below by an end plate 255. Finally, the cylinder 264 is fixed to the lower load platform part 12*a* via the lift housing 257 on its bottom side, which serves as the lower mounting surface 262, for which purpose screws are used, for example, in the same way as on the upper side. This particular embodiment of the cylinder 261 can also have a different structure, with an external spindle, etc. FIGS. 34A-34B, for example, also anticipates this embodiment, showing the cylinder 264 on the left in the retracted state, and on the right in the extended state, with the lift housing 257 below and the spindle 259 above representing the side view of the embodiment of the cylinder 264.

Figure 36:
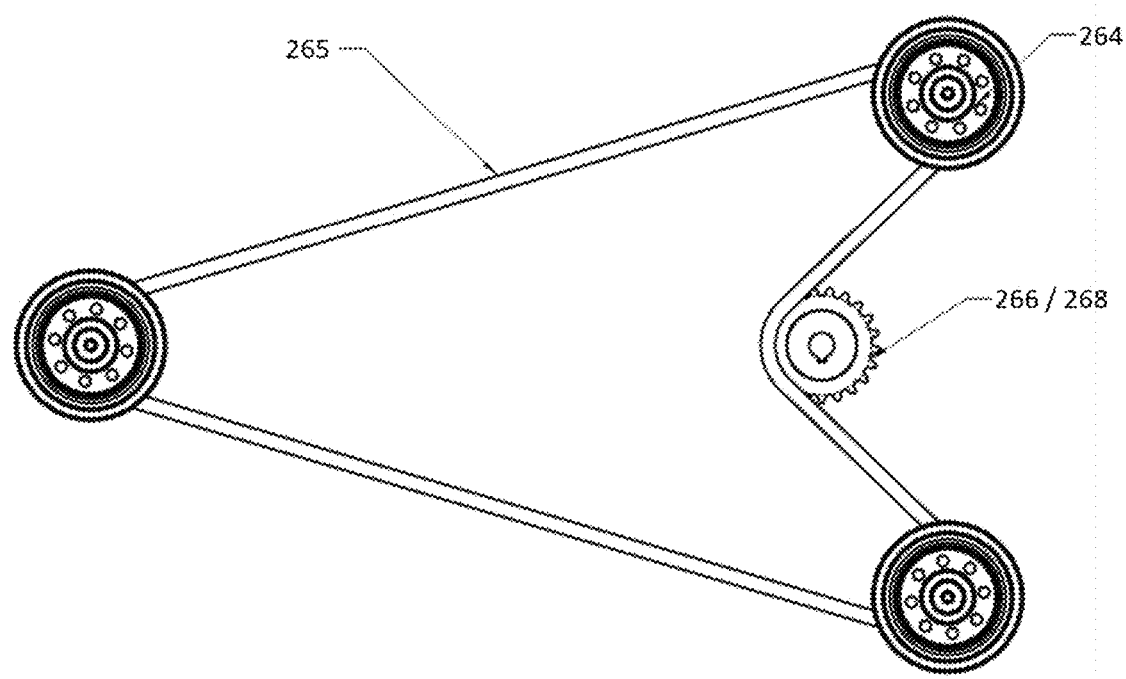
FIG. 36 is a diagram of a cylinder drive unit in accordance with a preferred embodiment of the present invention.

The spindle 259 is moved via the gear 261 of the cylinder 264, which, as shown in FIG. 36, is engaged with a chain 265 (a belt drive would be a possible alternative, e.g. possibly with a machine element other than a gear 261, which is obvious to any expert), so that the length of the cylinder 261 changes vertically. If at least two of these cylinders 261 are used, each of which is fixed to the lower load platform part 12*a* and the upper load platform part 12*b*, the rotational forces generated by the rotation within the cylinders 264 are mutually blocked so that a rotational movement of the spindles 259 only results in a vertical movement. In the case where only one rotating cylinder 264 is used, another machine element would be necessary to restrict the freedom of rotation of the upper load platform part 12*b*.

In one aspect, as shown in FIG. 36, the gears 261 are driven by a chain 265 driven in turn by a drive gear 268 engaged with a load platform height adjustment motor 267. This is, for example, a single chain 265 that engages both the gears 261 of the cylinders 264 and the drive gear 268. This chain 265 is tensioned, in one aspect, by another movably mounted tensioning gear 266, with this movably mounted tensioning gear 266 being movable perpendicular to the moving plane of the chain 265. In one alternative or additional aspect, the drive gear 268 is movably mounted in such a way that it directly assumes the function of the tensioning gear 266, as also illustrated in FIG. 36. In the case of a belt, an equivalent component is used for tensioning the belt. Here, "movably mounted" with respect to the tensioning gear 266 or the drive gear 268, which also functions as the tensioning gear 266, means that it exerts pressure on the chain, e.g. by means of a spring mechanism, as a result of which the chain is tensioned. In the embodiment shown in FIG. 36, chain 265 (alternatively, the belt engaged by means equivalent to gears) is located in a plane that is, for example, parallel to the load platform 12. The total number of cylinders 264 used may vary. For example, this number is between one and eight.

The following describes the load platform height adjustment drive 14 of an AIT in aspects AVAL1-AVAL9:

AVAL1. Device for raising a load platform (12) comprising a lower load platform part (12*a*) and an upper load platform part (12*b*) engaged via at least one load platform height adjustment drive (14), with the at least one load platform height adjustment drive (14) being located below the upper load platform part (12*b*) and the load platform height adjustment drive comprising at least one height adjustment device (269).

AVAL2. Device according to AVAL1, wherein the at least one height adjustment device (269) is driven by a chain (265) or a belt.

AVAL3. Device according to AVAL2, wherein more than one height adjustment device (269) is driven by the same chain (265) or the same belt.

AVAL4. Device according to AVAL2, wherein the chain (265) or the belt is tensioned via a drive element.

AVAL5. Device according to AVAL2, wherein the chain (265) or the belt lie in one plane.

AVAL6. Device according to AVAL1, wherein the height adjustment device (269) is vertically variable in height.

AVAL7: Device according to AVAL1, wherein the height adjustment device (269) is a cylinder (264).

AVAL8. Device according to AVAL7, wherein the height adjustment of the at least one cylinder (264) is carried out via a spindle (259).

AVAL9. Device according to AVAL8, wherein the spindle (259) is engaged with a gear (261) or an element for a belt drive.

AVAL10. Device according to AVAL1, which is implemented in an autonomous industrial truck (5).

Example 28: Warning System for Autonomous Industrial Truck

Figure 37:
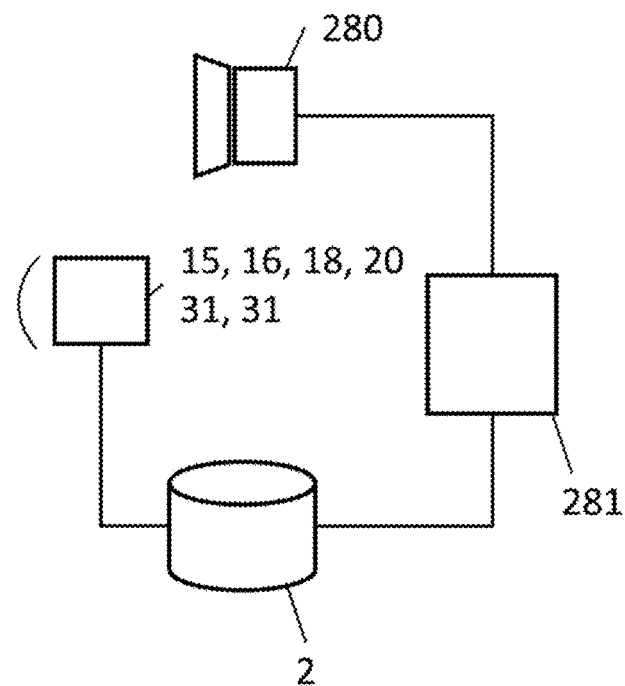
FIG. 37 is a diagram of warning generation components in accordance with a preferred embodiment of the present invention.

For safety reasons, autonomous industrial trucks 5 should have acoustic warning devices, such as a signal generator 280 for acoustic signals, e.g. a horn, a loudspeaker for issuing warnings, which may depend, for example, on the state of the autonomous industrial truck 5. Persons who are in the vicinity of the autonomous industrial truck 5 may experience dulled perception due to constant identical signals, causing them to ignore the warnings. This increases the risk of accidents. In one aspect, the autonomous industrial truck 5 is configured in such a way that it can vary the type of warning in a state requiring a warning in order to prevent this dulling of the perception of the persons to be warned. The state of the autonomous industrial truck 5 may be described by a state machine. A warning may be a certain sequence of beeps, loudspeaker outputs of texts, etc. For this purpose, the autonomous industrial truck 5 has different stored warnings in a memory (e.g. 2), e.g. categorized into warning classes. The output of these stored warnings is controlled by an output generator 281. This output generator 281 can either output warnings based on a fixed rule set, e.g. depending on the state of the autonomous industrial truck 5, based on the distance to detected obstacles, e.g. moving obstacles, which are detected via a contactless sensor (for example 15, 16, 18, 20, 31, 31). Alternatively and/or additionally, the warnings may be generated by a random generator in the warning generator from a list of various warnings (or warning classes). In one aspect, a combination is also possible: different warnings for each state of the autonomous industrial truck 5 or the distance to moving obstacles, respectively. FIG. 37 shows a possible configuration of the components mentioned above.

Figure 38:
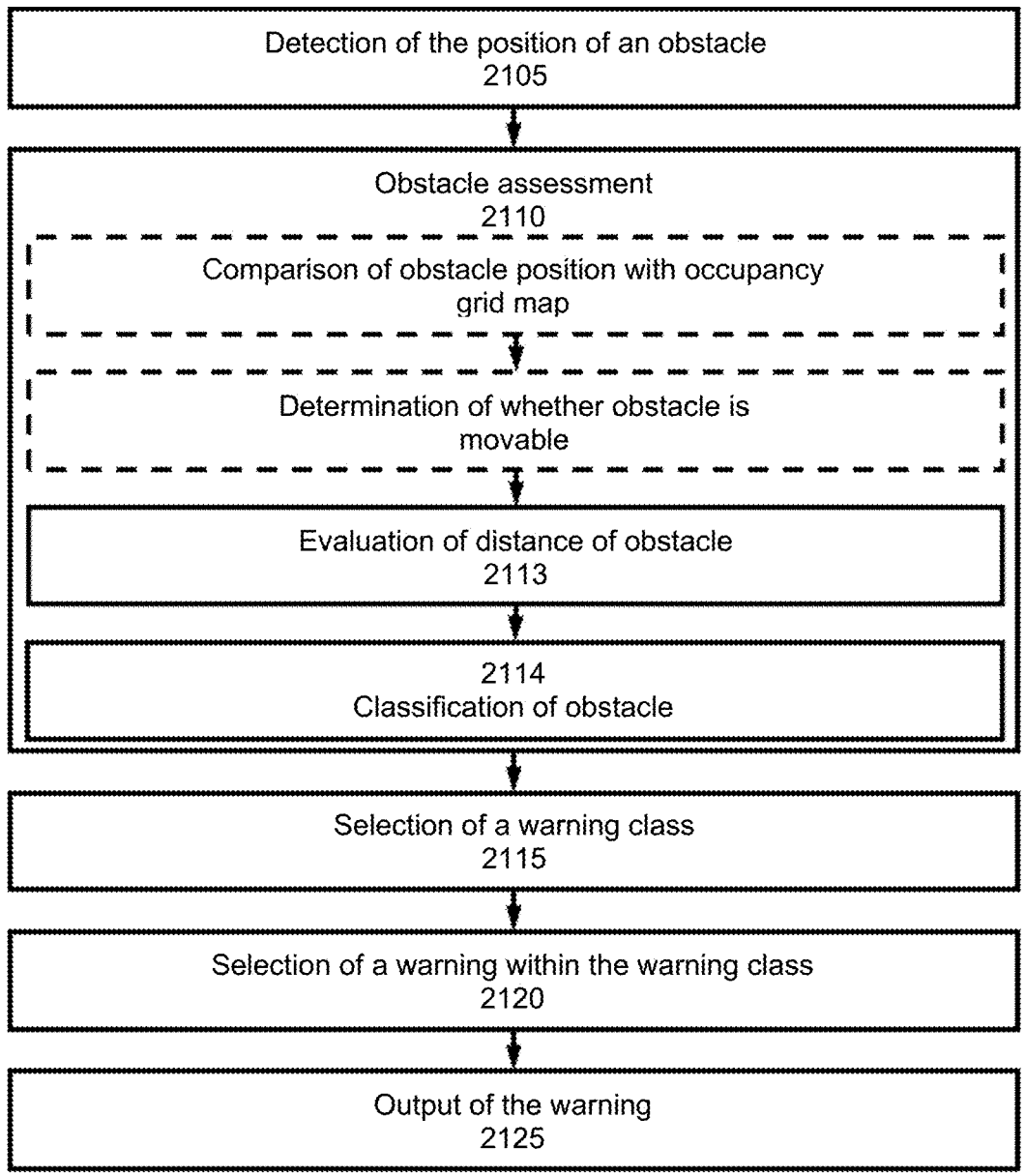
FIG. 38 is a flow chart of a sequence for warning generation in accordance with a preferred embodiment of the present invention.

The warning sequence can be described as follows with reference to FIG. 38: the detection of the position of an obstacle 2105. This detection is made contactlessly by means of a sensor such as 15, 16, 18, 20, 31, or 31. This is followed by the obstacle assessment 2110. In one optional aspect, this means that the determined position of the obstacle is compared (step 2111) with (fixed) obstacles recorded in an occupancy grid map to determine whether the obstacle is movable (2112). For example, an obstacle is classified as movable if it is not stored in the occupancy grid map. Alternatively and/or additionally, the distance of the obstacle to the autonomous industrial truck 5 is evaluated (2113). An assessment can also be made, for example, of whether it lies within defined protective fields. As a result of this, the obstacle is classified 2114. Based on this classification, a warning class is selected 2115, which represents the type of warning. This warning may, for example, relate to the state of the autonomous industrial truck 5. For example, the warning may represent a general warning that the autonomous industrial truck 5 is in the vicinity. Or it may be a specific warning that the obstacle is on the path that the autonomous industrial truck 5 is traveling and there is therefore a risk of collision. A the next step, a warning is selected within the warning class 2120. This may be a random selection made by a random generator. However, it may also be a defined sequence of different warnings that are output consecutively, etc. Finally, the selected warning is output 2125.

The following describes the device and the warning output sequence by means of the following aspects AAW1-AAW8:

AAW1. Method for warning generation, comprising
   the selection of a warning class;
   the selection of a warning within the warning class;
   the output of the warning.

AAW2. Method according to AAW1, wherein the warning is output based on a state defined in a state machine.

AAW3. Method according to AAW1, previously comprising
   the detection of the position of an obstacle and
   the assessment of the position of the obstacle.

AAW4. Method according to AAW3, wherein the obstacle evaluation comprises:
   the comparison of the detected obstacle position to an occupancy grid map;
   the determination of whether the obstacle is movable;
   the evaluation of the distance to the obstacle; and
   the classification of the obstacle.

AAW5. Method according to AAW3, wherein the obstacle evaluation comprises:
   the evaluation of the distance to the obstacle; and
   the classification of the obstacle.

AAW6. Method according to AAW4-5, wherein the selection of the warning class is made based on the classification of the obstacle.

AAW7. Method according to AAW1-AAW6, which is implemented in an autonomous industrial truck (5).

AAW8. Device for performing the method according to AAW1-AAW5.

AAW9. Warning device comprising a contactless sensor (15, 16, 18, 20, 31, 31), a memory (2), an output generator (281), and a signal generator (280) for outputting warnings, with the memory (2) containing stored warnings and the output generator (281) containing rules for selecting a warning based on data from the contactless sensor (15, 16, 18, 20, 31, 31), which is output via a signal generator (280).

AAW10. Warning device according to AAW9, wherein the output generator (281) comprises a random number generator.

REFERENCE TERMS

1 Mobile base
2 Memory
3 Processing unit
4 Rechargeable battery
5 AIT

6 Motor
7 Gearbox
10 Drive wheel
11 Caster
12 Load platform
12a Lower load platform part
12b Upper load platform part
13 Superstructure
14 Load platform height adjustment drive
15 LIDAR: forward-facing
16 LIDAR, substantially vertically oriented
17 Rear-facing sensor unit
18 Sensor unit-LIDAR
19 Sensor unit-light
20 Sensor unit-camera
21 Load platform load sensor
22 Laser distance sensor
23 Contact sensor
24 Control elements
25 Alarm lights (traffic light)
26 Projection unit
27 Antenna
28 Pressure-sensitive bumper
29 Infrared ToF sensor
30 Display
31 Camera
32 Radar sensor
33 Charging interface
34 Cloud
35 Terminal
36 External system
37 External processing unit
38 External memory
39 Height adjustment sensor
40 Inertial sensor
41 Rotation evaluation unit
42 Controller interface
43 Charging station
44 Integrated load platform sensor
45 Load height sensor
100 Level of robot capabilities (software)
110 Navigation module
111 2D/3D environment detection module
112 Path planning module
113 Self-blockade detection module
114 Self-localization module
115 Movement planner
116 Waiting position module
117 Mapping module
118 Loading module
119 Load detection module
120 Hardware level
121 Odometry module
122 WLAN
123 AIT-to-AIT communication module (ZigBee)
124 Differential drive
125 Charging port and electronics
126 Controller
127 Controller memory
128 Counting unit
129 Rotation angle sensor
130 Processor
131 Watchdog
132 Electronic circuit
133 Relay
134 Mechanical brake
135 Sensor-oriented memory
136 Field of view of front LIDAR
137 Field of view of rear LIDAR with picked-up trolley
138 Trolley load LIDAR dead zone
139 Trolley wheel
140 Vertical axis of rotation of a trolley wheel
141 Field of view of rear LIDAR without impairment by load
142 No-load LIDAR dead zone
143 Load
144 Map module
145 Energy consumption map level
146 Moving obstacles map level
147 Difficult-to-detect obstacles map level
148 Normal obstacles map level
149 Traffic rules map level
150 Inner protective zone
151 Wall/obstacle
152 Transmission channel
200 Trolley
201 Rail
202 Marking and/or guide line
203 Trolley row identification device
204 Goods carrier (on trolley)
250 Upper-side threaded hole
251 Sealing ring
252 Spindle nut
253 Mounting plate
254 Deep groove ball thrust bearing
255 End plate
256 Lifting shaft
257 Lift housing
258 Radial plain bearing
259 Spindle
260 Plain bearing
261 Gear
262 Lower mounting surface
263 Upper mounting surface
264 Cylinder
265 Chain
266 Tensioning gear
267 Height adjustment motor
268 Drive gear
269 Height adjustment device
280 Signal generator
281 Output generator

The invention claimed is:

1. An autonomous industrial truck with a memory or access to a memory comprising rules for setting down and picking up a load on a platform wherein the autonomous industrial truck comprises a rear-facing sensor unit with at least one sensor unit camera and at least one sensor unit LIDAR, and wherein the rear facing sensor unit is located below the load platform.

2. The autonomous industrial truck according to claim 1, wherein the rear-facing sensor unit comprises a sensor unit light.

3. The autonomous industrial truck according to claim 1, wherein the sensor unit camera is an RGB camera.

4. The autonomous industrial truck according to claim 1, further comprising at least one load platform load sensor, a contact sensor, a light-based distance sensor such as a laser distance sensor, ultrasonic sensors, infrared sensors, radar, LIDAR, capacitive distance or depth sensors, strain gauges, laser distance sensors, and/or 3D cameras for detecting the position of a load.

5. The autonomous industrial truck according to claim 4, wherein the at least one contact sensor is a limit switch.

6. The autonomous industrial truck according to claim 4, wherein the autonomous industrial truck has a superstructure, and the contact sensor is located on the superstructure and wherein the contact sensor can be triggered by a load moving in the horizontal direction on the load platform.

7. The autonomous industrial truck according to claim 4, wherein the at least one laser distance sensor comprises an extended measuring spot.

8. The autonomous industrial truck according to claim 4, wherein the at least one laser distance sensor comprises a dead zone located within the structure or an enclosure.

9. The autonomous industrial truck according to claim 4, wherein the at least one laser distance sensor is located between two of the contact sensors.

10. The autonomous industrial truck according to claim 4, further comprising rules in the memory for determining the position of a load on the load platform.

11. The autonomous industrial truck according to claim 4, comprising a controller connected via at least one interface to a rotation angle sensor, with at least one controller memory, and wherein the controller is adapted to monitor at least one of the acceleration or speed of the autonomous vehicle and is able to force a speed reduction.

12. The autonomous industrial truck according to claim 11, wherein the controller has a stored time interval and a target speed in the controller memory, and wherein the controller is adapted to monitor the acceleration time of the motor and force the termination of a motor movement if the target speed has not been reached within the time interval stored in the controller memory.

13. The autonomous industrial truck according to claim 12, wherein the controller is adapted to monitor the speed based on two different, physical measuring principles.

14. The autonomous industrial truck according to claim 11, further comprising a watchdog monitoring the controller, and wherein the watchdog is adapted to trigger a speed reduction of the autonomous industrial truck if the controller is no longer supplied with power.

\* \* \* \* \*